United States Patent [19]
Watanabe et al.

[11] Patent Number: 5,717,537
[45] Date of Patent: Feb. 10, 1998

[54] MAGNETIC TAPE APPARATUS

[75] Inventors: Shuko Watanabe; Makoto Sasaki, both of Kawasaki, Japan

[73] Assignee: Fujitsu Limited, Kawasaki, Japan

[21] Appl. No.: 440,531

[22] Filed: May 12, 1995

[30] Foreign Application Priority Data

Jul. 27, 1994 [JP] Japan ................. 6-174939

[51] Int. Cl.$^6$ ............................ G11B 15/52
[52] U.S. Cl. ............ 360/74.4; 360/72.2; 360/95; 242/333.2; 242/334; 318/603; 388/809
[58] Field of Search ............ 360/72.1, 72.2, 360/72.3, 74.1, 74.2, 74.4, 53, 95; 242/333, 333.1, 333.6, 333.7, 334, 334.1, 334.2, 334.3, 334.4; 318/603; 388/809

[56] References Cited

U.S. PATENT DOCUMENTS

| | | | |
|---|---|---|---|
| 4,398,227 | 8/1983 | Anderson | 360/74.2 X |
| 4,628,377 | 12/1986 | Harigaya | 360/74.2 X |
| 4,664,336 | 5/1987 | Koyama | 360/74.2 X |
| 4,737,868 | 4/1988 | Kimura et al. | 360/74.4 |
| 4,821,129 | 4/1989 | Culp | 360/74.4 |
| 5,325,370 | 6/1994 | Cleveland et al. | 360/53 X |
| 5,475,542 | 12/1995 | Bentley et al. | 360/74.4 X |

FOREIGN PATENT DOCUMENTS

| | | |
|---|---|---|
| 63-79263 | 4/1988 | Japan. |
| 435236 | 3/1992 | Japan. |

*Primary Examiner*—Aristotelis M. Psitos
*Assistant Examiner*—James L. Habermehl
*Attorney, Agent, or Firm*—Greer, Burns & Crain, Ltd.

[57] ABSTRACT

A cartridge of a single reel is inserted and information is recorded and reproduced by a helical scan type using a rotary head. A control pulse is reproduced from a recording signal of a control track of a magnetic tape by a fixed head. A repositioning operation and a high speed search are controlled on the basis of the control pulse. A torque ripple of a capstan motor is previously measured. When the tape runs, a motor drive current is corrected so as to reduce a torque change of one rotation on the basis of the measurement result, thereby improving a wow and flutter. A switching timing of motor coils by Hall sensors is set to an early timing, thereby suppressing a torque fluctuation. A regenerative braking circuit is formed by an OFF timing of a PWM control and a tape back tension is formed by a decrease in torque by the regenerative braking circuit. A tape thread and a tape wrap at the time of the insertion of the cartridge are simultaneously executed.

21 Claims, 45 Drawing Sheets

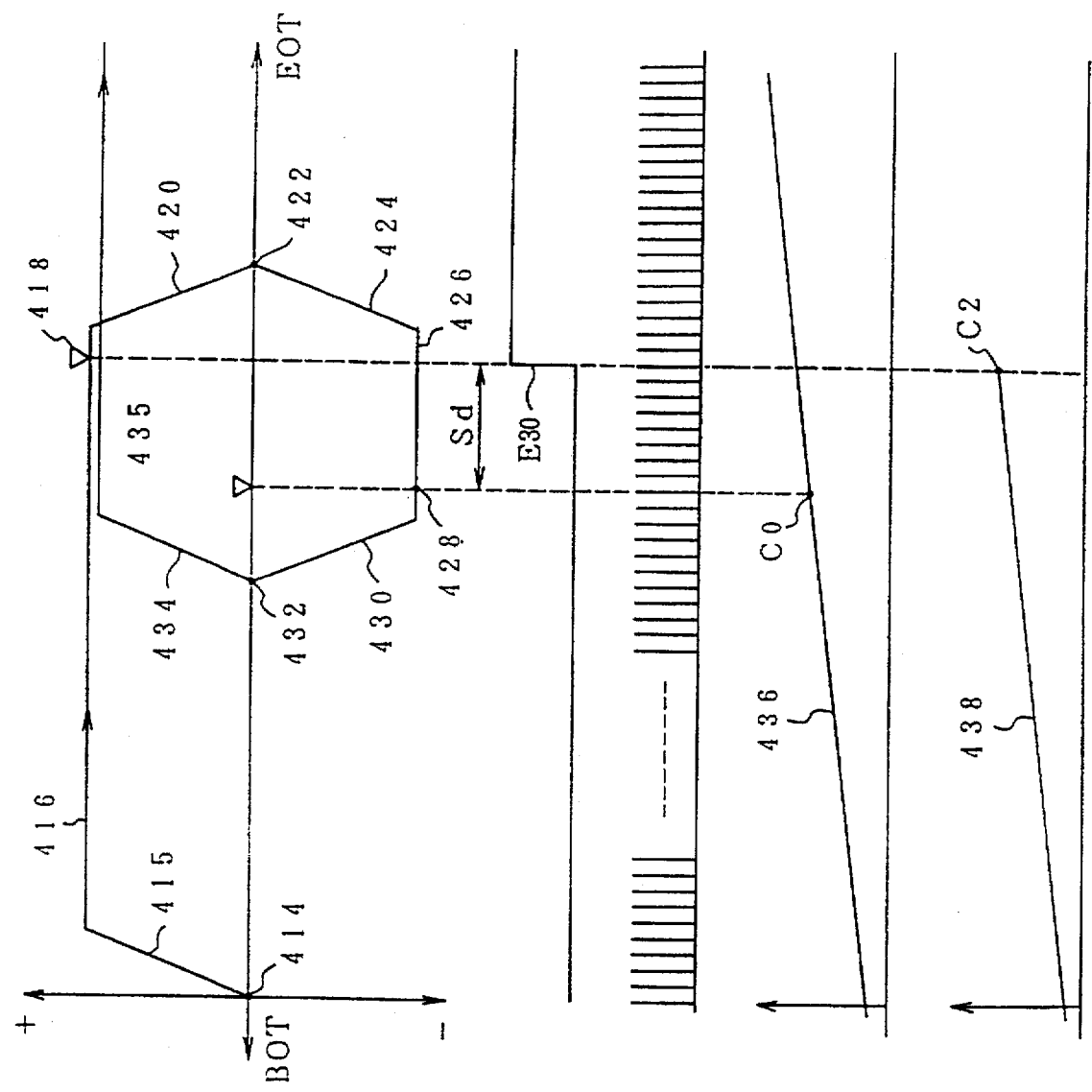

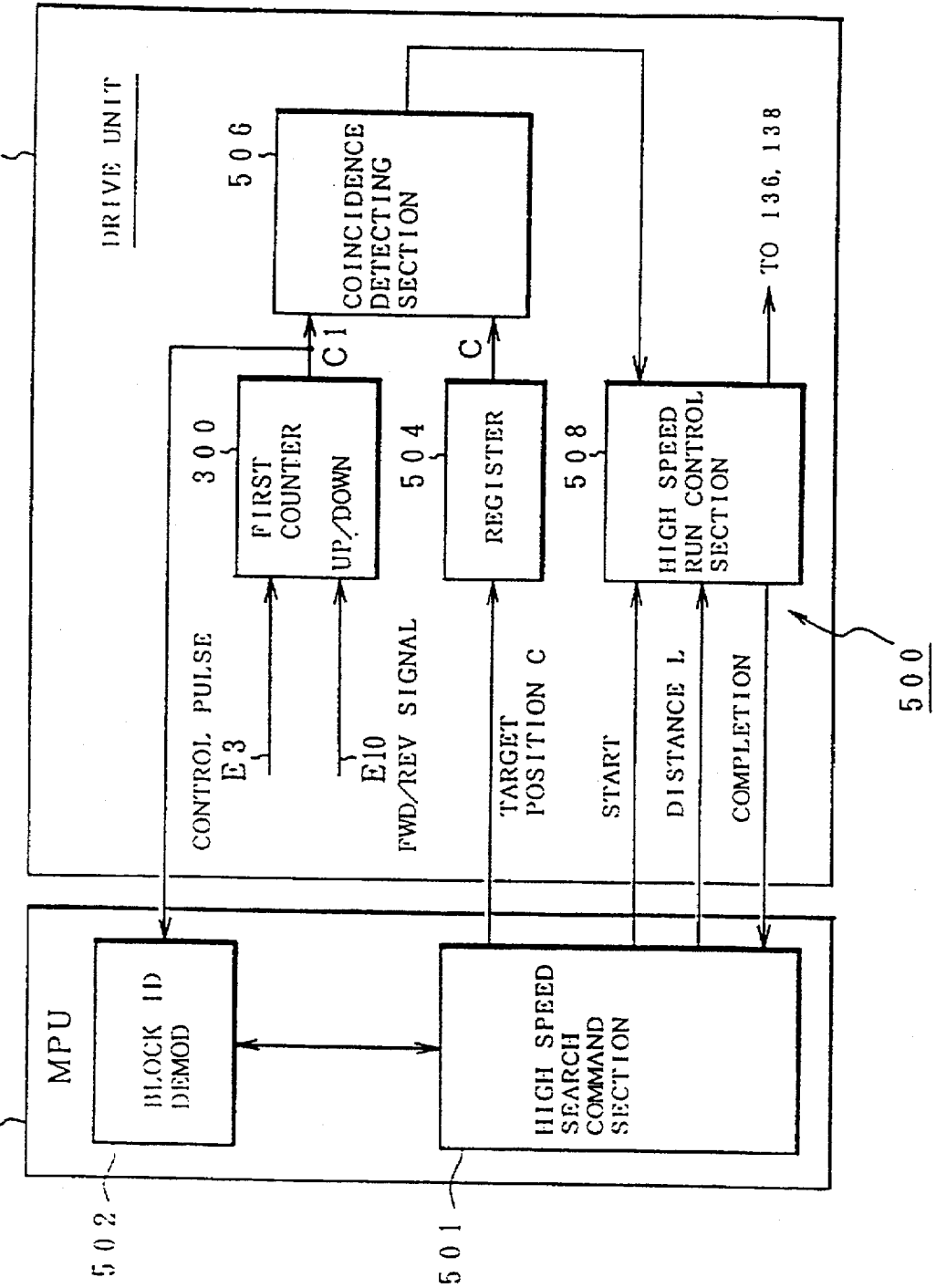

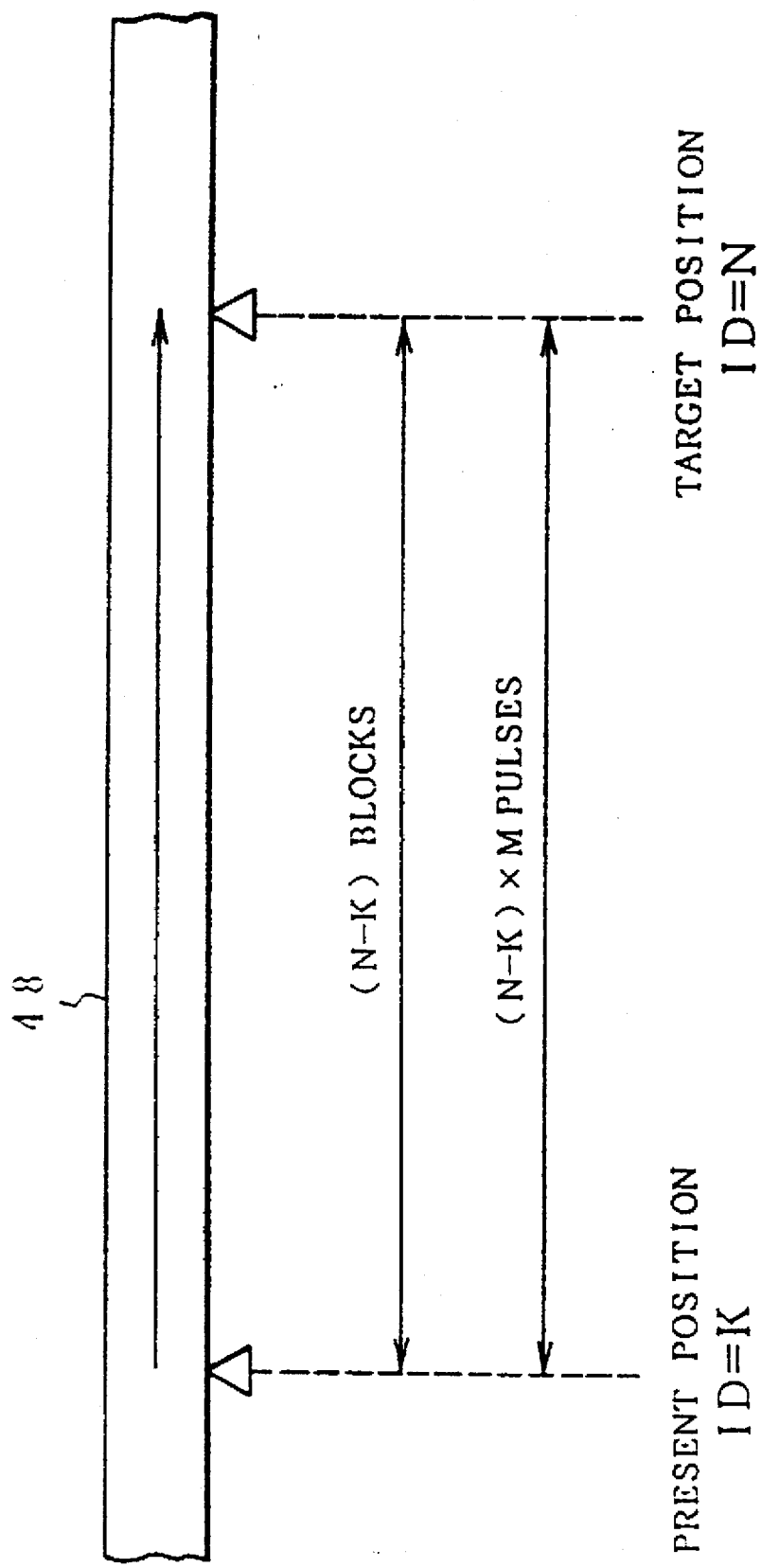

FIG. 16

| NUMBER | MEASURED CURRENT VALUE |
|---|---|
| 1 | $I_1$ |
| 2 | $I_2$ |
| 3 | $I_3$ |
| 4 | $I_4$ |
| 5 | $I_5$ |
| ⋮ | ⋮ |
| $M/n$ | $I_{M/n}$ |

FIG. 17

| NUMBER | CORRECTION CURRENT VALUE |
|---|---|
| 1 | $(I_c - I_1)$ |
| 2 | $(I_c - I_2)$ |
| 3 | $(I_c - I_3)$ |
| 4 | $(I_c - I_4)$ |
| 5 | $(I_c - I_5)$ |
| ⋮ | ⋮ |
| $M/n$ | $(I_c - I_{M/n})$ |

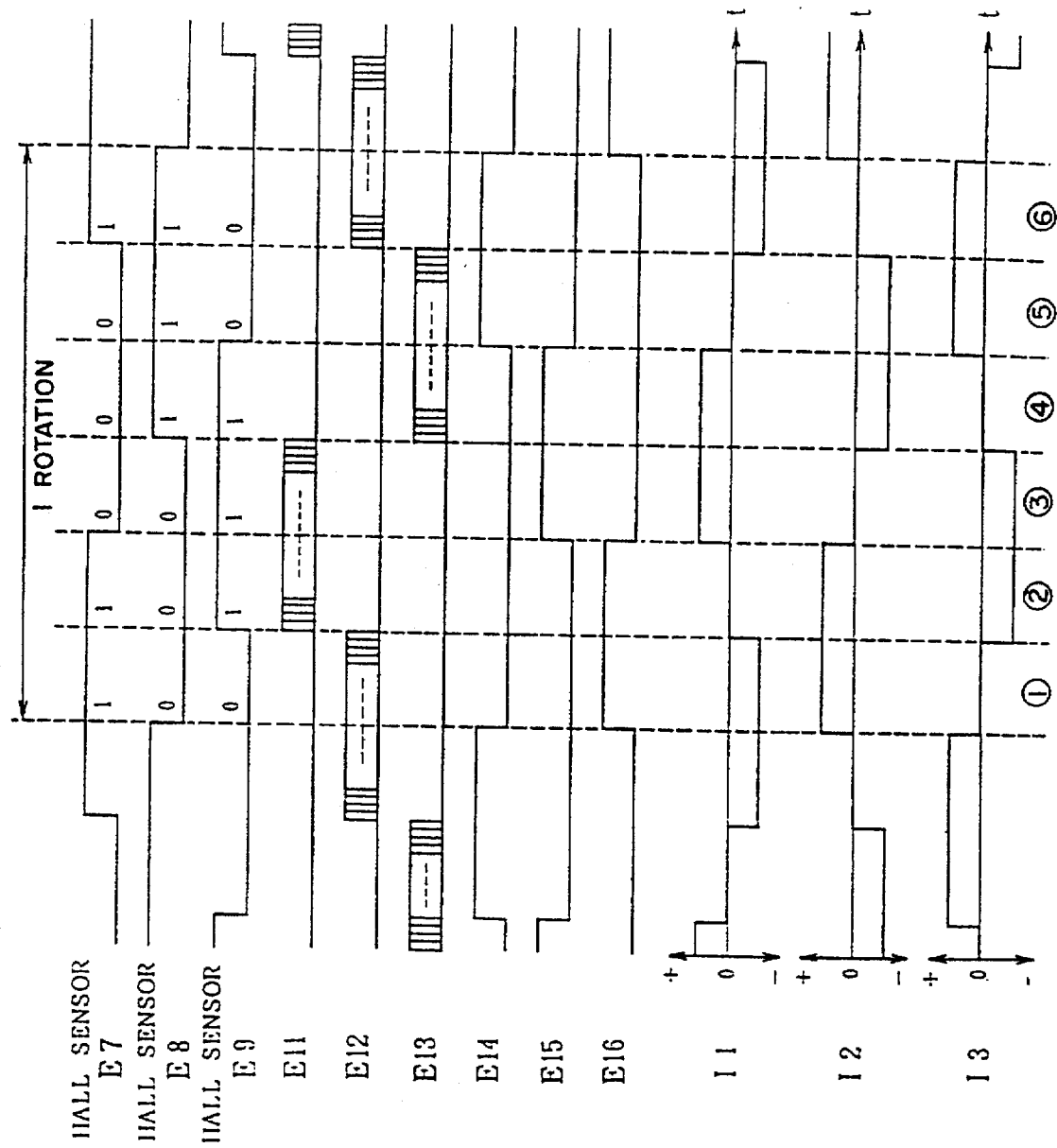

FIG. 21A

| PHASE | INFLOW SIDE FET | | | OUTFLOW SIDE FET | | | STATOR COIL | | |
|---|---|---|---|---|---|---|---|---|---|
| | 170-1 | 170-2 | 170-3 | 170-4 | 170-5 | 170-6 | 162-1 | 162-2 | 162-3 |
| ① | | ○ | | ○ | | | OUTFLOW | INFLOW | |
| ② | | ○ | | | | ○ | | OUTFLOW | INFLOW |
| ③ | ○ | | | | ○ | | INFLOW | | OUTFLOW |
| ④ | ○ | | | | | ○ | INFLOW | OUTFLOW | |
| ⑤ | | | ○ | | | | | OUTFLOW | INFLOW |
| ⑥ | | | ○ | ○ | | | OUTFLOW | | INFLOW |

FIG. 21B

| PHASE | ADDRESS | DATA |
|---|---|---|
| ① | 100 | 010100 |
| ② | 101 | 010001 |
| ③ | 001 | 100001 |
| ④ | 011 | 100010 |
| ⑤ | 010 | 001010 |
| ⑥ | 110 | 001100 |

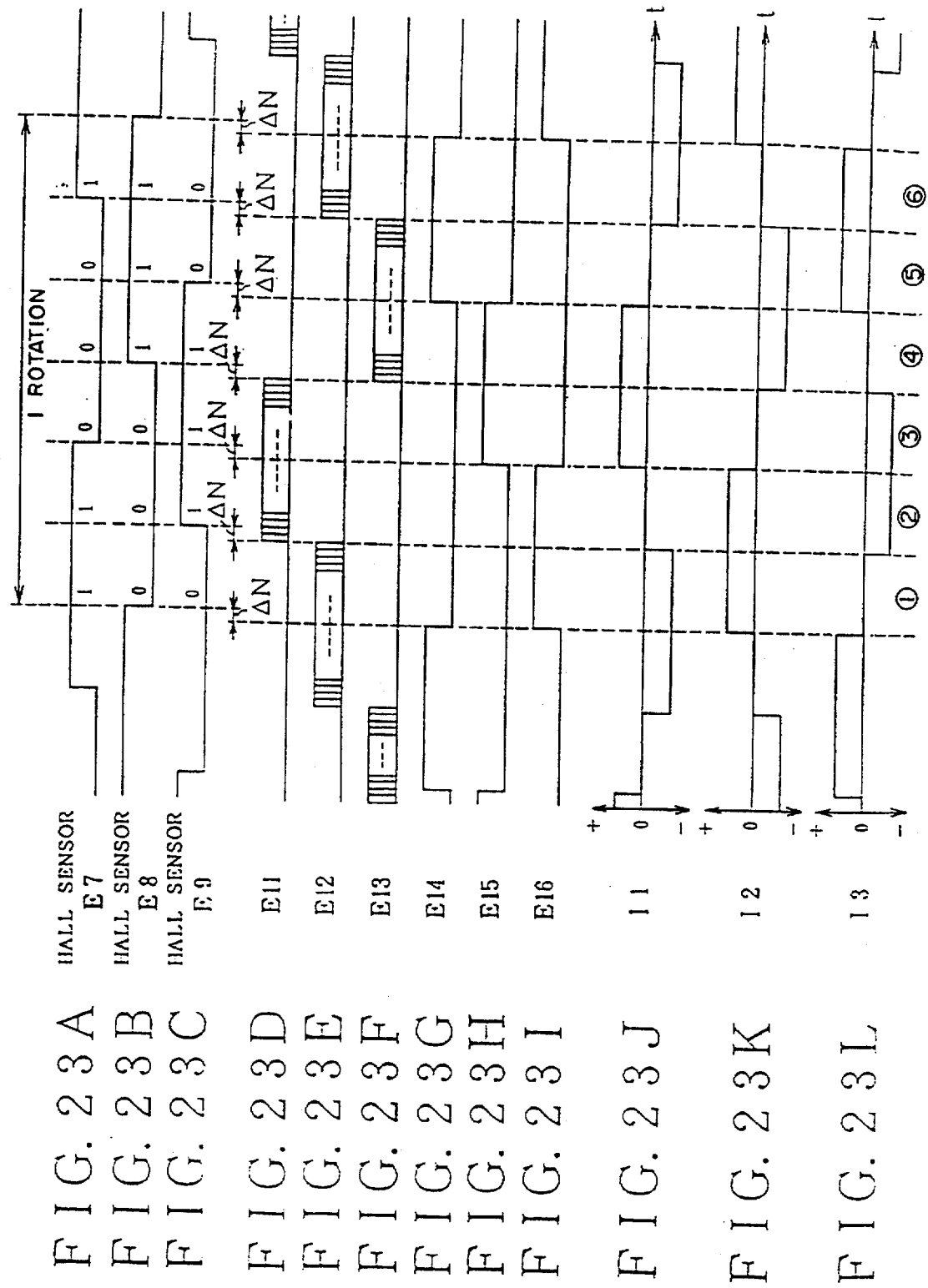

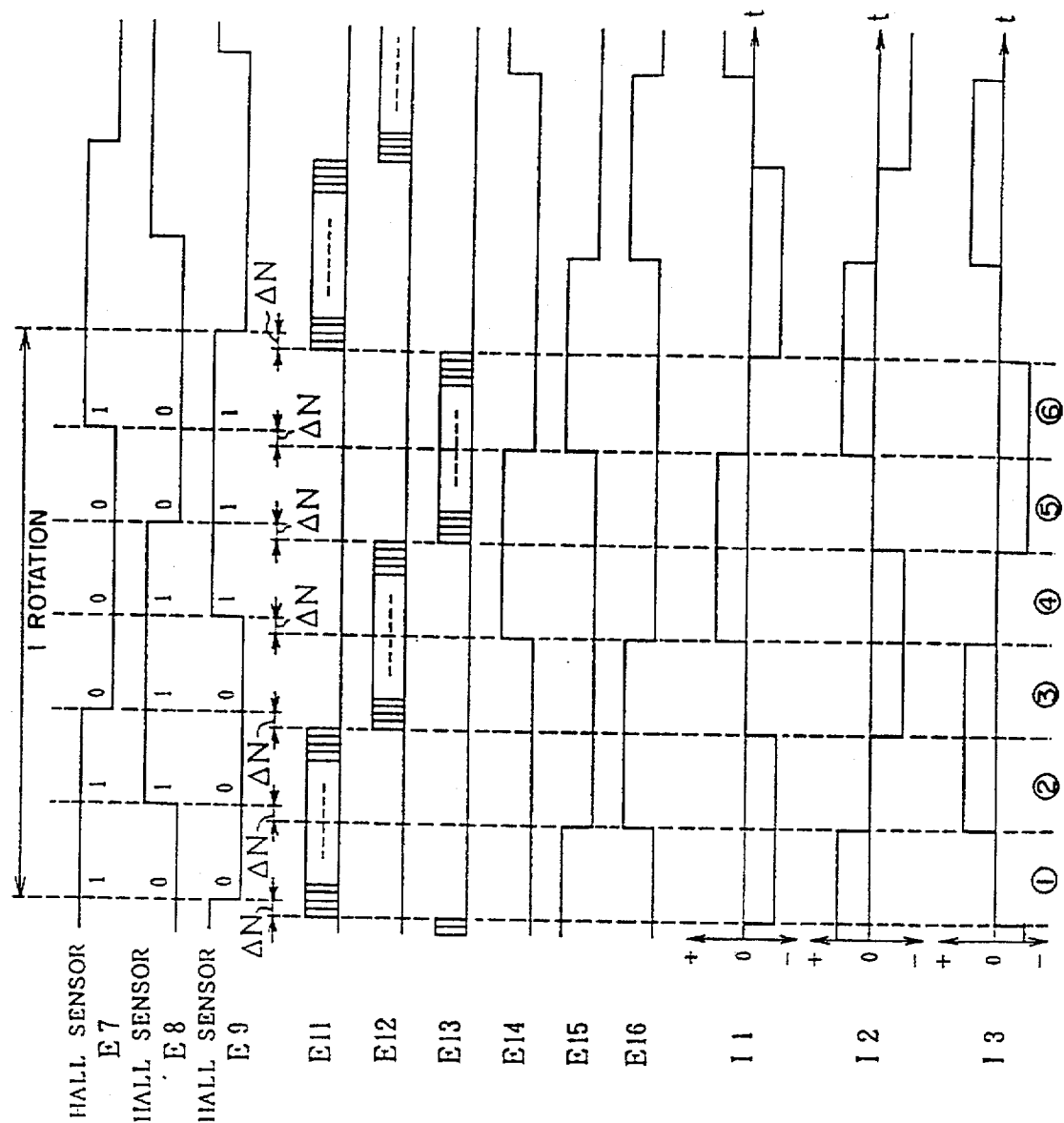

FIG. 25A

| PHASE | INFLOW SIDE FET | | | OUTFLOW SIDE FET | | | STATOR COIL | | |
|---|---|---|---|---|---|---|---|---|---|
| | 170-1 | 170-2 | 170-3 | 170-4 | 170-5 | 170-6 | 162-1 | 162-2 | 162-3 |
| ① | ○ | | | | ○ | | INFLOW | OUTFLOW | |
| ② | ○ | | | | | ○ | INFLOW | | OUTFLOW |
| ③ | | ○ | | | | ○ | | INFLOW | OUTFLOW |
| ④ | | ○ | | ○ | | | OUTFLOW | INFLOW | |
| ⑤ | | | ○ | ○ | | | OUTFLOW | | INFLOW |
| ⑥ | | | ○ | | ○ | | | OUTFLOW | INFLOW |

FIG. 25B

| PHASE | ADDRESS | DATA |
|---|---|---|
| ① | 100 | 100010 |
| ② | 110 | 100001 |
| ③ | 010 | 010001 |
| ④ | 011 | 010100 |
| ⑤ | 001 | 001100 |
| ⑥ | 101 | 001010 |

FIG. 33
|  | MACHINE SIDE TENSION VALUE | REEL SIDE TENSION VALUE | FRICTION TERM |
|---|---|---|---|
| FWD DIRECTION | ADD | SUBTRACT | + |
| REV DIRECTION | SUBTRACT | ADD | − |
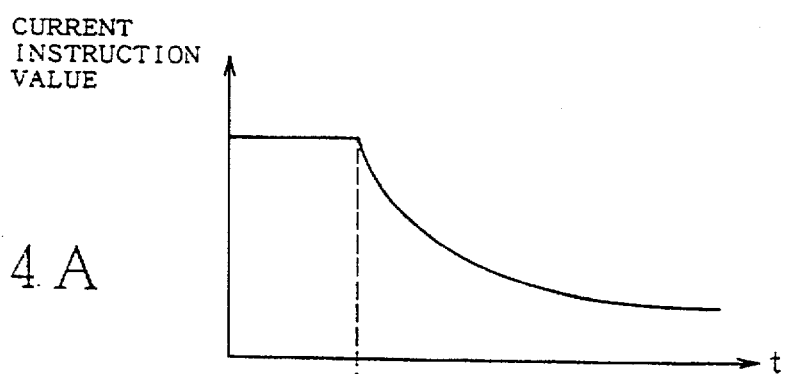
FIG. 34A
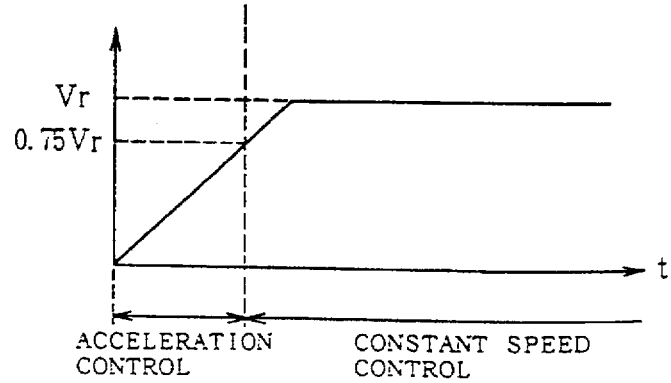
FIG. 34B

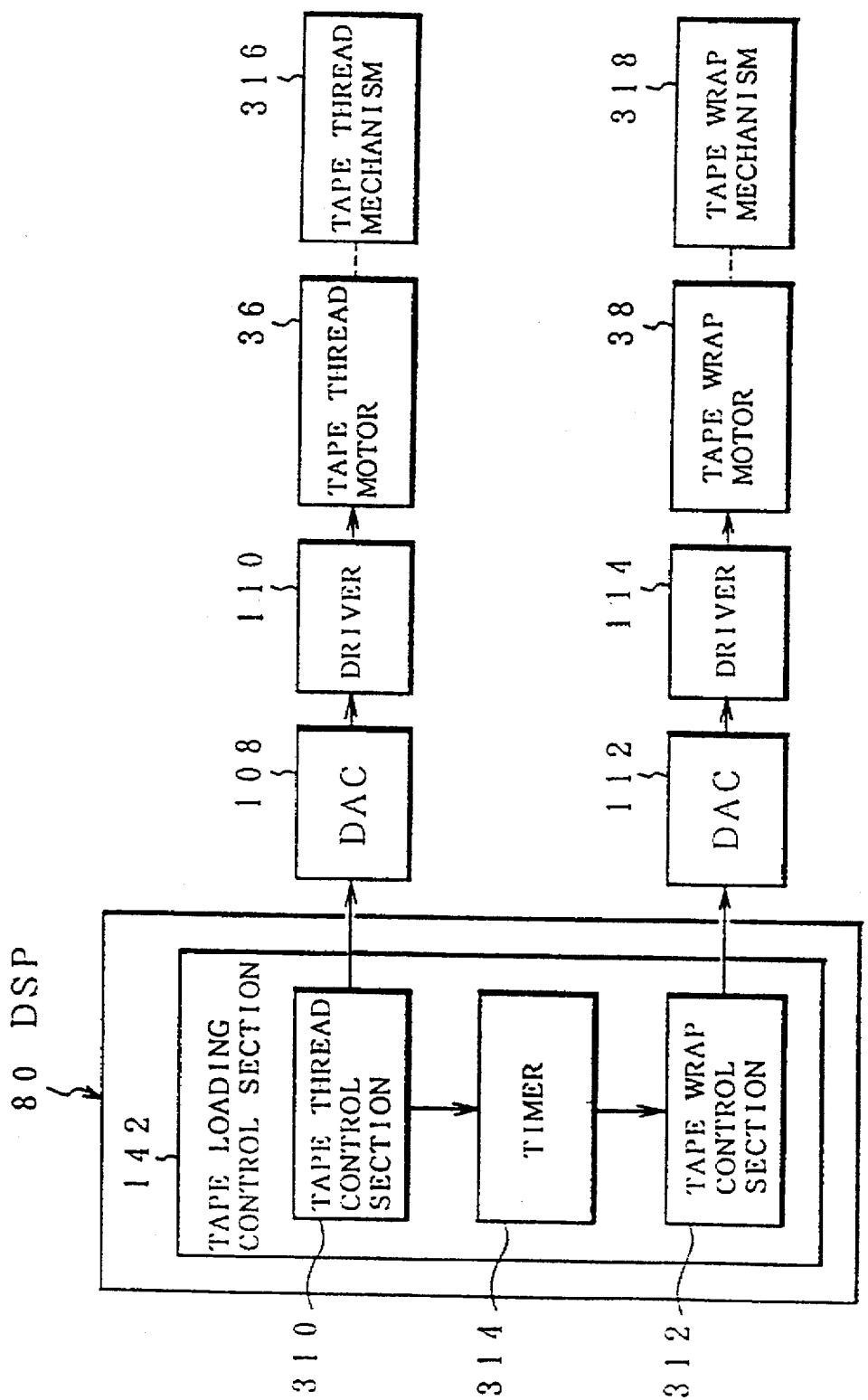

MAGNETIC TAPE APPARATUS

BACKGROUND OF THE INVENTION

The invention relates to a magnetic tape apparatus of a helical scan type for recording and reproducing data by using a rotary head and, more particularly, to a magnetic tape apparatus using a magnetic tape cartridge of a single reel.

Hitherto, a magnetic tape apparatus is used mainly in the field of a workstation. In such a kind of magnetic tape apparatus, an 8 mm cassette tape or a digital audio tape (DAT) in which a machine reel and a file reel are built is used as a tape medium. However, the 8 mm cassette and DAT cassette are formed mainly for a digital recording of audio sound and video images and are difficult to be used as a magnetic tape medium for computers. A 3480 cartridge tape of the single reel type known as an international standard is used as a tape for computers.

Hitherto, the magnetic tape apparatus using the 3480 cartridge tape records and reproduces information by using a fixed head. In the field of the 8 mm cassette and data cassette, however, a magnetic tape apparatus of the helical scan type using a rotary head has been put into practical use in order to raise a recording density. In accordance with such a tendency, even in the field of computers, there is a movement such that the helical scan type is used in the magnetic tape apparatus using the 3480 cartridge tape.

However, when the technique of the magnetic tape apparatus of the helical scan type which has conventionally been put into practical use for audio is applied to the magnetic tape apparatus of the helical scan type using the 3480 cassette tape of the single reel, the performance as an apparatus for data processing cannot be sufficiently satisfied because use methods and customer's needs differ. For example, in case of a repositioning operation (a kind of retrying operation) for again positioning a recorded track to the head in order to perform the recording or reproduction, in the type for audio, since the repositioning operation is executed while performing processes of images and audio sound, a positioning operation is performed on the basis of a block ID existing in the helical track. Therefore, it is necessary to interlock with a reproducing circuit section for recognizing a block ID address from reproduction data. In the apparatus for computers, however, the recording and reproduction are handled on a data unit basis of a block. Therefore, by setting the minimum block length to a helical track length, all of the recording and reproducing operations can be handled on a helical track unit. Consequently, it is not always necessary to reproduce the block ID in the helical track. Such a problem also similarly occurs in the high speed search for positioning a target position of the tape to the head.

In the helical scan type, on the other hand, a tape feed to a rotary head is performed by driving a capstan by a motor. A torque ripple occurring by the rotation of the capstan motor exerts an influence on a wow and flutter (speed fluctuation) of a tape run as one of the performances of the apparatus and affects a compatibility of the apparatus. Therefore, a suppression of the rotational torque ripple of the capstan motor is a large subject of a tape running system.

Further, the capstan motor is generally subjected to a pulse width control according to a current instruction voltage by using a 3-phase brushless DC motor having Hall sensors therein. In the brushless DC motor, a 3-phase coil switching operation is performed synchronously with a detection signal from the Hall sensor provided for each coil. In the switching operation of the coil phases synchronized with the Hall sensors, however, there is a slight time delay until a current actually flowing in the coil rises after a switching device such as a FET or the like is switched.

Therefore, an actual switching timing of the coil currents causes a delay for the switching timing of the Hall sensors and such a delay appears as a torque fluctuation. Such a torque fluctuation due to the delay of the coil switching timing also similarly occurs with respect to a drum motor of a rotary head provided for the tape running system, a file reel motor of a cassette, and a machine reel motor and exerts an influence on the wow and flutter (speed fluctuation) of the tape run.

Further, in the magnetic tape apparatus of the helical scan type, in order to extend a run durability of a tape medium, it is necessary to suppress a tape tension of the tape running system to tens of grams, preferably, 30 g or less. Such a tape tension is equal to or less than 1/10 as compared with that of a magnetic tape apparatus of the fixed head type. As for a tension control in a state in which the tape is run at a constant speed, a drive current of a reel motor on the supply side (take-out side) is reduced to a value that is smaller than a drive current of a reel motor on the take-up side by an amount of the tension, thereby executing what is called a back tension control. However, the drive current of the reel motor in the constant speed control is relatively low and lies within merely a control range of lower two or three bits when it is seen as a current instruction data value by, for example, a D/A converter of eight bits. Therefore, it is difficult to finely control the drive current of the reel motor on the supply side so as to set a tape tension to tens of grams or less at a resolution of about 2 to 3 bits. Although it is also considered to use a D/A converter having a resolution of 16 bits or 32 bits, a cost performance remarkably deteriorates. There are also many apparatuses such that a back tension is mechanically applied to the supply reel side by using a spring. However, according to such a method, the tension control cannot be accurately performed and a speed fluctuation or wow and flutter occurs due to a tension fluctuation.

Further, in the magnetic tape apparatus of the helical scan type using a cartridge of the single reel, when the cartridge is inserted, a tape threading operation such that a threader holds a reader block fixed to a tape edge and conveys to a machine reel and fixes to the reel center is executed. Subsequently, a tape wrapping operation such that a movable guide arranged at a backward moving position wraps a magnetic tape around a rotary head is performed. However, hitherto, until the end of the tape loading, the tape threading operation and the tape wrapping operation are sequentially executed, so that there is a problem such that it takes a time until an operating mode reaches a reproduction or recording ready mode from the insertion of the cartridge.

SUMMARY OF THE INVENTION

According to the present invention, first, there is provided a magnetic tape apparatus using a cartridge tape of a single reel type which can perform a repositioning and a high speed search of a tape without reproducing a helical track.

First, the magnetic tape apparatus of the invention has a tape running mechanism such that a cartridge in which a magnetic tape is wound around a single reel is loaded as a file reel and is taken out (threaded) to a machine reel on the apparatus side, and the magnetic tape is run by rotating the file reel and machine reel. The recording and reproduction of the magnetic tape are performed by a helical scan type using a rotary head.

The tape running mechanism has a capstan motor to feed the magnetic tape at a constant speed, a file reel motor to drive the file reel, and a machine reel motor to drive the machine reel. Further, the rotary head is rotated at a constant speed by a drum motor. A 3-phase brushless DC motor with a Hall sensor is used as a motor. A motor driver performs a coil switching synchronized with a detection signal of the Hall sensor. At the same time, a drive current is supplied to the switched coil by a pulse width control according to a current instruction voltage (current gain signal).

With respect to such a magnetic tape apparatus, according to the invention, when information is recorded, a control signal indicative of a start position of a helical track is recorded to a control track of the magnetic tape by a fixed head (control head). When information is again recorded or when the information is reproduced after the recording, a control pulse is reproduced from the recording signal on the control track. A repositioning section controls an operation for positioning the magnetic tape to a rotary head section upon recording or reproduction on the basis of the control pulse that is reproduced by the fixed head.

In a reposition processing section, a first counter counts a count value (C1) indicative of a tape run position by adding or subtracting the control pulses in accordance with a tape running direction. At the same time, a second counter counts the number of control pulses. However, when a reposition execution signal (Reposition Go) is received from an upper control section 12, the second counter stops the counting operation and latches a count value (C2). A count value (C0) indicative of a repositioning position is calculated by subtracting a predetermined stop delay distance (Sd) from the count value (C2) latched by the second counter. When the reposition execution signal is received, after the magnetic tape that is running at a constant speed is stopped, the tape is run in the reverse direction. When the count value (C1) of the first counter exceeds the count value (C0) at the repositioning position during the running at a constant speed in the reverse direction, the tape run is stopped and the tape is run at a constant speed in the original direction. During the constant speed run after the magnetic tape was returned, when the count value (C1) of the first counter coincides with the count value (C0) of the repositioning position, a completion notifying section notifies a reposition completion signal to the upper control section, thereby performing the recording or reproduction.

When the repositioning execution signal is received, a run control section sets a tape run to an acceleration or deceleration control of a linear slow. That is, when the reposition execution signal is received, the magnetic tape, which is running at a constant speed, is run at a constant speed for a predetermined distance and, after that, it is decelerated and stopped. After the magnetic tape is stopped, the tape is accelerated in the reverse direction and is run at a constant speed. When, the tape has passed through the repositioning position, the tape is run at a constant speed by a predetermined distance and is subsequently decelerated and stopped. Moreover, after the tape has was stopped, the tape is accelerated in the original running direction and is run at a constant speed.

In the repositioning operation, the run control section controls the capstan motor, file reel motor, and machine reel motor of the tape running mechanism.

To realize a high speed search, the magnetic tape apparatus for data processing of the invention has a high speed searching section for calculating a run distance to a target position designated by a block ID indicative of the number of data blocks of a predetermined length from the count value (C1) of the control pulses from the fixed head, thereby executing a high speed searching operation. The high speed searching section has a block ID demodulating section for demodulating a block ID signal by dividing the count value (C1) of the control pulses by the number (M) of control pulses per one block length. By multiplying the number (M) of control pulses per one block length to a value obtained by subtracting a block ID at the present position from a block ID at a target position, the number (C) of control pulses indicative of a distance to the target position is calculated.

Therefore, according to the invention, even in the helical scan type using the 3480 cartridge tape of the single reel type, at the time of the first recording after formatting, a control signal indicative of a helical track as a recording unit is recorded to a control track of the magnetic tape by the fixed head. At the time of the repositioning operation, on the basis of the count value of the pulses on the control track, the repositioning operation can be executed without reproducing an ID of the helical track. With respect to a high speed search, the high speed search of the target position can be easily similarly performed on the basis of the pulse count of the control track.

Second, according to the invention, there is provided a magnetic tape apparatus using a cartridge tape of a single reel type in which a wow and flutter is reduced by suppressing a torque ripple of a motor provided for a tape running system.

Therefore, the magnetic tape apparatus for data processing of the invention has a torque ripple measuring section for measuring a torque change of one rotation by rotating a capstan motor at a low speed by a predetermined current at the time of an initialization diagnosing process just after a power source was turned on. When a tape is run, on the basis of the result of the measurement of a torque ripple measuring section, a drive current to the capstan motor is corrected so as to reduce the torque change of one rotation. For example, a torque ripple measuring section samples a detection value of the drive current of the capstan motor synchronously with a pulse generated from a motor rotation sensor and a correction table in which a correction current value at each position of one rotation has been stored is formed. The capstan motor is feed-forward controlled on the basis of a correction value of the correction table.

To improve the wow and flutter performance, according to the magnetic tape apparatus of the invention, a driver section of the capstan motor using a brushless DC motor having Hall sensors of the number corresponding to the coil phases has a switching timing control section for switching the coil phases just before a switching timing of the coil phases based on detection signals of the Hall sensors. The switching timing control section is also provided with respect to a drum motor, a file reel motor, and a machine reel motor. As for the switching timing control, a switching interval of the coil phases by the detection signals of the Hall sensors when the motor reaches a constant rotational speed is set to a reference interval and is counted by a counter. A count value obtained by subtracting a predetermined value from the reference interval is set to a first switching interval of the coil phases, thereby setting the switching timing to an early timing. After that, the coil phases are switched at every reference interval. Further, a rotational torque ripple of the capstan motor to control a tape feed is previously measured. When the tape is run, by reducing a fluctuation amount by a feed-forward control, the wow and flutter can be suppressed as much as possible. At the same time, by setting the switching timing based on the detection signals of the Hall sensors of the motor of the tape running system to an early timing, the switching of the currents flowing in the coils is matched with the switching timing of the Hall sensors. The torque fluctuation at this time is suppressed, thereby improving the wow and flutter.

Third, according to the invention, a magnetic tape apparatus using a cartridge tape of the single reel type in which a micro back tension can be controlled by controlling a driver stage of a motor. For this purpose, a magnetic tape apparatus for data processes of the invention has a braking mode setting section for driving a reel motor on the tape supply side in a braking mode. A driver of a reel motor has a bridge circuit in which a first switching circuit for allowing a current to flow in and a second switching circuit for allowing the current to flow out are serially connected for each of coils which are star connected. In a normal mode at the time of the take-up operation, either one of the first and second switching circuits is driven by an AND signal of a pulse width control signal according to a current control signal and a coil switching signal based on the detection signals of the Hall sensors and the other switching circuit is driven by only the coil switching signal. On the other hand, in the braking mode at the time of the supplying operation, both of the first and second switching circuits are simultaneously driven by the AND signal of the pulse width control signal and coil switching signal. In this case, a regenerative braking circuit is formed at an OFF timing of the PWM, a reverse current is allowed to flow by a charging energy of the coil, and a driving torque is reduced by an amount of such a reverse current.

Therefore, the control of a micro back tension of tens of grams or less which cannot be realized by a control of a current gain by a D/A converter is switched so as to form a regenerative braking circuit of the coils at the OFF timing of the PWM control of the driver on the supply side, the torque on the supply side is reduced by only an amount of such a switching operation, and a micro back tension can be given.

Fourth, according to the invention, there is provided a magnetic tape apparatus using a cartridge tape of the single reel type which enables a processing performance for reducing a loading time until the recording or reproducing operation enters a ready state after a cartridge was inserted.

For this purpose, according to a magnetic tape apparatus for data processing of the invention, a thread mechanism for pulling out a front edge of a magnetic tape from a machine reel of a cartridge and loading it to a file reel and a tape wrap mechanism for wrapping a tape to a rotary head are made operative in parallel by a load control section. For example, the load control section activates a timer by starting the operation of the thread mechanism and subsequently starts the operation of the tape wrap mechanism by a time-out after the elapse of a predetermined time. A sensor is attached at a position of a thread locus in front of the machine reel and when a detection output of the tape front edge is derived from the sensor by the operation of the tape thread mechanism, the load control section starts the operation of the tape wrap mechanism. Further, the load control section has a counter for counting the number of rotation pulses of the file reel. When a count value of the counter reaches a predetermined value by the operation of the tape thread mechanism, the load control section starts the operation of the tape wrap mechanism. Further, it is also possible to construct in a manner such that a locking mechanism for mechanically stopping the operation of the tape wrap mechanism at a predetermined position in front of the machine reel is provided, and when a movable roller of the tape wrap mechanism which operates in parallel is moved to a wrapping completion position, a locking state of the locking mechanism is mechanically released, thereby restarting the threading operation.

The tape wrap mechanism uses a link mechanism such that one end of each of a pair of links is rotatably attached by an axis to a casing side and the links are mutually slidably arranged in a crossing manner by a coupling of a pin for a slide groove in the center portion. A pair of movable guides which can move along a guide groove on the casing side are attached to the other ends of the pair of links. A rotation of a tape wrapping motor is transferred to the axis of one link through a gear mechanism and by opening or closing the pair of links, the movable guides are moved between a wrapping start position and a wrapping completion position.

Therefore, when the cartridge is inserted, by executing the tape wrapping operation in parallel with the threading operation of the tape, a time until the apparatus enters a recording and reproducing standby state after the insertion of the cartridge can be reduced.

The above and other objects, features, and advantages of the present invention will become more apparent from the following detailed description with reference to the drawings.

BRIEF DESCRIPTION OF THE DRAWINGS

FIGS. 8A to 8E are explanatory diagrams of a repositioning operation;

FIG. 10 is a functional block diagram of a high speed search processing section in FIG. 6;

FIG. 11 is an explanatory diagram of a tape target position of a high speed search;

FIG. 16 is an explanatory diagram of measurement results;

FIG. 17 is an explanatory diagram of a correction table;

FIGS. 20A to 20L are timing chart for a CW rotation of the capstan motor;

FIGS. 21A and 21B are explanatory diagrams of switching conditions of FETs and coils which are used for a timing control of the CW rotation;

FIGS. 23A to 23L are timing charts for a CW rotation in which the switching timing is set to an early timing;

FIGS. 24A to 24L are timing charts for a CCW rotation of the capstan motor;

FIGS. 25A and 25B are explanatory diagrams of switching conditions of the FETs and coils which are used in a timing control of the CCW rotation;

FIG. 30 is an explanatory diagram in a driving state in which the FETs are simultaneously turned on;

FIG. 33 is an explanatory diagram of the positive and negative relations of tension values and a friction term in FIG. 27 for a rotating direction;

FIGS. 34A and 34B are explanatory diagrams of a current instruction value and a speed in a constant speed control from a reel acceleration;

FIG. 35 is a functional block diagram of a tape loading control section in FIG. 6 using a timer;

DETAILED DESCRIPTION OF THE PREFERRED EMBODIMENTS

[Whole Construction]

Figure 1:
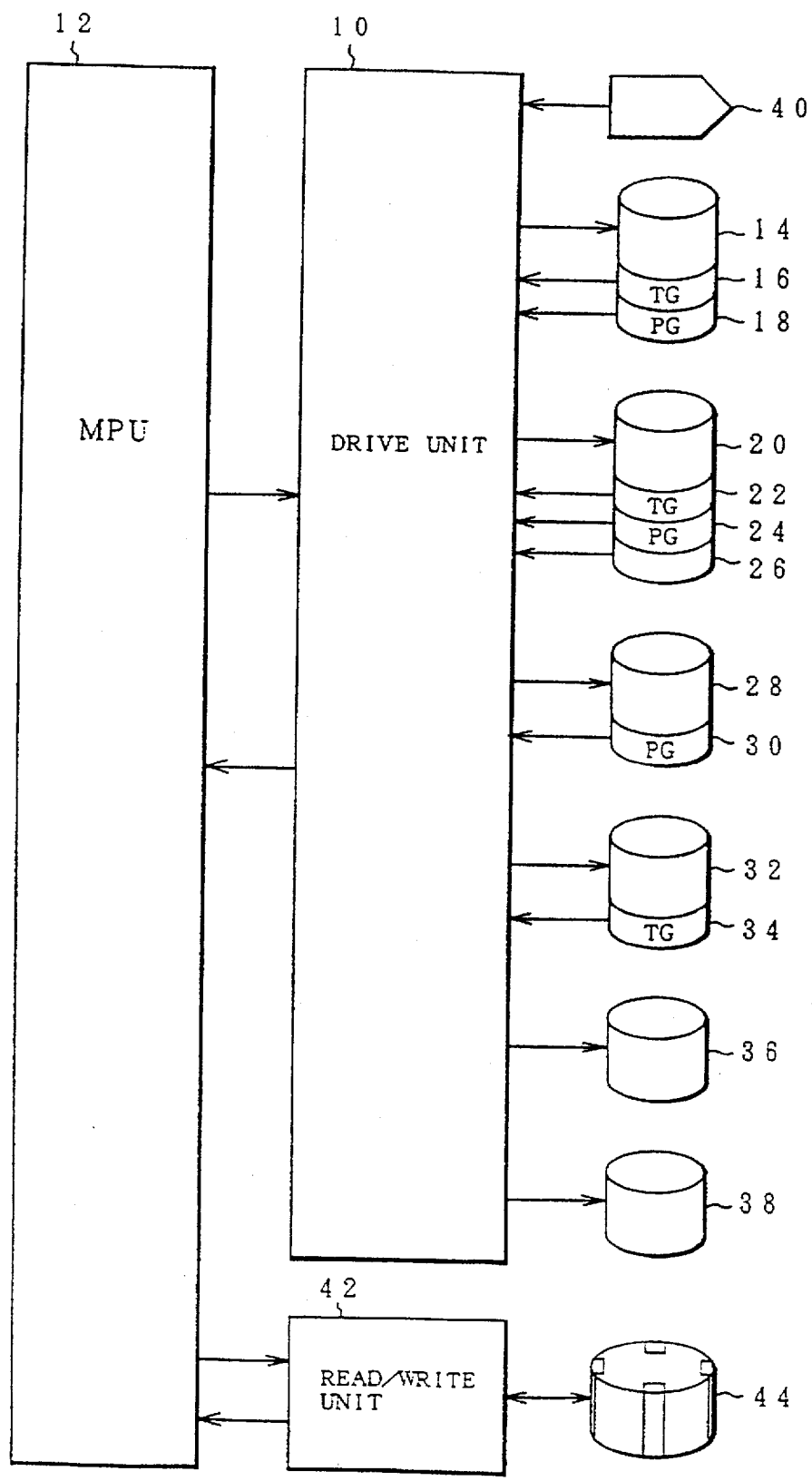
FIG. 1 is a whole block diagram of the invention.

FIG. 1 shows a whole construction of a magnetic tape apparatus of the invention. The magnetic tape apparatus of the invention is constructed by a drive unit 10 and an MPU 12 serving as an upper controller. A drum motor 14, a capstan motor 20, a file reel motor 28, a machine reel motor 32, a tape thread motor 36, and a tape wrap motor 38 are provided for the drive unit 10. A tacho generator 16 and a pulse generator 18 are coaxially provided for the drum motor 14. The tacho generator 16 generates one pulse per one rotation of the drum motor 14. One pulse per one rotation from the tacho generator 16 is hereinafter referred to as an index pulse. The pulse generator 18 generates, for example, 500 pulses per one rotation of the drum motor 14. Hereinafter, for instance, 500 pulses which are generated per one rotation from the pulse generator 18 are referred to as rotation pulses. A tacho generator 22 for generating an index pulse and a pulse generator 24 for generating rotation pulses are also similarly provided for the capstan motor 20. A 2-phase pulse generator 26 is also provided for the capstan motor 20. By generating two pulses of different phases from the 2-phase pulse generator 26, a rotating direction can be recognized. A pulse generator 30 is provided for the file reel motor 28 and generates, for example, 500 pulses per one rotation of the file reel motor 28. On the other hand, a tacho generator 34 is provided for the machine reel motor 32 and generates one index pulse per one rotation of the machine reel motor 32. Each of the drum motor 14, capstan motor 20, file reel motor 28, and machine reel motor 32 is a 3-phase brushless DC motor. Three Hall sensors are built in the 3-phase brushless DC motor in correspondence to three coil positions in order to produce a timing for switching the coils. On the other hand, a single-phase DC motor with a brush is used as each of the tape thread motor 36 and a tape wrap motor 38. A control head 40 is provided for the drive unit 10. On the other hand, a read/write unit 42 is provided for the MPU 12. The read/write unit 42 executes reading and reproducing operations for a magnetic tape by using a rotary head 44. The rotary head 44 is driven by the drum motor 14.

Figure 2:
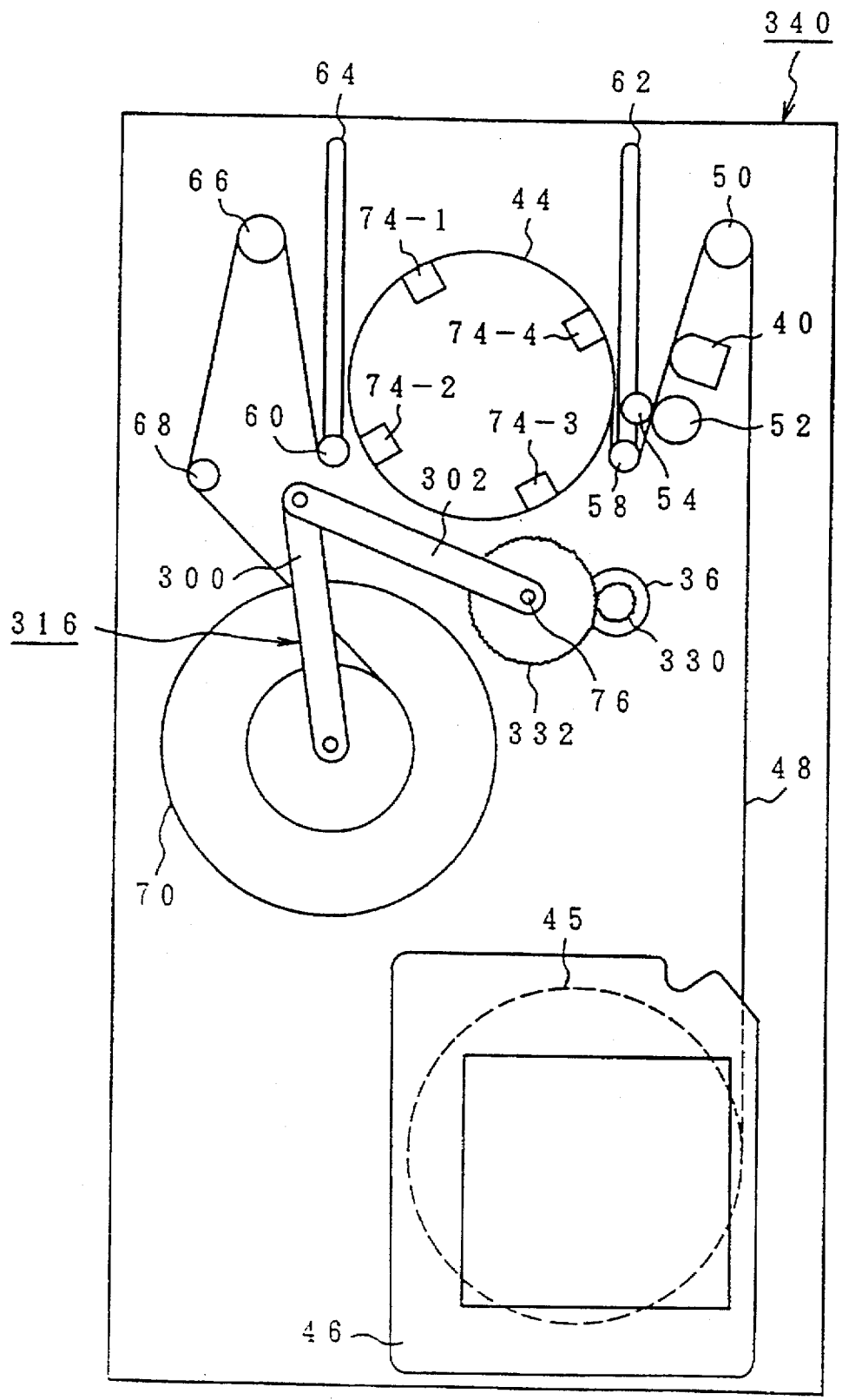
FIG. 2 is an explanatory diagram of a tape running mechanism of the invention.

FIG. 2 shows a mechanical structure of the drive unit 10 in FIG. 1. First, a magnetic tape as a recording medium uses a cartridge 46. As a cartridge 46, the 3480 cartridge tape known in the international standard is used. In the cartridge 46, a magnetic tape 48 is wrapped around a reel. The reel of the cartridge 46 is loaded to a rotary axis of the file reel motor of the apparatus main body and is used as a file reel 45. A front edge of the magnetic tape 48 pulled out from the file reel 45 is fixed to a machine reel 70. The magnetic tape 48 is pulled out from the cartridge 46 by using a threader mechanism 316 having a guide arm 300 and a rotary arm 302 which rotates around a rotary axis 76 of a gear 332 that is come into engagement with a gear 330 of the tape thread motor 36. A fixed guide 50, the control head 40, a capstan roller 52, a guide roller 54, a movable guide 58, the rotary head 44, a movable guide 60, a fixed guide 66, and a tension arm 68 are provided from the file reel 45 side for a tape run path starting from the file reel 45 of the magnetic tape 48 and reaching the machine reel 70. The rotary head 44 is rotated at a constant speed by the drum motor. Four heads 74-1 to 74-4 are arranged around the rotary head 44. In the embodiment, the magnetic tape 48 is wrapped in a range of 180° around the rotary head 44 by the movable guides 58 and 60. Obviously, a rotary drum of the rotary head 44 has a predetermined inclination for a vertical direction. When the magnetic tape 48 passes on the inclined drum surface, recording and reproducing operations are executed by the magnetic heads 74-1 to 74-4 by helical tracks which obliquely transverse the magnetic tape. Before the cartridge 46 is inserted, the movable guides 58 and 60 are located at edge portions of guide grooves 62 and 64 which are away from the rotary head 44. In association with a threader operation of the magnetic tape 48 to the machine reel 70 by the threader mechanism 316, a wrapping operation to wrap the magnetic tape 48 at a position shown in the diagram is executed. The file reel 45 of the cartridge 46 is driven by the file reel motor 28. The capstan roller 52 is driven by the capstan motor 20. The machine reel 70 is driven by the machine reel motor 32. Further, the rotary head 44 is driven by the drum motor 14. The threader mechanism 316 is driven by the tape thread motor 36. The movable guides 58 and 60 are driven by the tape wrap motor 38. Among those motors, although the rotating direction of the drum motor 14 to rotate the rotary head 44 has been decided to a predetermined direction, the other motors are driven in both of the forward and reverse rotations.

Figure 3:
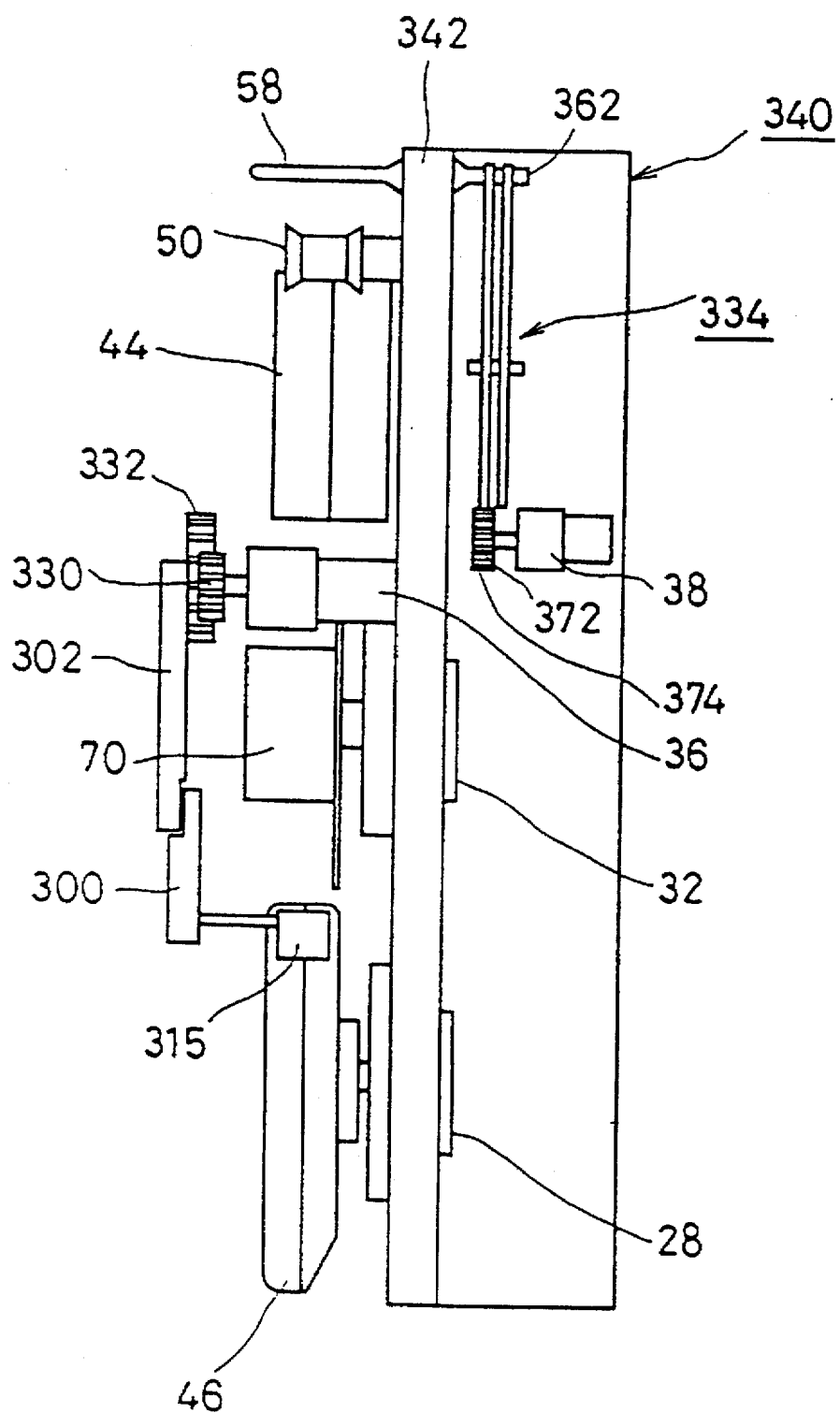
FIG. 3 is a side elevational view of FIG. 2.

FIG. 3 shows a structure when FIG. 2 is seen from the side. The file reel motor 28 and machine reel motor 32 are attached to a supporting plate 342 of an apparatus main body 340. The cartridge 46 loaded from the outside is attached to the rotary axis of the file reel motor 28. The machine reel 70 is attached to a rotary axis of the machine reel motor 32. Thread motor 36 is attached onto the supporting plate 342. The gear 330 is fixed to a rotary axis of the thread motor 36. The gear 332 is in engagement with the gear 330. The rotary arm 302 is attached to the rotary axis of the gear 332. The guide arm 300 is coupled to the rotary arm 302. A pin 304 is provided at an edge of the guide arm 300 and is fitted into a reader block 315 attached to a tape front edge of the cartridge 46. A link mechanism 334 for tape wrapping is provided on the rear side of the rotary head 44. The link mechanism 334 is driven by the tape wrap motor 38 and moves the movable guides 58 and 60 to a position at which the magnetic tape 48 is wrapped around the rotary head 44 as shown in FIG. 2. The details of the link mechanism 334 will be obviously understood by an explanation hereinlater.

Figure 4:
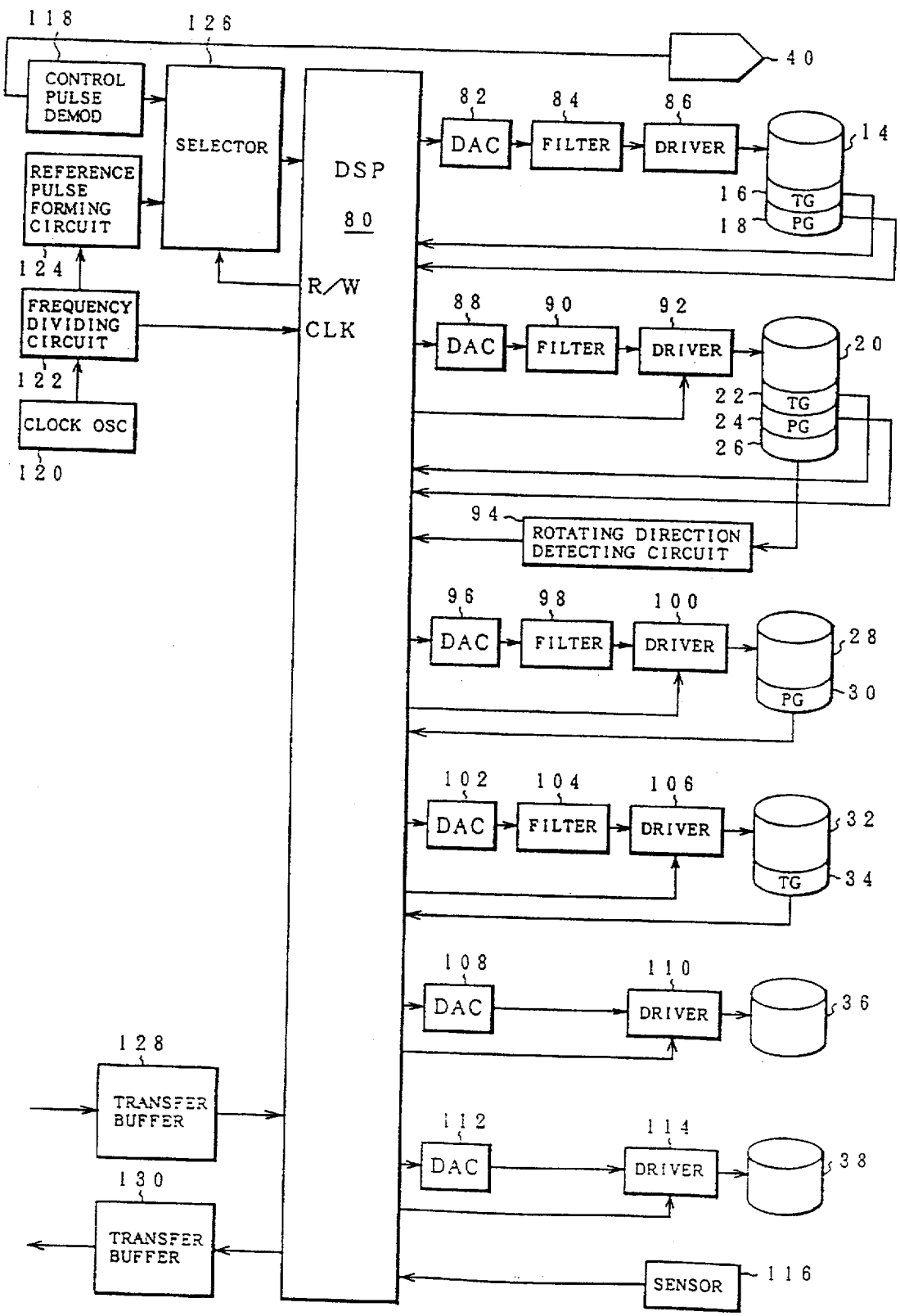
FIG. 4 is a block diagram of a drive unit in FIG. 1.

FIG. 4 shows a hardware construction of the drive unit 10 in FIG. 1. In the embodiment, a digital signal processor (hereinafter, simply referred to as a DSP) 80 as control means is used. A D/A converter 82, a filter 84, and a driver 86 are provided for the drum motor 14. A D/A converter 88, a filter 90, and a driver 92 are provided for the capstan motor 20. An output of the 2-phase pulse generator of the capstan motor 20 is supplied to a rotating direction detecting circuit 94. The circuit 94 generates a signal indicating whether a tape running direction that is determined by a motor rotating direction is a forward direction (hereinafter, referred to as an FWD direction) or a reverse direction (hereinafter, referred to as an REV direction). The FWD direction denotes the case where the magnetic tape 48 is run from a begin of tape (BOT side) to an end of tape (EOT side). The REV direction denotes the case where the magnetic tape is run from the end of tape (EOT side) to the begin of tape (BOT side).

A D/A converter 96, a filter 98, and a driver 100 are provided for the file reel motor 28. A D/A converter 102, a filter 104, and a driver 106 are provided for the machine motor 32. A D/A converter 108 and a driver 110 are provided for the tape thread motor 36. A D/A converter 112 and a driver 114 are provided for the tape wrap motor 38. A sensor 116 is used to detect the position of the tape in the tape threading operation. Since the drum motor 14 rotates the rotary head 44 in a predetermined direction, a direction switching signal to the driver 86 is not outputted. On the other hand, signals each for controlling the rotating direction are outputted from the DSP 80 to the drivers 92, 100, 106, 110, and 114 of the capstan motor 20, file reel motor 28, machine reel motor 32, tape thread motor 36, and tape wrap motor 38. Each of the drivers 86, 92, 100, and 106 is a circuit to drive a brushless DC motor on the basis of a detection signal from the Hall sensor. On the other hand, each of the drivers 110 and 114 is a simple circuit to forwardly or reversely rotate a single-phase DC motor with a brush by a predetermined current gain.

Figure 5:
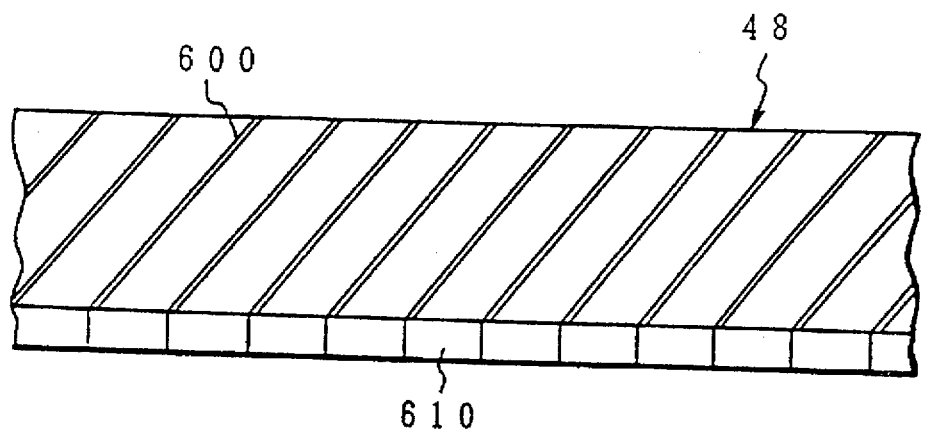
FIG. 5 is an explanatory diagram of a tape recording state of a helical scan type.

The control head 40 records and reproduces a control pulse to a control track of the magnetic tape 48. FIG. 5 shows a recording state of the magnetic tape 48. The recording operation is performed to the magnetic tape 48 by a helical track 600 by the rotary head 44. A control track 610 which is recorded and reproduced by the control head 40 as a fixed head is provided for in the tape run direction for the helical track 600. When the first recording of the helical track 600 is performed by the rotary head 44, one control pulse signal 612 is recorded in the control track 610 per one helical track 600. Since a recording length of the helical track 600 has been predetermined, by defining the helical track recording length as a minimum data block length of the magnetic tape apparatus of the invention, the reading and writing operations of data for the magnetic tape 48 are executed on a unit basis of a block length that coincides with the helical track length. Therefore, as for the control pulse signal 612 in the control track 610, one control pulse shows one data portion. By counting the number of control pulses in the control track 610, a position of the helical track on the magnetic tape 48 can be specified.

Referring again to FIG. 4, a read signal of the control head 40 is supplied to a control pulse demodulating circuit 118. A reference pulse corresponding to the control pulse is supplied to a selector 126 from a reference pulse forming circuit 124. The reference pulse forming circuit 124 forms the reference pulse by frequency dividing a clock pulse from a clock oscillator 120 by a frequency dividing circuit 122. The frequency divided pulse of the frequency dividing circuit 122 is supplied as a reference clock CLK to the DSP 80. At the time of the first recording operation (writing operation) after the magnetic tape 48 was formatted, the selector 126 selects the reference pulse from the reference pulse forming circuit 124 and supplies as a control pulse to the DSP 80. On the basis of the reference pulse, the DSP 80 writes the control pulse signal 612 to the control track 610 of the magnetic tape 48 by using the control head 40 synchronously with the helical track 600. After completion of the writing operation to the control track 610, the selector 126 selects the control pulse demodulating circuit 118 at the time of the subsequent rerecording and reproducing operations and the control pulse read by the control head 40 is fetched.

Signal transmission and reception between the DSP 80 and the MPU 12 as an upper controller are executed by using transfer buffers 128 and 130. Various kinds of command control parameters from the MPU 12 are received via the transfer buffer 128. A data status response or the like from the DSP 80 to the upper MPU 12 is executed by using the transfer buffer 130. Therefore, the transfer buffers 128 and 130 are used as communication buffers between the MPU 12 and the DSP 80. Specifically speaking, the MPU 12 and DSP 80 execute the writing and referring operations to the transfer buffers 128 and 130 at respective timings.

Figure 6:
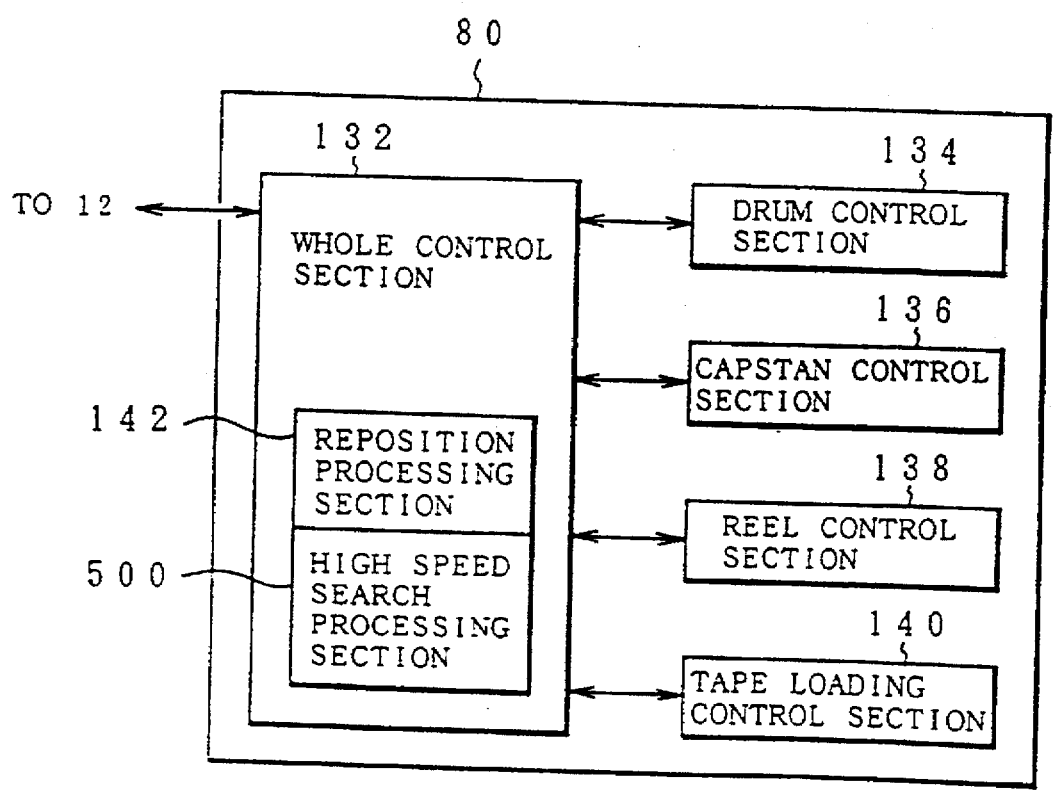
FIG. 6 is a functional block diagram of a DSP in FIG. 4.

FIG. 6 is a functional block diagram of the magnetic tape apparatus of the invention that is realized by a program control of the DSP 80 in FIG. 4. A whole control section 132 is provided for the DSP 80. A drum control section 134, a capstan control section 136, a reel control section 138, and a tape loading control section 140 are provided for the whole control section 132. The drum control section 134, capstan control section 136, and reel control section 138 drive and control motors which are necessary for a tape run under a control of the whole control section 132. The tape loading control section 140 receives an instruction from the whole control section 132 and executes a tape threading operation and a tape wrapping operation when the cartridge 46 is inserted. The whole control section 132 has functions of a reposition processing section 142 and a high speed search processing section 500. When an instruction of a repositioning operation is received from the MPU 12, the reposition processing section 142 executes the repositioning operation while controlling the capstan control section 136 and reel control section 138. Similarly, when a high speed search instruction is received from a high speed search command section of the MPU 12, the high speed search processing section 500 executes a high speed searching operation while controlling the capstan control section 136 and reel control section 138.

[Repositioning Operation]

Figure 7:
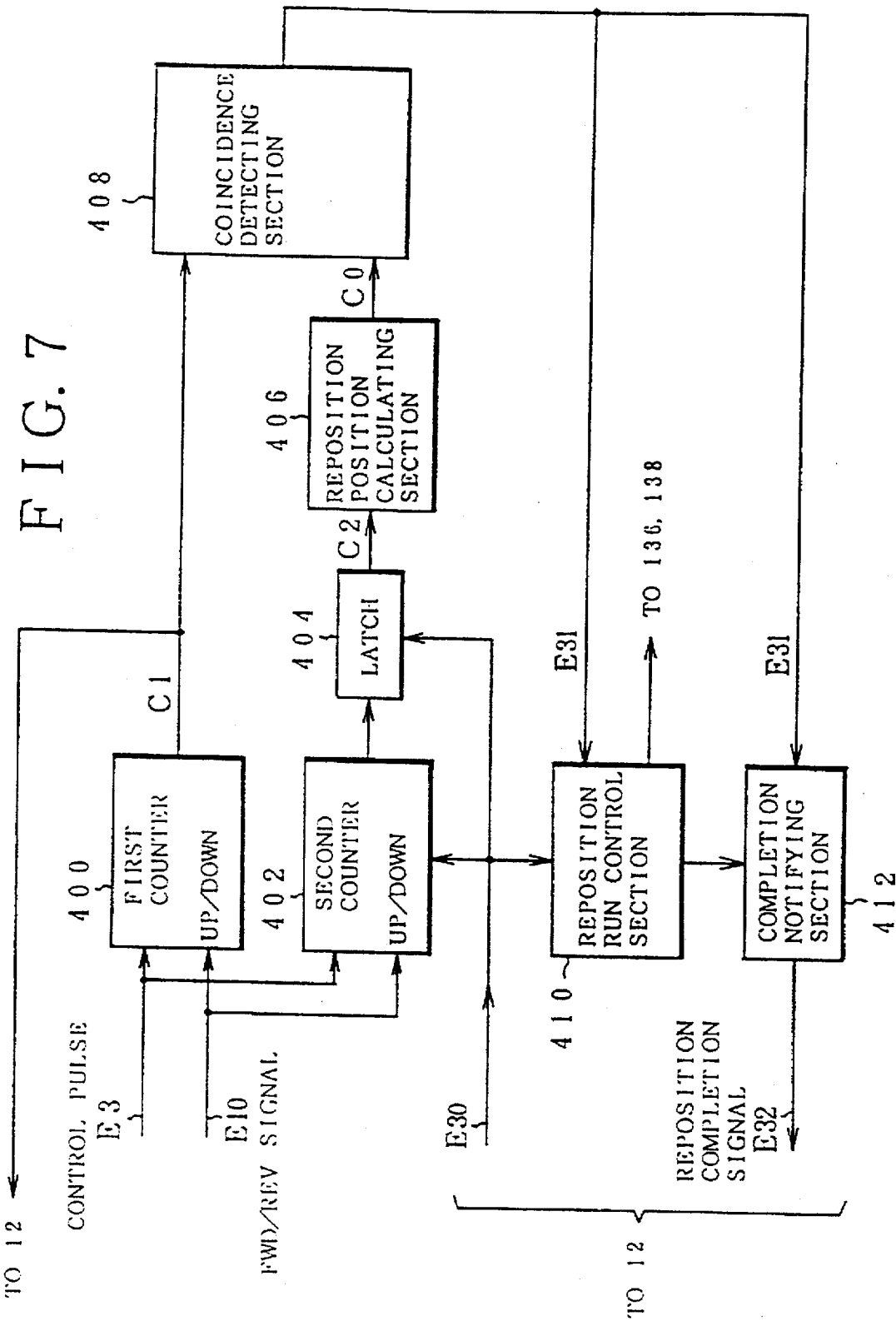
FIG. 7 is a functional diagram of a reposition processing section in FIG. 6.

FIG. 7 shows the details of the reposition processing section 142 of the DSP 80 in FIG. 6. A first counter 400 counts the number of control pulses E3 derived from the control head 40. An up-counting and a down-counting of the first counter 400 are controlled by an FWD/REV signal E10. In case of the FWD direction, the first counter 400 up-counts the control pulses E3. In case of the REV direction, the first counter 400 down-counts. A count value of the first counter 400 is set to C1. A second counter 402 counts the number of control pulses E3 in parallel with the first counter 400. In addition to the above counting, when a reposition execution signal E30 is received from the MPU 12, the second counter 402 stops the counting operation and latches a count value in this instance into a latch 404 as C2. A reposition position calculating section 406 calculates a count value C0 indicative of the reposition position on the basis of the count value C2 latched in the latch 404 and a predetermined stop delay distance Sd. A coincidence detecting section 408 detects that the count value C1 of the first counter 400 coincides with the count value C0 of the reposition position calculated by the reposition position calculating section 406. A reposition run control section 410 instructs a run control for a repositioning operation to the capstan control section 136 and reel control section 138 in FIG. 6 on the basis of the reposition execution signal E30 from the MPU 12 and a coincidence detection signal E31 from the coincidence detecting section 408. A completion notifying section 412 outputs a reposition completion signal E32 to the MPU 12 when the coincidence detection signal E31 from the coincidence detecting section 408 is received after a predetermined reposition tape run is completed by the reposition run control section 410.

FIGS. 8A to 8E show the repositioning operation by the reposition processing section in FIG. 7. In FIG. 8A, an axis of ordinate indicates a tape running speed and an axis of abscissa shows a tape position on the assumption that the head runs on the tape. The tape speed shown by the axis of ordinate indicates the speed in the FWD direction on the plus side and the speed in the REV direction on the minus side. The repositioning operation is started at a position 414 in FIG. 8A. The repositioning operation is executed as a retry operation for an error occurrence during the recording or reproducing operation for the magnetic tape. When the repositioning operation is started at the position 414, a reposition position has previously been known. Such a reposition position assumes a position 428. First, the magnetic tape is acceleration controlled (415) in the FWD direction. After completion of the acceleration control 415, a constant speed control 416 is performed. An upper apparatus monitors an arrival at the reposition position 428 from the count value of the control pulses in FIG. 8C. When the reposition position 428 is discriminated during the constant speed control 416, a transmitting operation of the reposition execution signal to the DSP 80 is executed. There is a time delay corresponding to the predetermined stop delay distance Sd from a time point after the reposition execution signal was generated from the MPU 12 to a time point when it is actually received and analyzed by the DSP 80. Therefore, the reposition execution signal E30 in FIG. 8B is received at a position 418 that passed through the reposition position 428 by only the stop delay distance Sd. When the reposition execution signal E30 is received at the position 418, as shown in FIG. 8B, the counting of the control pulse E3 of the second counter 402 is stopped and the count value C2 is latched. As shown in FIG. 8D, since the first counter 400 counts the control pulses in FIG. 8C and the right side corresponds to the FWD direction, the count value C1 increases as shown by a straight line 436. Similarly, the second counter 402 also counts control pulses (E) as shown by a straight line 438 in FIG. 8E. The count value C2 is latched at the position 418 at which the reposition execution signal E30 is obtained. When the reposition execution signal E30 is received at the position 418, the tape is further run at a constant speed by a predetermined distance and, after that, the control is switched to a deceleration control 420. When the tape run is stopped by the deceleration control 420 and the tape reaches a stop position 422, an acceleration control 424 in the REV direction as a reverse direction is subsequently executed. When the tape speed reaches a predetermined speed by the acceleration control 424, a constant speed control 426 in the REV direction is performed, thereby returning the magnetic tape to the original position.

In the coincidence detecting section 408 in FIG. 6, the count value C0 at the reposition position 428 is calculated as $$C0 = C2 - Sd$$

by the reposition position calculating section 406 on the basis of the count value C2 of the second counter 402 obtained by the reception of the reposition execution signal and the predetermined stop delay distance Sd. The count value C0 is set into the coincidence detecting section 408. Therefore, the count value C1 of the first counter 400 decreases as shown by the straight line 436 in FIG. 8D by the constant speed control 426 in the REV direction. When the tape reaches the reposition position 428, the count value C1 coincides with the count value C0 at the reposition position and the coincidence detection signal E31 is obtained. When it is detected that the tape was returned to the reposition position 428, the control is switched to a deceleration control 430 after the tape is run at a constant speed by a predetermined distance. When the tape passes through the stop position 432, the control is again switched to the acceleration control 434 in the inherent FWD direction. After completion of the acceleration, the control is shifted to a constant speed control 435. When the constant speed control 435 is executed and the tape position again reaches the reposition position 428, the coincidence between the count value C0 at the reposition position and the count value C1 of the first counter 400 is detected by the coincidence detecting section 408, so that the coincidence detection signal E31 is again outputted. In this instance, after the reposition run control section 410 returned the magnetic tape to the reposition position 428, it runs the tape in the original direction. Thus, the completion notifying section 412 is set into an enable state. When the coincidence detection signal E31 is obtained at this stage, the reposition completion signal E32 is sent to the MPU 12. When the reposition completion signal E32 is received, the MPU 12 instructs the writing operation or reading operation in association with the completion of the repositioning operation to the read/ write unit 42 (refer to FIG. 1), thereby executing the retry operation for recording or reproduction from the reposition position 428.

Figure 9A:
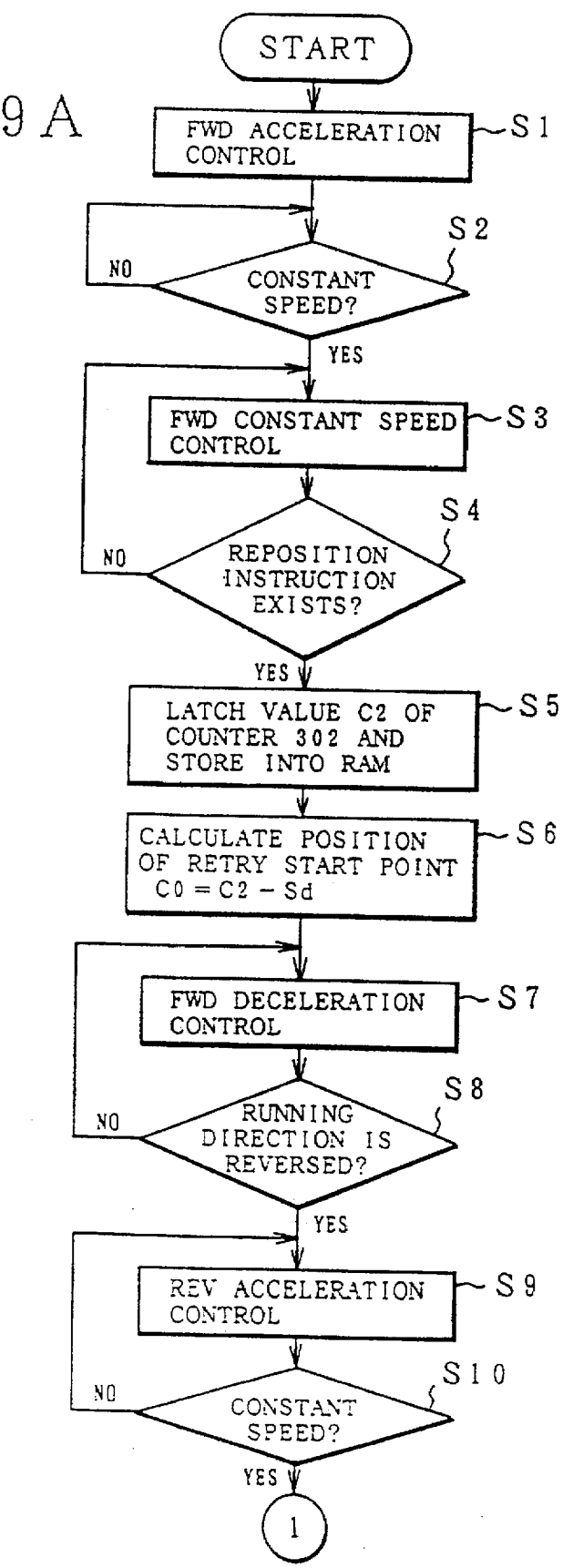
FIGS. 9A and 9B are flowcharts for a repositioning process.
Figure 9B:
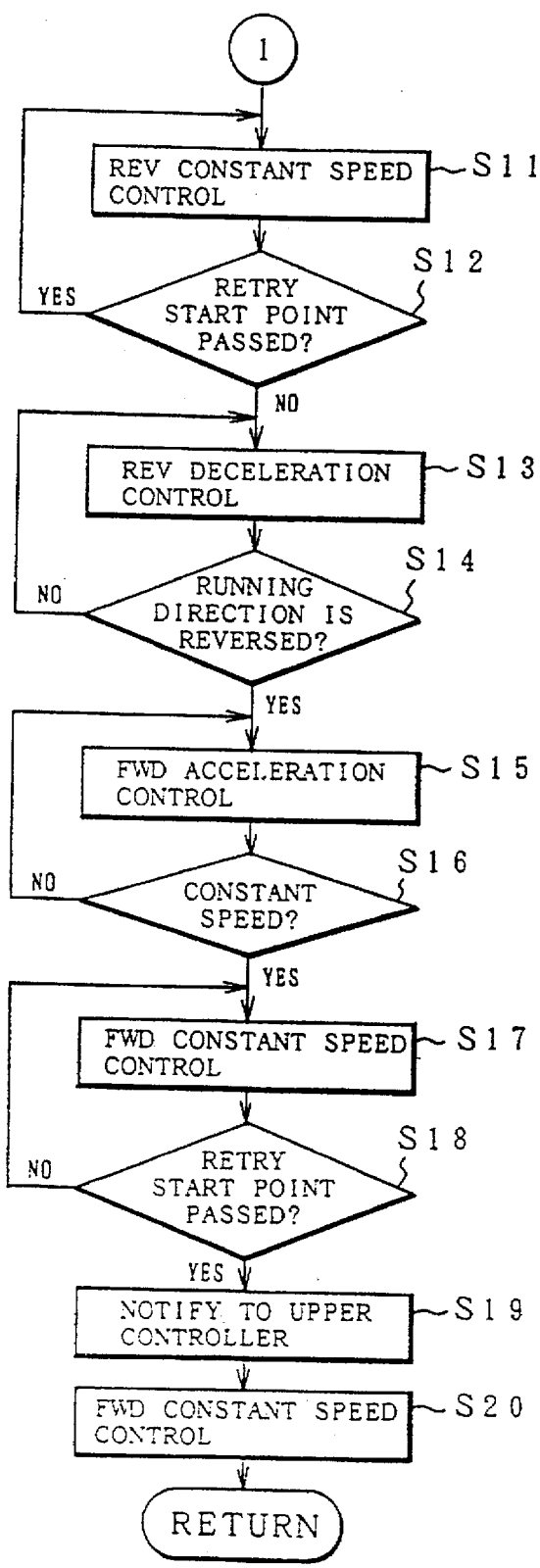

Flowcharts of FIGS. 9A and 9B relate to a process of the repositioning operation in FIGS. 8A to 8E and show a repositioning process during the constant speed run in the FWD direction as an example. First in step S1 in FIG. 9A, the tape is acceleration controlled in the FWD direction. When the tape speed reaches a constant speed in step S2, the control is switched to the constant speed control in the FWD direction in step S3. During the constant speed control, the presence or absence of the reposition instruction is checked in step S4. When the reposition instruction is received, the count value C2 of the second counter 402 is latched and stored into the RAM in step S5. In step S6, the count value C0 indicative of the reposition position as a retry start point is calculated. In step S7, the deceleration control in the FWD direction is performed. In step S8, a check is made to see if the running direction is reversed due to the stop of the tape run or not. When the reversal of the running direction is discriminated, the acceleration control in the REV direction is executed in step S9. When the tape speed reaches the constant speed in step S10, the constant speed control in the REV direction is performed in step S11 in FIG. 9B. In step S12, whether the tape passed through the reposition position as a retry start point or not is judged by checking whether the count value C0 at the reposition position coincides with the count value C1 of the first counter 400 or not. When the passage through the retry start point is judged, the deceleration control in the REV direction is performed in step S13. In step S14, when the tape run stops and the reversal of the direction is discriminated, the acceleration control in the FWD direction is executed in step S15. When the tape speed reaches the constant speed in step S16, the constant speed control in the FWD direction is performed in step S17. In step S18, a check is made to see if the tape has passed through the reposition position as a retry start point during the constant speed control in the FWD direction or not. When the passage through the reposition position is judged, the reposition completion signal is notified to the MPU 12 as an upper controller in step S19. The FWD constant speed control is continued in step S20.

[High Speed Searching Operation]

FIG. 10 is a functional block diagram of a high speed searching process according to the invention. The high speed search is realized by a lower high speed search processing section 500-1 in the DSP 80 in FIG. 6 and an upper high speed search processing section 500-2 on the MPU 12 side together shown in FIG. 10. A first counter section 400 to count the control pulses in accordance with the tape running direction is provided for the lower high speed search processing section 500-1. A register 504 is also provided. A count value (C) of the control pulses indicative of a target position to perform the high speed search by the high speed search processing section 500-2 of the MPU 12 is set into the register 504. A coincidence detecting section 506 compares the target count value (C) of the register 504 and the count value C1 of the first counter 400 and outputs a coincidence detection output to a high speed run control section 508. The high speed run control section 508 receives an activation signal from the high speed search processing section 500-2 of the MPU 12 and controls the capstan control section 136 and reel control section 138 in FIG. 5, thereby running the magnetic tape at a high speed. When the coincidence detection is derived from the coincidence detecting section 506 during the high speed run, a high speed search completion signal is outputted as status information to the upper high speed search processing section 500-2. A block ID demodulating section 502 is provided for the MPU 12. The block ID demodulating section 502 demodulates a block ID of a helical track in the magnetic tape on the basis of the count value C1 of the control pulses by the first counter 400 of the drive unit 10. As shown in FIG. 5, one helical track 600 corresponds to one control pulse 612 of the control track 610. Therefore, one control pulse Gives the minimum data block length. The MPU 12 can arbitrarily decide a block length as a recording and reproducing unit for the magnetic tape. The block length is integer times as long as a helical track length. For example, in case of setting eight helical tracks to one block, the block ID demodulating section 502 judges that one block ID is obtained by eight control pulses. Specifically speaking, by setting the number (M) of control pulses constructing one block into the block ID demodulating section 502, the block ID demodulating section 502 can demodulate the block ID as a value (C1÷M) that is calculated by dividing the count value C1 of the first counter 400 obtained at the present time point by (M). A high speed search command section 501 of the MPU 12 obtains a target block ID as, for instance, a block ID=N as an analysis result of a command based on an input/output command from an upper apparatus. Subsequently, a value (N×M) is calculated by multiplying the number (M) of control pulses per one block to the target block ID=N. The value (N×M) is set into the register 504 on the drive unit 10 side as a count value (C) indicative of the target position.

FIG. 11 shows the relation between a target block by the high speed search command section 501 of the MPU 12 and the control pulse indicative of the position of the target block. Now assuming that the block ID at the present position is set to ID=K and the block ID at the target position is set to ID=N, the block ID=N at the target position corresponds to (C=N×M) pulses when it is converted to a count value of the control pulses. The number of blocks corresponding to a distance from the present position to the target position is equal to (N−K). When it is expressed by the number of control pulses, the distance to the target position is equal to [(N−K)×M]. As mentioned above, if the distance from the present position to the target position is known as the number of control pulses, by supplying the distance to the target position to the high speed run control section 508, a high speed run control according to patterns of the acceleration, constant speed, and deceleration can be realized.

Figure 12:
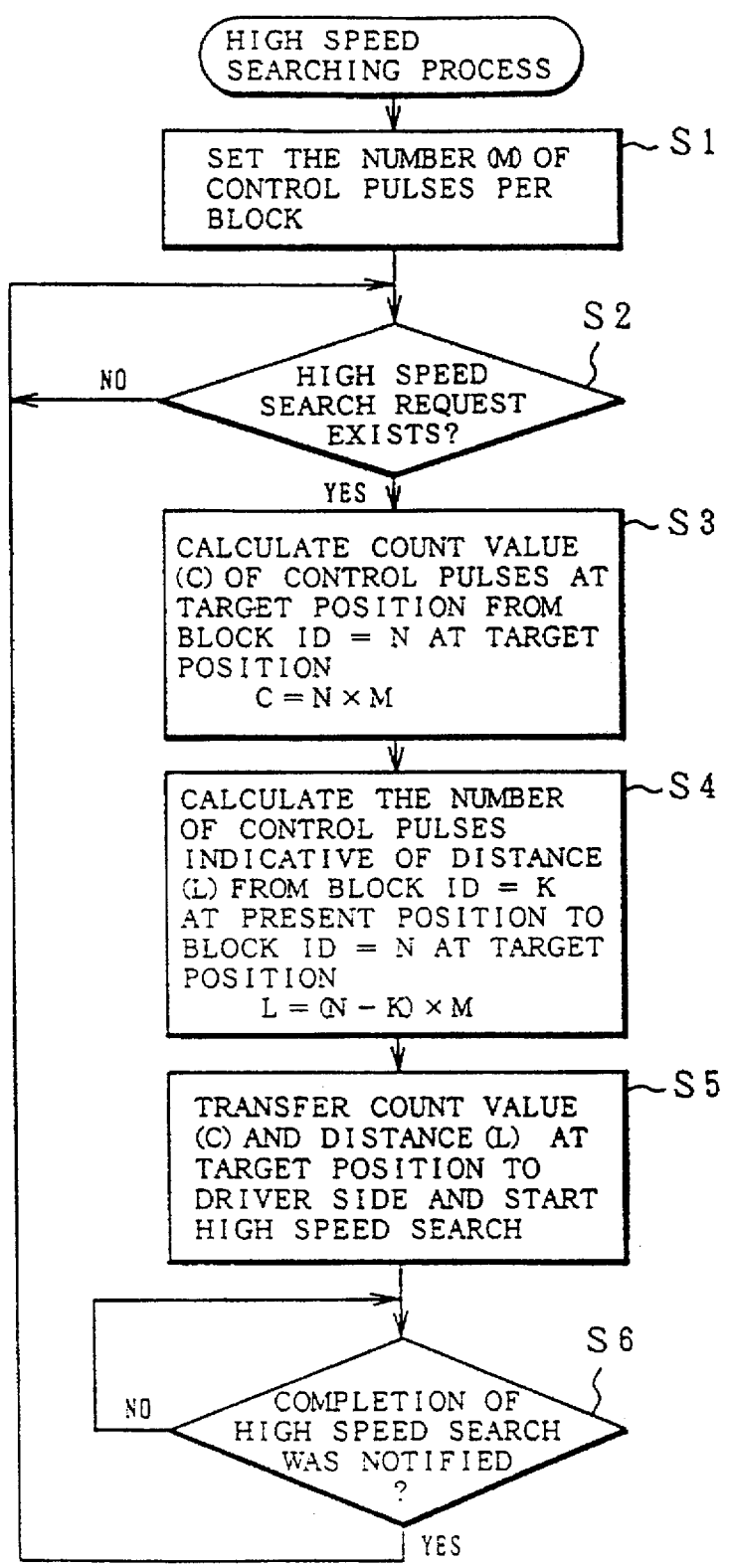
FIG. 12 is a flowchart for a high speed searching process.

A flowchart of FIG. 12 relates to a high speed searching process. First in step S1, the number (M) of control pulses per one block is set as an initial operation. When a high speed search request is judged in step S2, the number (M) of control pulses per one block set in step S1 is multiplied to the block ID=N indicative of the target position, thereby calculating the count value (C) of the control pulses at the target position and setting in step S3. In step S4, a difference (N−K) between the block ID=N at the target position and the block ID=K at the present position is obtained and the number (M) of control pulses is multiplied to such a difference, thereby obtaining the count value (C) of the control pulses indicative of the distance to the target position. In step S5, the count value (C) of the control pulses indicative of the target position and the count value of the control pulses indicative of the distance to the target position are respectively transferred to the driver side and a high speed search according to the speed patterns of the acceleration, constant speed, and deceleration is activated. After completion of the activation, in step S6, the apparatus waits for a high speed search completion notification from the driver side. After completion of the high speed search, a necessary operation such as reproduction, recording, or the like is executed by another processing routine.

[Reduction in Wow and Flutter]

I. Correction of Torque Ripple

In the magnetic tape apparatus of the invention, a rotational torque ripple which the capstan motor 20 for controlling a tape feed has exerts an influence on a wow and flutter (fluctuation in tape running speed) as one of the performances of the apparatus. In order to reduce the wow and flutter, it is necessary to reduce the rotational torque ripple as much as possible. However, a brushless DC motor is used as a capstan motor 20 in order to assure a life of the motor. According to the brushless DC motor, generally, there is a torque ripple of about 20% and it is difficult to suppress the torque ripple according to only a drive control by a constant current feedback. In the invention, therefore, the relation between the rotating position of the capstan motor 20 and the generation torque is measured at the time of an initialization diagnosing process just after the turn-on of a power source. The result of the measurement is stored into a memory. In a control of the tape constant speed run upon recording or reproduction, a feed-forward control of the capstan motor 20 is executed so as to eliminate a fluctuation amount of the torque measured, thereby decreasing the wow and flutter.

Figure 13:
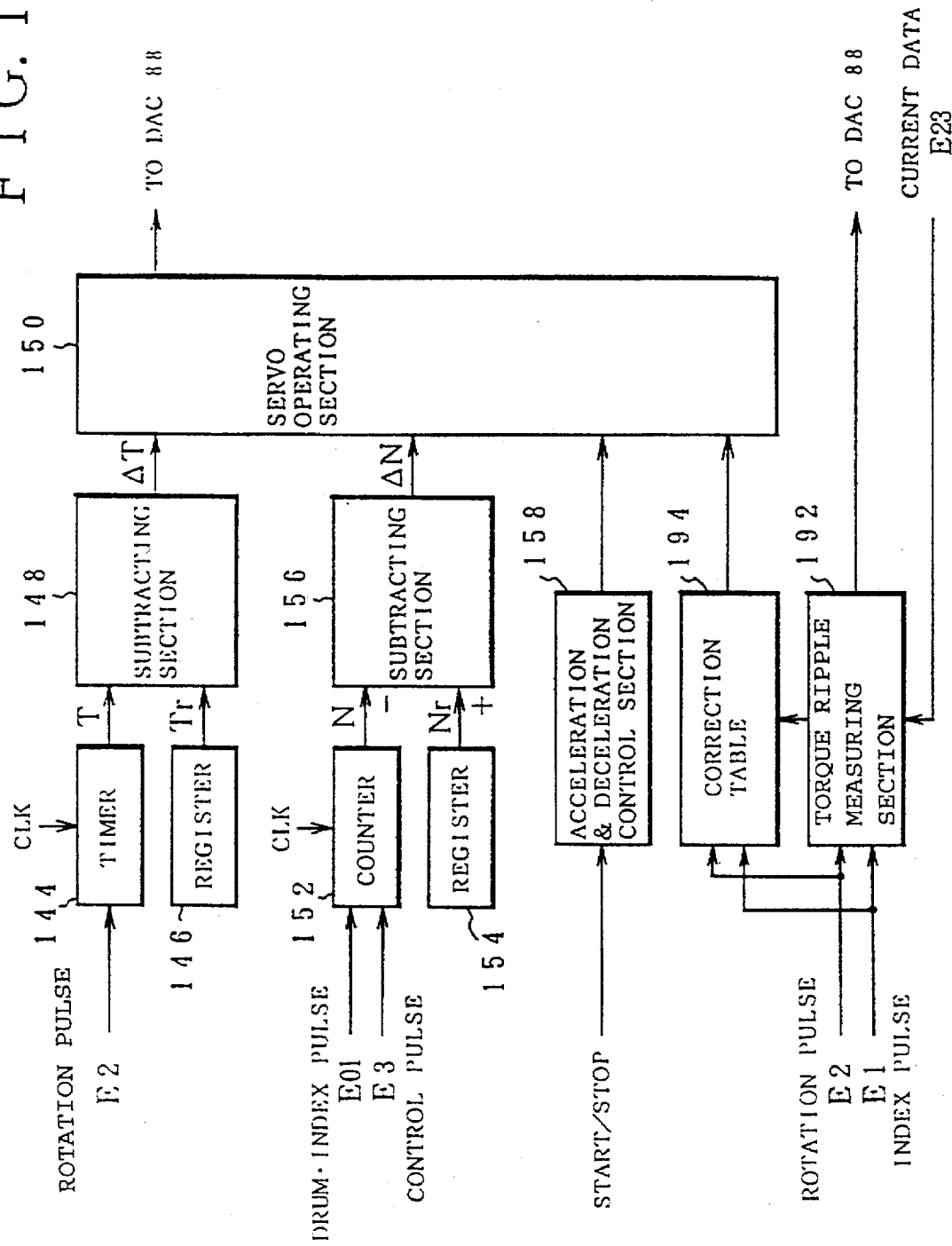
FIG. 13 is a functional block diagram of a capstan control section in FIG. 6.
Figure 14:
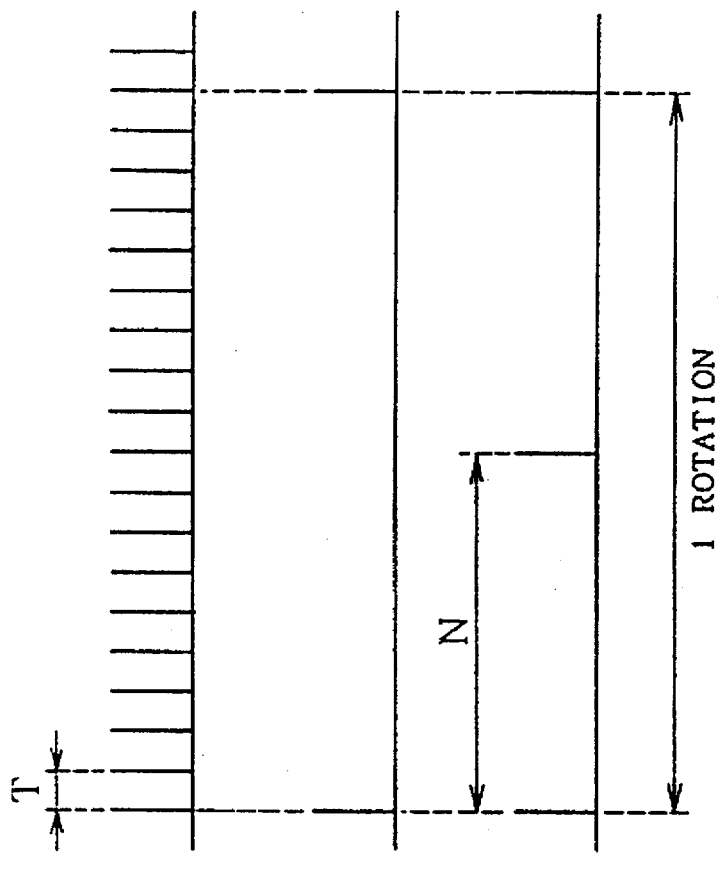
FIGS. 14A to 14C are time charts for a rotation pulse, an index pulse, and a control pulse of a capstan motor.

FIG. 13 shows the details of the capstan control section 136 that is realized by the DSP 80 in FIG. 6. The apparatus has a correcting function by the torque measurement of the capstan motor 20 and the feed-forward control based on the measurement result. First, at the time of the tape constant speed run upon recording or reproduction, the capstan motor 20 executes a rotation speed control and a rotation phase control. A rotational speed control section is constructed by a timer 144, a register 146, a subtracting section 148, and a servo operating section 150. The timer 144 measures a time interval of rotation pulses E2 (500 rotation pulses, for example, are generated per one rotation) from the pulse generator 24 provided for the capstan motor 20. A reference speed value $T_0$ of the tape constant speed run has been stored in the register 146. The subtracting section 148 obtains a speed deviation ($\Delta T$) by subtracting a time interval (T) of the rotation pulses E2 measured by the timer 144 from the reference speed value $T_0$ in the register 146 and outputs the speed deviation to the servo operating section 150. Thus, the servo operating section 150 executes a feedback control for supplying a drive current to the capstan motor 20 through the D/A converter 88 in a manner such that the speed deviation $\Delta T$ is set to 0, namely, the time interval (T) of the rotation pulses E2 coincides with the reference speed value $T_0$. FIG. 14A shows the rotation pulses E2 which are obtained from the pulse generator 24 of the capstan motor 20. The time interval (T) is measured and a feedback control is performed so that the time interval (T) coincides with the reference speed value $T_0$.

On the other hand, a phase control of the capstan motor 20 is performed integrally with the drum motor 14 to drive the rotary head. A phase control section is constructed by a counter 152, a register 154, and a subtracting section 156. The counter 152 starts to count the number of clock pulses CLK in response to a drum index pulse E1 from the tacho generator 16 provided for the drum motor 14 and stops the counting by a phase reference signal, thereby obtaining a count value (N) indicative of a phase amount. The phase reference signal to stop the counter 152 is a control pulse that is derived from the control head 40 in the reproducing mode and is a clock pulse obtained on the basis of a clock oscillator in the writing mode. That is, by the selector 126 in FIG. 13, the control pulse based on the control head 40 from the control pulse demodulating circuit 118 is used as a phase reference signal in the reproducing mode, while the reference pulse from the reference pulse forming circuit 124 is used as a phase reference signal in the recording mode.

FIG. 14B shows the drum index pulse E1. FIG. 14C shows the control pulse E3 which is obtained from the control head 40. According to the invention, as shown in FIG. 2, the magnetic tape 48 is wrapped around the rotary head 44 in a range of 180°. Therefore, two control pulses E3 are obtained for a pulse interval of the drum index pulse E1, namely, for a period of time during which the drum motor 14 rotates once. The counter 152 starts to count the clocks CLK in response to the drum index pulse E1. When the control pulse E3 as a phase reference signal is obtained, the counter 152 stops the counting operation, thereby obtaining the count value (N) indicative of a phase amount. The subtracting section 156 subtracts a reference phase amount $N_0$ set in the register 154 from the count value (N), thereby obtaining a phase deviation $\Delta N$. The capstan motor 20 is driven so as to set the deviation $\Delta N$ to 0. Thus, a phase locked loop (PLL) in which a rotational phase of the capstan motor 20 is made coincide with a rotational phase of the drum motor 14 is constructed.

When an activation instruction is received, an acceleration & deceleration control section 158 in FIG. 13 instructs the servo operating section 150 so as to supply a predetermined acceleration current to the capstan motor 20. When a rotational speed of the capstan motor 20 reaches 75% of a target speed due to an acceleration control, the control is switched to a constant speed control by the speed control section and phase control section. When a stop instruction is received during the constant speed control, a deceleration control is instructed to the servo operating section 150 so as to supply a specified current in the reverse direction. In the capstan motor control section of the invention, a torque ripple measuring section 192 and a correction table 194 are provided. As one sequence in the initialization diagnosing process just after the turn-on of the power source of the apparatus, the capstan motor is rotated at least once by a predetermined current, and the torque ripple measuring section 192 detects a current value at each rotating position in one rotation and measures a torque ripple. The index pulse E1 of the capstan motor and a rotation pulse E2 of the capstan motor 20 are supplied to the torque ripple measuring section 192.

Figure 15:
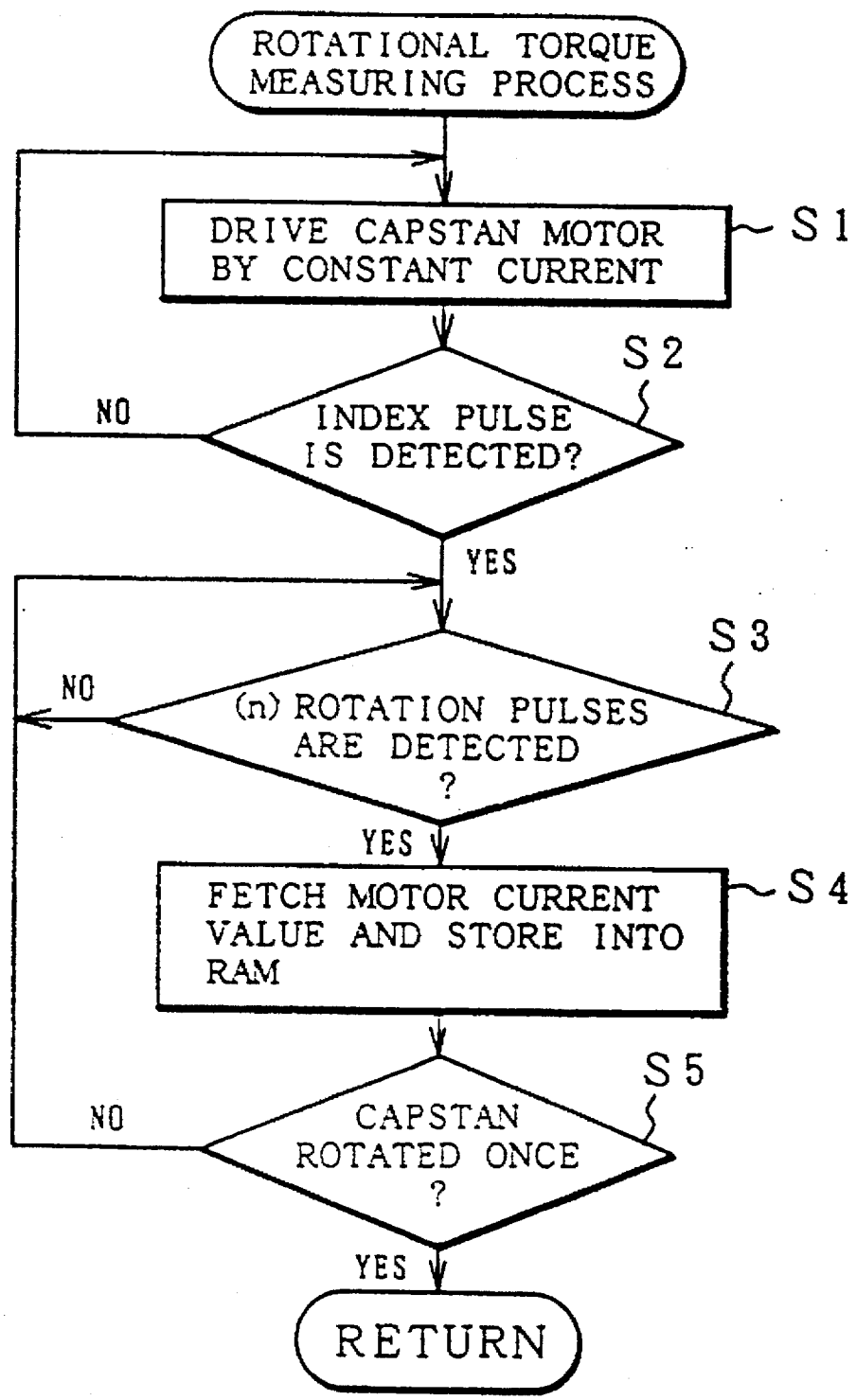
FIG. 15 is a flowchart for a rotational torque measuring process.

A flowchart of FIG. 15 relates to a measuring process of the torque ripple measuring section 192. First in step S1, the capstan motor 20 is slowly driven by a predetermined current. In step S2, a check is made to see if the index pulse from the tacho generator 22 has been detected or not. When the index pulse is detected, step S3 follows. In step S3, a check is made to see if a predetermined number (n) of rotation pulses E2 from the pulse generator 24 have been detected or not. When the (n) rotation pulses E2 are detected, step S4 follows and a current value of the capstan motor 20 at that time is fetched and stored into the RAM. In step S5, a check is made to see if the capstan motor 20 has been rotated once or not. Such a rotation judgment can be performed by obtaining the next index pulse E1. Processes in steps S3 and S4 such that each time every (n) rotation pulses E2 are detected, the motor current value at that time is fetched and stored into the RAM are repeated for a period of time during which the capstan motor 20 rotates once in step S5. When one rotation of the capstan motor 20 is judged in step S5, the above series of measuring processes are finished.

FIG. 16 shows a table of measurement data obtained by the rotational torque measuring process in FIG. 15. Each number indicates a rotating position in one rotation. Now, assuming that the number of pulses which are generated from the pulse generator 24 per one rotation of the motor is set to (M) and that the current value is measured every (n) pulses, the numbers indicative of the rotating positions of one rotation are set to 1 to M/n. Current values $I_1$ to $I_{M/n}$ measured are stored in correspondence to the numbers 1 to M/n showing the rotating positions, respectively.

FIG. 17 shows an example of the correction table 194 formed on the basis of the measurement result in FIG. 16. Now, assuming that a current instruction value designating the predetermined current that is supplied to the capstan motor 20 at the time of the measurement is set to Ic, differences between the current instruction value Ic and the measured currents $I_1$ to $I_{M/n}$ show a change in current value corresponding to the torque fluctuation. Therefore, in case of driving the capstan motor 20 by the current instruction value Ic at the time of the measurement, the positive/negative relation of the correction current value stored in the correction table in FIG. 17 is reversed and the resultant correction value is added to the current instruction value, thereby enabling a feed-forward control in which the torque ripple of one rotation is eliminated and a constant torque is obtained to be performed. In the actual control of the capstan motor 20, since a current instruction value In different from the current instruction value Ic at the time of the measurement is supplied, a conversion such that a ratio (In/Ic) between the actual current instruction value In and the current instruction value Ic upon measurement is obtained and is multiplied to the correction current value in FIG. 16 is performed. After that, the negative/positive relation of the converted current value in this manner is reversed and the resultant current value is added to the current instruction value In at that time. The conversion of the correction current value for the actual current instruction value In is not limited to the ratio (In/Ic) between the actual current instruction value In and the measured current value Ic, but a correction current value that was applied with a proper weight can be also used.

II. Control of Coil Switching Timing of Brushless DC Motor

The capstan motor 20 used in the tape feed control is a brushless DC motor and is driven by a coil switching by Hall sensors built in the motor. The torque ripple of the brushless DC motor is generally so large to be about 20%. As one of the causes of such a large torque ripple, there can be mentioned a point that a torque fluctuation occurs at a coil switching timing based on the Hall sensors. Such a torque fluctuation is known as a caulking torque fluctuation. The caulking torque fluctuation occurs by the following cause. Namely, after the coil switching timing based on the detection signals of the Hall sensors built in the motor was obtained, there is a time delay until the current switching operation is actually executed by the switching device such as an FET or the like of the driver. The actual coil current is switched at a position which passed the switching timing based on the Hall sensors due to such a time delay. According to the invention, therefore, the coil switching timing is set to a slightly early timing corresponding to a position that is slightly earlier than the coil switching point based on the Hall sensor, thereby making the actual switching timing of the coil current almost coincide with the switching timing by the Hall sensors. In this way, the torque fluctuation is suppressed.

Figure 18:
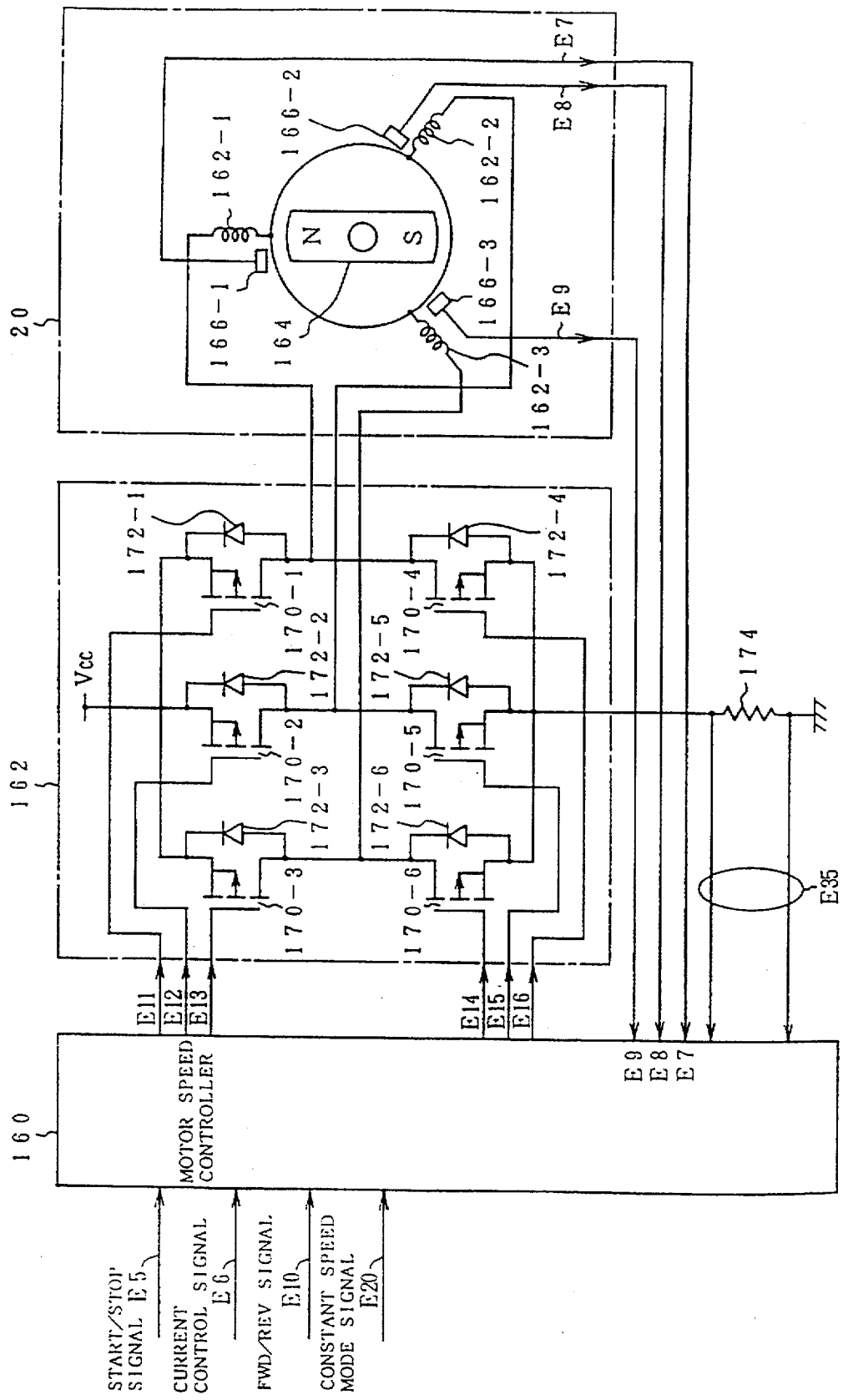
FIG. 18 is a circuit block diagram of a driver of the capstan motor.

FIG. 18 shows the details of the driver 92 provided for the capstan motor 20 in FIG. 4. The driver 92 of the capstan motor 20 is constructed by a motor speed controller 160 and a drive circuit 162. First, in the capstan motor 20, three stator coils 162-1 to 162-3 are arranged at different rotating positions which are away from each other by 120° and are star connected. Three Hall sensors 166-1 to 166-3 are arranged in correspondence to the stator coils 162-1 to 162-3, respectively. A 2-pole rotor is used as a rotor 164 for simplicity of explanation. The Hall sensors 166-1 to 166-3 output Hall sensor detection signals E7 to E9 according to magnetic pole passage of the rotor 164 to the motor speed controller 160. The drive circuit 162 has six FET 170-1 to 170-6. Between a power source voltage Vcc and the ground, the FETs 170-1 and 170-4 are serially connected, the FETs 170-2 and 170-5 are serially connected, and further the FETs 170-3 and 170-6 are serially connected. A coil terminal of the stator coil 162-1 of the capstan motor 20 is connected between the FETs 170-1 and 170-4. A coil terminal of the stator coil 162-2 is connected between the FETs 170-2 and 170-5. A coil terminal of the stator coil 162-3 is connected between the FETs 170-3 and 170-6. Further, diodes 172-1 to 172-6 are connected between gates and sources of the FETs 170-1 to 170-6 in the reverse direction for the power source, respectively. The FETs 170-1 to 170-6 are switching driven by control signals E11 to E16 from the motor speed controller 160. Since the three FETs 170-1, 170-2, and 170-3 provided on the upper side supply currents to the stator coils 162-1, 162-2, and 162-3 of the capstan motor 20 by the ON operation, respectively, they are called FETs on the inflow side. On the other hand, since the three FETs 170-4, 170-5, and 170-6 provided on the lower side supply currents from the stator coils 162-1, 162-2, and 162-3 by the ON operation, they are called FETs on the outflow side. Among the six FETs 170-1 to 170-6, either one of the three FETs on the inflow side and either one of the three FETs on the outflow side are simultaneously turned on by the control signals E11 to E16. A current driving such that a current is allowed to flow in from one of the two stator coils among the three stator coils 162-1 to 162-3 and is allowed to flow out to the other FET is executed. Further, the drive current of the capstan motor 20 is detected by a current detecting resistor 174 provided on a common connection line of the FETs 170-4 to 170-6 on the outflow side and is given as a motor detection signal E25 to the motor speed controller 160. The motor speed controller 160 generates the control signals E11 to E16 on the basis of the four signals of the Hall sensor detection signals E7, E8, and E9 from the Hall sensors 166-1 to 166-3 and the FWD/REV signal E10 to decide the motor rotating direction that is given by the DSP 80. Further, a start/stop signal E5, a current control signal E6 as a current instruction value to the capstan motor, and a constant speed mode signal E20 which is obtained by the end of the acceleration control are supplied to the motor speed controller 160 from the DSP 80.

Figure 19:
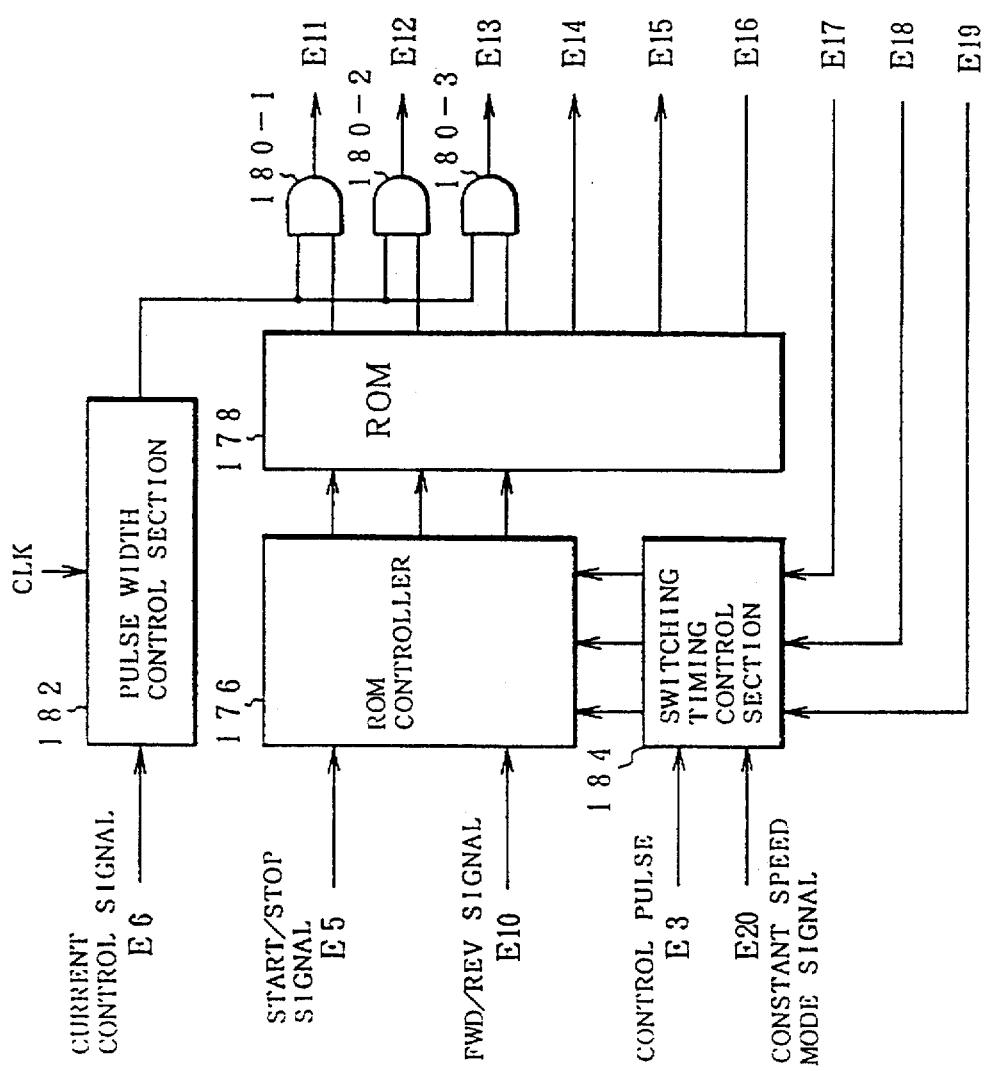
FIG. 19 is a block diagram of a motor speed controller in FIG. 18.

FIG. 19 shows the details of the motor speed controller 160 in FIG. 18. The motor speed controller 160 is constructed by an ROM controller 176, an ROM 178, a pulse width control section 182, AND gates 180-1 to 180-3, and a switching timing control section 184. The ROM controller 176 operates by the start signal E5 and designates a read address in the ROM 178 on the basis of the FWD or REV signal E10 and Hall sensor detection signals E17 to E19 obtained at that time. 6-bit data corresponding to the control signals E11 to E16 has been stored every address in the ROM 178 by using addresses of four bits in which one-bit information indicative of the rotating direction that is decided by the FWD/REV signal E10 and three bits of the Hall sensor detection signals E17 to E19 are added. The control signals E11 to E16 to decide the switching timing using the ROM 178 will be obviously understood from timing charts of FIGS. 20A to 20L. FIGS. 20A to 20C show the Hall sensor detection signals E7 to E9. The Hall sensor detection signals E7 to E9 are signals in which the phases are inverted every 180° and there is a phase difference of 120° among them. Therefore, each of the leading and trailing edges of the Hall sensor detection signals E7 to E9 becomes a coil switching timing and the coil switching operations of six times shown in (1) to (6) are executed per one rotation.

FIGS. 20D to 20I show the control signals E11 to E16 which are switched at the timings shown in (1) to (6) on the basis of the Hall sensor detection signals E7 to E9 as shown in the diagram. By the operations of the FETs 170-1 to 170-6 of the drive circuit 162 in FIG. 18 by the control signals E11 to E16, currents $I_1$, $I_2$, and $I_3$ shown in FIGS. 20J to 20L flow in the stator coils 162-1 to 162-3. In the case where the current direction is the plus direction, the currents flow in the stator coils. When it is the minus direction, the currents flow out from the stator coils.

FIG. 21A shows operating states of the FETs 170-1 to 170-6 of the drive circuit 162 at phases (1) to (6) when the motor rotating direction is set to the clockwise direction (CW direction) in FIGS. 20A to 20L and outflow or inflow states of the currents in the stator coils 162-1 to 162-3. FIG. 21B shows addresses and data in the ROM 178. With respect to the phases (1) to (6) in FIG. 21A, three bits of the Hall sensor detection signals E7 to E9 in FIGS. 20A to 20C are set to addresses and two bits among six bits of the data bits of the control signals E11 to E16 corresponding to the FETs 170-1 to 170-6 are set to 1 and the remaining four bits are set to 0. Therefore, the 6-bit data corresponding to the ON/OFF of the control signals E11 to E16 in FIG. 20 can be unconditionally read out from the RAM 178 by the address control by three bits of the Hall sensor detection signals E17 to E19.

At the switching timing based on the fundamental Hall sensor detection signals in FIGS. 20A to 20C, there is actually a time delay for a period of time until the coil current is switched after the switching timing based on the Hall sensors was obtained, so that a torque fluctuation occurs. Therefore, in the switching timing control section 184 in FIG. 19, 3-bit address data in which the switching timing of the Hall sensor detection signals E17 to E19 is set to a slightly early timing is produced and supplied to the ROM controller 176. The control signals E11 to E16 for coil switching are outputted from the ROM 178 at an earlier timing than the switching timing of the Hall sensors.

Figures 22A, 22B, 22C, 22D, 22E, 22F, 22G, 22H:
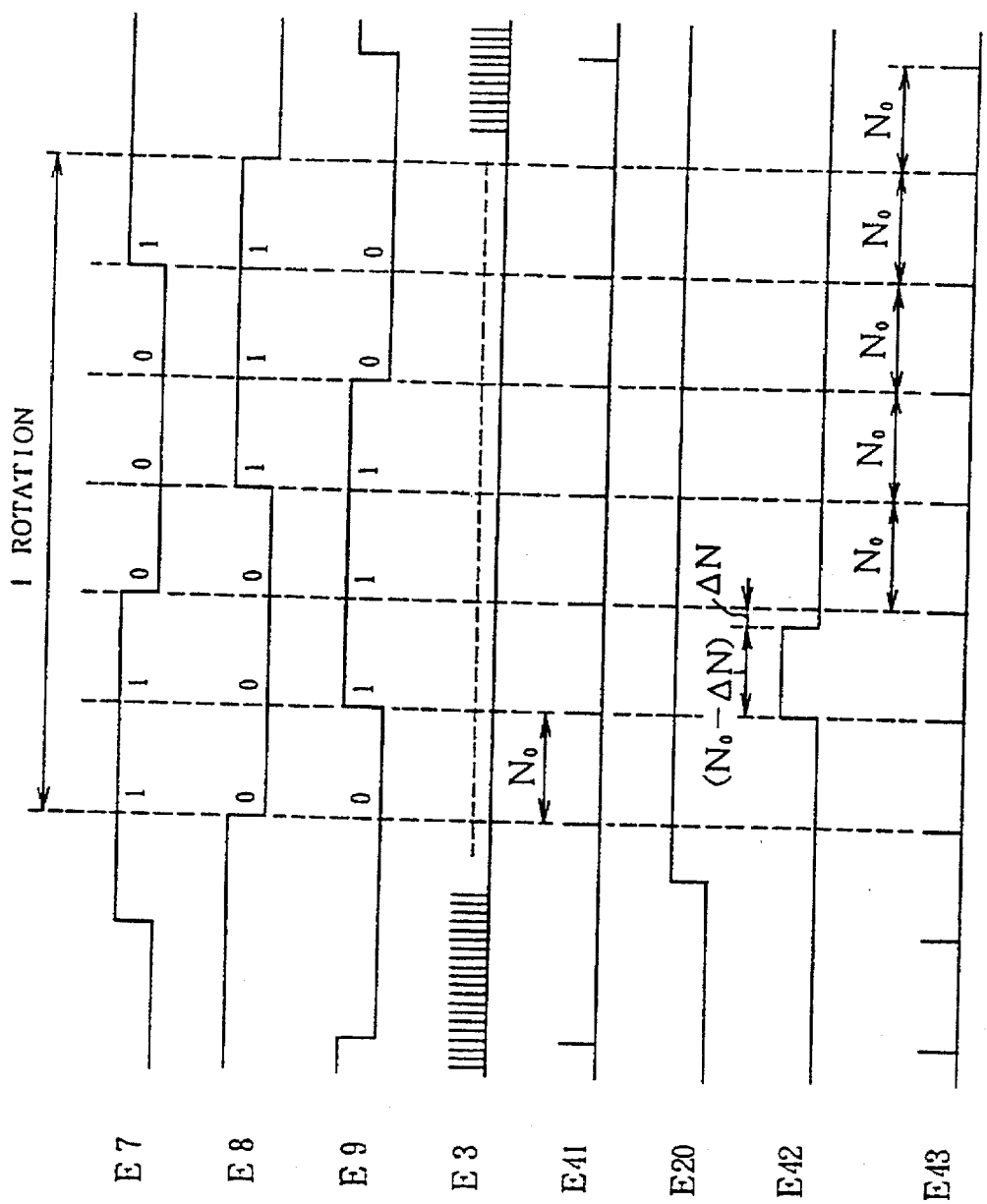
FIGS. 22A to 22H are timing charts for a process to set a switching timing based on Hall sensors to an early timing.

FIGS. 22A to 22H are timing charts for operation in the switching timing control section 184 in FIG. 19. FIGS. 22A to 22C show the Hall sensor detection signals E7 to E9. As a reference clock to control the switching timing, in the embodiment, the control pulse E3 read out from the control track of the magnetic tape in FIG. 22D is used. The control pulse E3 is used in the reproducing mode. The reference pulse derived from the clock oscillator is used in the writing mode. FIG. 22E shows the switching timing signal E41 indicative of the leading and trailing edges of the Hall sensor detection signals E7 to E9 in FIGS. 22A to 22C. FIG. 22F shows the constant speed mode signal E20 from the DSP 20. When the control mode of the tape run is switched from the acceleration control to the constant speed control, the constant speed mode signal E20 rises to the logic level 1 and is made valid. When the constant speed mode signal E20 is valid, an interval of the switching timing signal E41 obtained from the Hall sensor detection signals is measured by using the control pulse E3. Now, assuming that the count value at this time is equal to $N_0$, it sets a coil switching interval based on the Hall sensor detection signals. When the count value $N_0$ indicative of a reference interval is obtained, as shown in FIG. 22G, a value $(N_0-\Delta N)$ in which the predetermined value $\Delta N$ is subtracted from the reference count value $N_0$ is subsequently set to a reference value and, at the same time, the counting operation of the control pulses E3 is started, thereby detecting a timing when the reference value $(N_0-\Delta N)$ and the count value of the control pulses E3 coincide. Therefore, the signal E42 indicative of a period of time to count the control pulses E3 corresponding to only the calculated value $(N_0-\Delta N)$ is obtained. A timing switching signal E43 in which the switching timing is preceding is generated in response to a trailing edge of the signal E42. After that, the switching timing signal E43 is generated every reference count value $N_0$ as a coil switching interval measured in FIG. 22E. As mentioned above, by the measurement of the switching interval based on the Hall sensors when the control is switched to the constant speed control mode and the generation of the switching timing signal after the elapse of an interval that is slightly shorter than the measurement result, the subsequent coil switching timing is set to the switching timing that is preceding to the switching timing based on the Hall sensors by only $\Delta N$. Now, assuming that the count value $N_0$ of the switching interval is set to $N_0=1000$, such an interval of $\Delta N$ that is preceding is set to a value of $\Delta N$=about 5.

FIGS. 23A to 23L show the Hall sensor detection signals E7 to E9, control signals E11 to E16, and currents I1 to I3 of the stator coils when the rotation in the REV direction is designated and the capstan motor 20 is rotated in the counterclockwise direction (CCW direction). States of the FETs 170-1 to 170-6 and stator coils 162-1 to 162-3 at the phases (1) to (6) in such a case are as shown in FIG. 24A. FIG. 24B shows addresses and data in the RAM 178 at that time.

Therefore, in addition to the 6-bit data in the clockwise direction in FIG. 21B, the 6-bit data corresponding to the phases (1) to (6) in the counterclockwise direction in FIG. 24B is also stored in the ROM 178 in FIG. 19. Therefore, the ROM 178 in which the 6-bit data at the phases (1) to (6) based on FIGS. 21B and 24B is addressed by four bits in which one bit of the FWD/REV signal E10 to decide the rotating direction is added to the Hall sensor detection signals E17 to E19 of three bits, so that the corresponding control signals E11 to E19 are read out from the ROM 178.

Further, in the motor speed controller 160 in FIG. 19, the pulse width control section 182 is provided. The pulse width control section 182 inputs the current control signal E6 based on the current instruction value from the DSP 80 and outputs a pulse width control signal whose duty ratio changes in proportion to the current control signal E6. A frequency of the pulse width control signal is, for example, equal to 23 kHz and is sufficiently higher than a switching frequency of the control signals E11 to E16 for coil switching based on the Hall sensor detection signals E17 to E19. The pulse width control signal from the pulse width control section 182 is supplied to the AND Gates 180-1 to 180-3. When the bit data corresponding to the three control signals on the inflow side from the ROM 178 is equal to 1, the pulse width control signal is outputted as a control signal E11, E12, or E13. The control signals E11 to E13 in FIGS. 20D to 20F are the control signals obtained by the AND of the control signals derived on the basis of the Hall sensor detection signals and the pulse width control signal. This point shall also similarly apply to FIGS. 23A to 23L.

The control in which the switching timing based on the Hall sensors is preceding has been shown and described with respect to the capstan motor 20 as an example. However, in addition to the capstan motor 20, the drum motor 14, file reel motor 28, and machine reel motor 32 are provided for the tape running system. Since the brushless DC motor is used as each of the above motors in a manner similar to the capstan motor 20, substantially the same constructions as shown in FIGS. 18 and 19 are used in a manner similar to the driver 92 of the capstan motor of each of the drivers 86, 100, and 106 and the switching timing based on the Hall sensors is allowed to be preceding, thereby suppressing a torque fluctuation.

[Control of Tape Tension]

In the magnetic tape apparatus of the invention using the helical scan type, in order to extend the run durability of the magnetic tape, the tape tension by the tape running system is suppressed to tens of grams, desirably, 30 g or less and has to be controlled to a tape tension that is about 1/10 of that in the magnetic tape apparatus using the fixed head. As for a control of the tape tension, there is performed a control such that a back tension is applied by reducing a current gain of the reel motor serving as a supply side of the magnetic tape between the file reel motor 28 and the machine reel motor 32. However, in a constant speed control state of the magnetic tape in which the tape tension is controlled, a drive current of the reel motor on the supply side has a relatively low current value. A micro current control cannot be performed when only the control of the current instruction value to the D/A converter is executed and a back tension control of about tens of grams is difficult. In the invention, therefore, by driving the reel motor on the supply side by the driver in the braking mode, a generation torque is suppressed irrespective of the current control by the D/A converter, thereby controlling the back tension.

Figure 26:
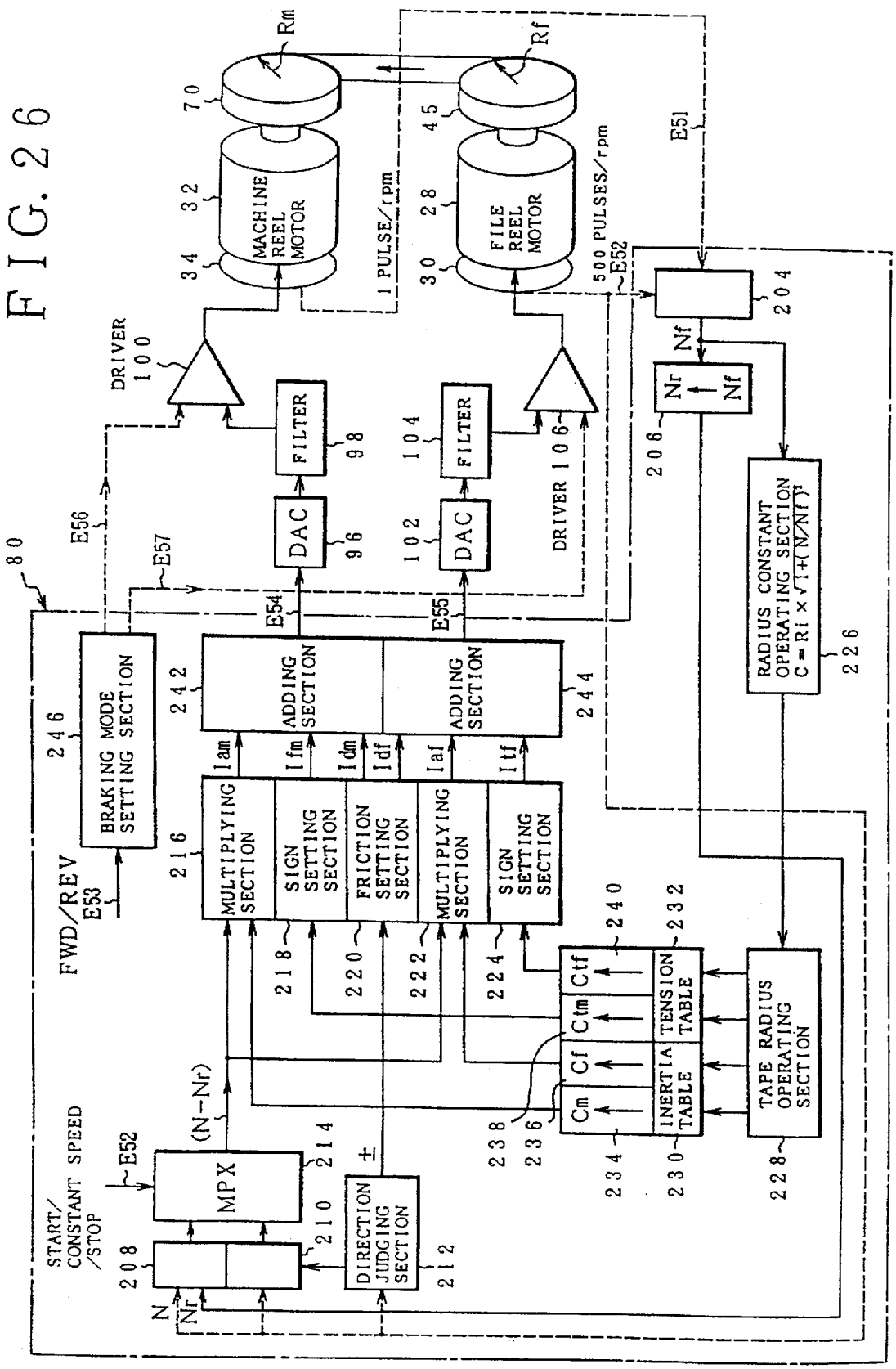
FIG. 26 is a functional block diagram of a reel motor control section in FIG. 6.

FIG. 26 shows a functional block of the DSP 80 to realize the control of the tape tension of the invention together with a hardware at the output stage to the motor side. Now, considering the run control in the FWD direction of the magnetic tape as an example, the file reel motor 28 functions as a reel motor on the supply side and is driven in the braking mode. The file reel motor 28 is driven by the D/A converter 102, filter 104, and driver 106 on the basis of a current instruction data E55 from the DSP 80. The machine reel motor 32 is driven by the D/A converter 96, filter 98, and driver 100 on the basis of a current instruction data E54 from the DSP. A braking mode setting section 246 is provided for the DSP 80. On the basis of a control signal E53 in the driving direction showing FWD/REV, the braking mode setting section 246 outputs a braking mode set signal E57 to the driver 106 in case of the FWD direction, thereby driving the file reel motor 28 in the braking mode. On the contrary, in case of the REV direction, the braking mode setting section 246 outputs a braking mode set signal E56 to the driver 100, thereby driving the machine reel motor 32 in the braking mode.

Figure 27:
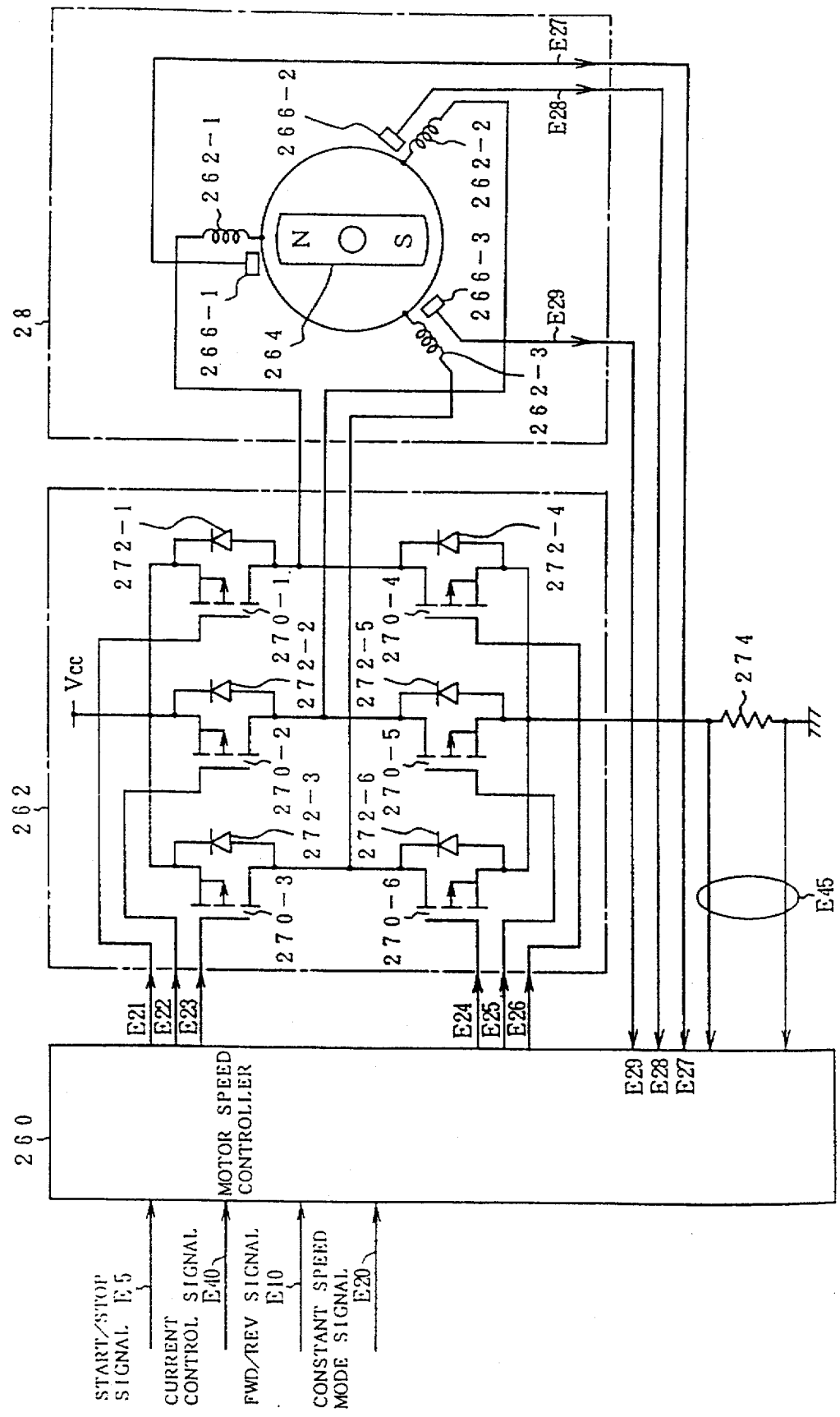
FIG. 27 is a circuit block diagram of a driver of a file reel motor.

FIG. 27 shows an embodiment of the driver 106 of the file reel motor 28 in FIG. 26. The driver 106 is constructed by a motor speed controller 260 and a driver circuit 262. The driver circuit 262 has six FETs 270-1 to 270-6 and is switching controlled by control signals E21 to E26 from the motor speed controller 260. A brushless DC motor is used as a file reel motor 28. The motor 28 has three stator coils 262-1 to 262-3 and, for instance, a two-pole rotor 264. Further, Hall sensors 266-1 to 266-3 are provided in correspondence to the stator coils 262-1 to 262-3. Hall sensor detection signals E27 to E29 whose phases are different by 120° are generated from the Hall sensors 266-1 to 266-3 to the motor speed controller 260 in correspondence to the rotation of the rotor 264. The driver circuit 262 and file reel motor 28 are fundamentally the same as the capstan motor 20 in FIG. 18 and its drive circuit 162.

Figure 28:
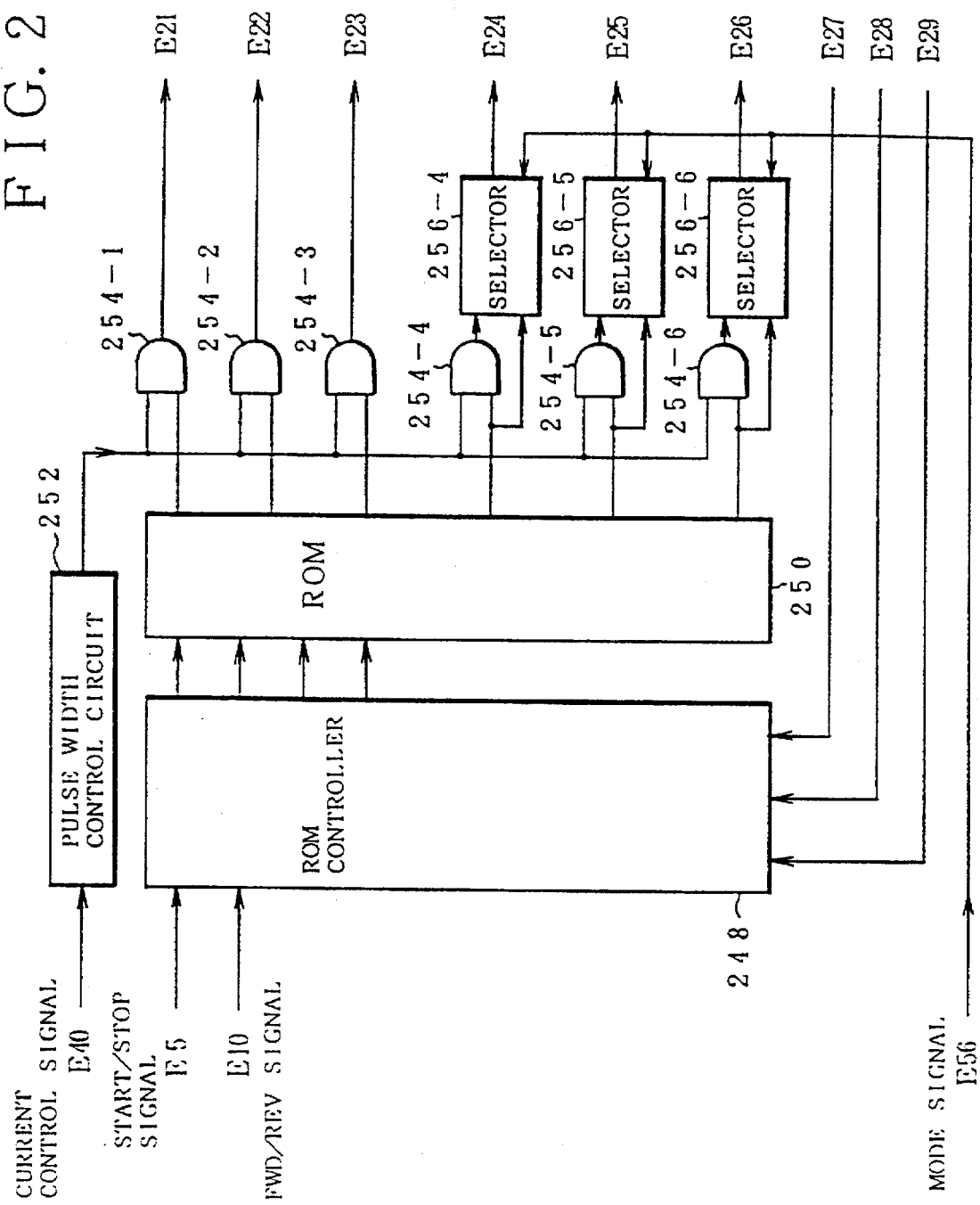
FIG. 28 is a block diagram of a motor speed controller in FIG. 27.
Figure 29:
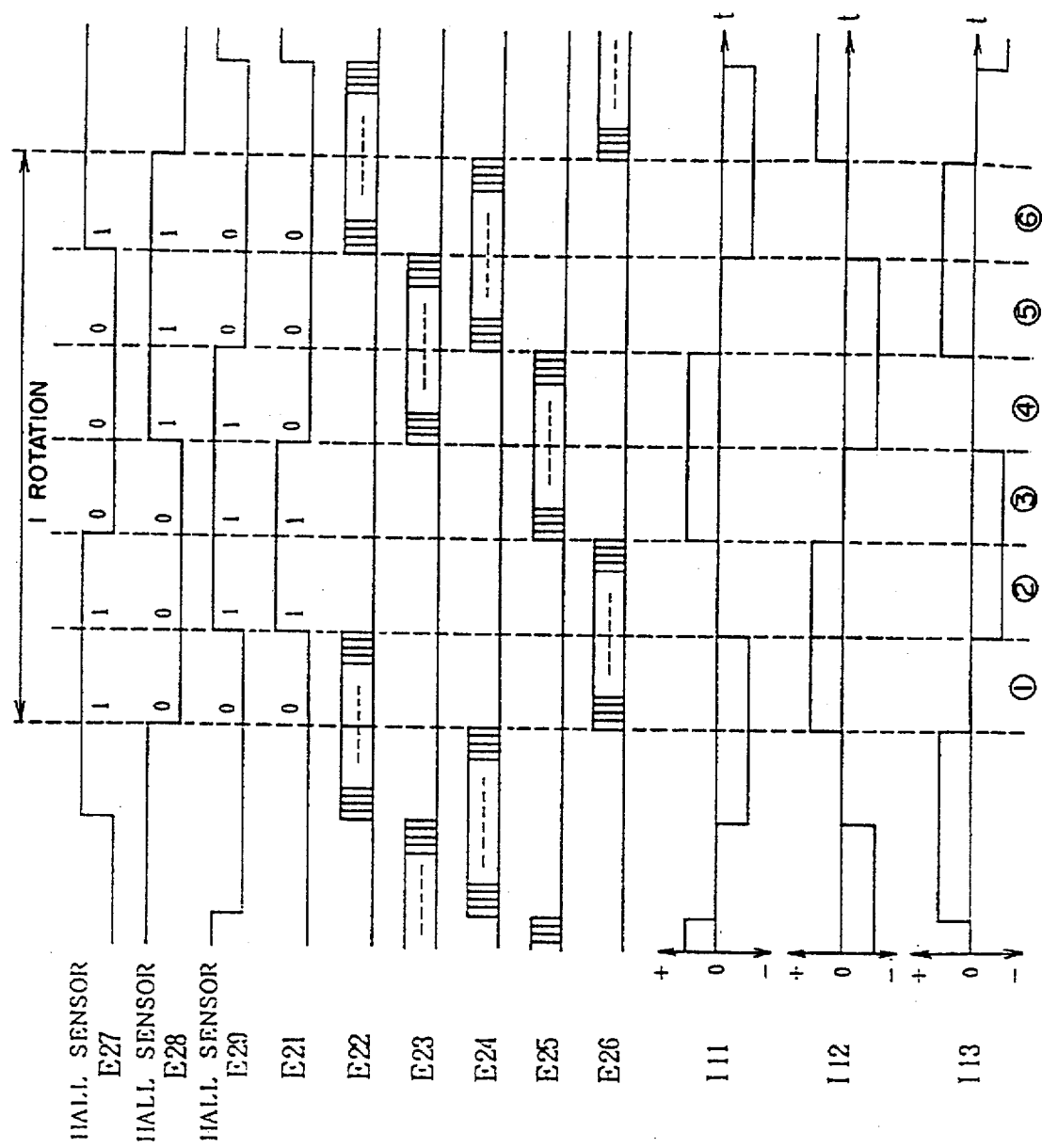
FIGS. 29A to 29L are timing charts for a CW rotation in which a braking mode is set by a driver circuit in FIG. 27.

FIG. 28 shows an embodiment of the motor speed controller 260 in FIG. 27. The motor speed controller 260 is constructed by an ROM controller 248, an ROM 250, a pulse width control circuit 252, AND gates 254-1 to 254-6, and selectors 256-4 to 256-6. Although the motor speed controller 260 is also fundamentally the same as the motor speed controller 160 of the capstan motor 20 in FIG. 19, it differs with respect to a point that the AND gates 254-4 to 254-6 and selectors 256-4 to 256-6 are newly provided as a control function in the braking mode. In FIG. 19, the switching timing control section 184 is provided for the ROM controller 176 and the switching timing of the Hall sensor detection signals E17 to E19 is allowed to be slightly preceding. FIG. 28 is also the same as FIG. 19 with respect to such a point. Such a construction is built in a function of the ROM controller 248 for simplicity of explanation. Therefore, with respect to the ROM 250 as well, in a manner similar to the ROM 178 in FIG. 19, the 6-bit data for the 3-bit addresses in FIG. 21B is stored with regard to the FWD direction and the 6-bit data for the 3-bit addresses in FIG. 24B is stored with respect to the REV direction.

FIGS. 29A to 29L are timing charts in the braking mode of the file reel motor 28 by the motor speed controller 260 and driver circuit 262 in FIGS. 27 and 28. These timing charts are also fundamentally the same as FIGS. 20A to 20L showing the timing charts of the fundamental clockwise direction (CW direction) in the capstan motor 20. In the capstan motor 20, the coil switching timing is actually controlled so as to be preceding to the switching timing by the Hall sensors as shown in FIGS. 23A to 23L. Such a point, however, is omitted.

In the braking mode of FIG. 28, as shown in FIGS. 29D to 29I, as for the switching control of the FETs 270-1 to 270-6 of the driver circuit by the control signals E21 to E26, the ON/OFF control by the pulse width control is performed with respect to all of the FETs on the inflow side and outflow side. On the other hand, in the ordinary mode, the switching control by the pulse width control signal is performed with respect to the inflow side in a manner similar to FIGS. 20D to 20F. However, with regard to the outflow side of FIGS. 20G to 20I, only the ON/OFF control based on the Hall sensor detection signals is executed.

Figure 30:
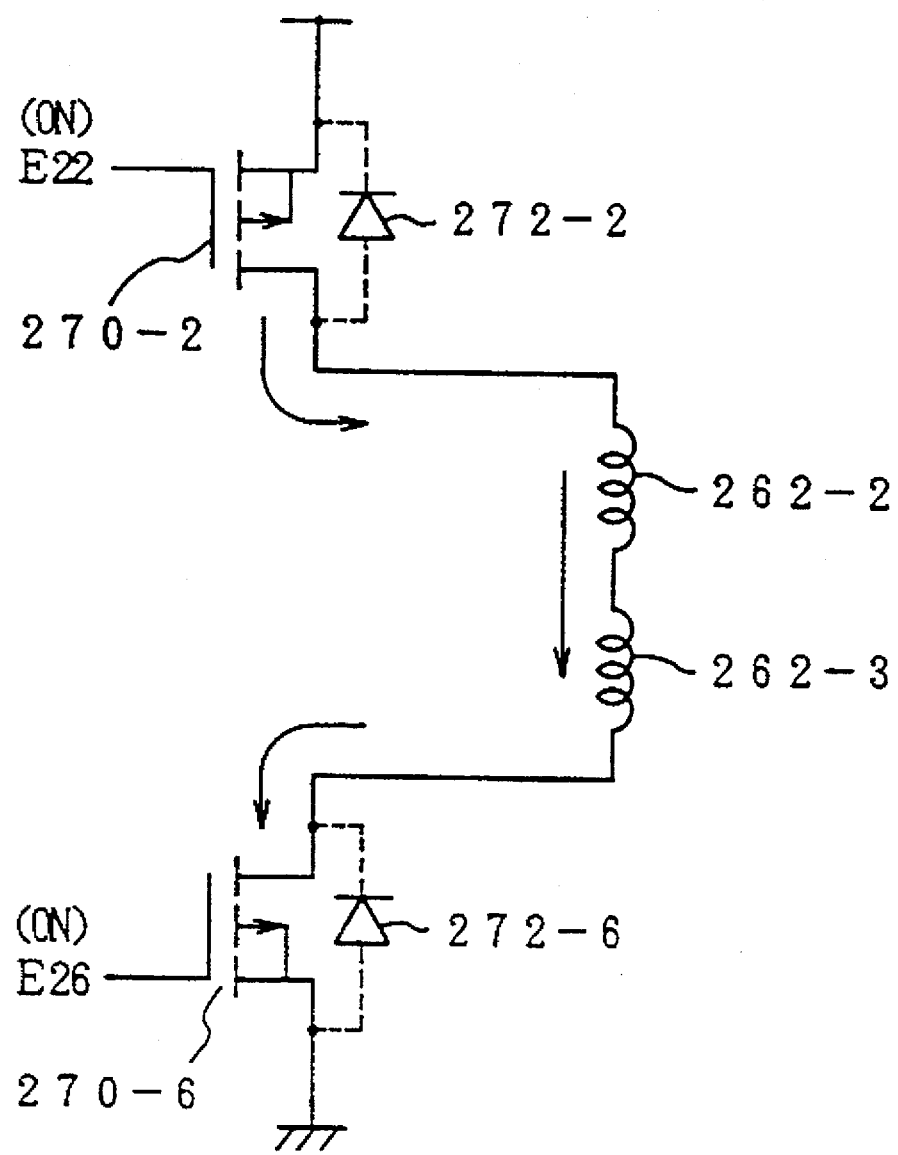
Figure 31:
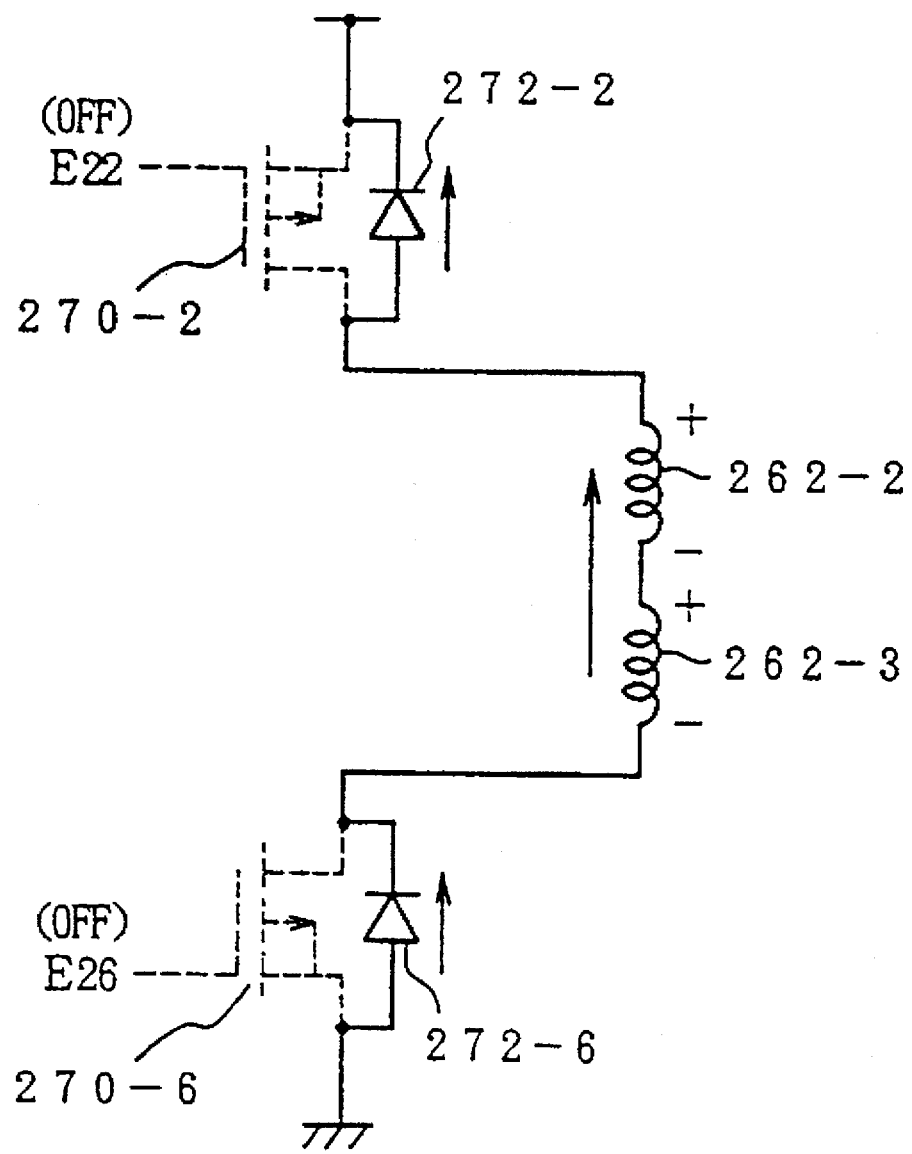
FIG. 31 is an explanatory diagram of a braking state in which the FETs are simultaneously turned off.

FIGS. 30 and 31 show switching states in the braking mode in FIGS. 29A to 29L and relate to the switching at the phase (1) in FIGS. 29A to 29L as an example. At the phase (1), in the driver circuit 262 in FIG. 28, the FET 270-2 is pulse width controlled by the control signal E22 with respect to the inflow side and, at the same time, the FET 270-6 is pulse width controlled by the control signal E26 with regard to the outflow side.

FIG. 30 shows a state in which the FETs 270-2 and 270-6 are simultaneously turned on in the pulse width control. A current flowing from the power source by the turn-on of the FET 270-2 flows in the stator coil 262-2 of the file reel motor 28 and flows out from the stator coil 262-3. Further, the current passes through the FET 270-6 that has simultaneously been turned on and flows to the ground. FIG. 31 shows a state in which the FETs 270-2 and 270-6 are simultaneously turned off by the pulse width control subsequent to the ON state of FIG. 30. When the FETs 270-2 and 270-6 are simultaneously turned off, a discharge current in the reverse direction flows through the diodes 272-2 and 272-6 connected in parallel in the reverse direction to the FETs 270-2 and 270-6 by energies charged in the stator coils 262-2 and 262-3 in this instance. The reverse discharge current causes reverse magnetic fields to be generated in the stator coils 262-2 and 262-3, thereby making an electromagnetic force act in such a direction so as to suppress the rotation of the rotor. Such an operation is what is called a regenerative braking operation and the motor torque decreases during such a period of time. By alternately repeating such an ON operation of FIG. 30 and an OFF operation to produce the braking mode in FIG. 31, the motor driving torque can be reduced as compared with that in the ordinary operating mode. Electrically, an almost constant back tension can be applied.

Figure 32A:
FIGS. 32A and 32B are explanatory diagrams of a reel radius of a reel speed.
Figure 32B:
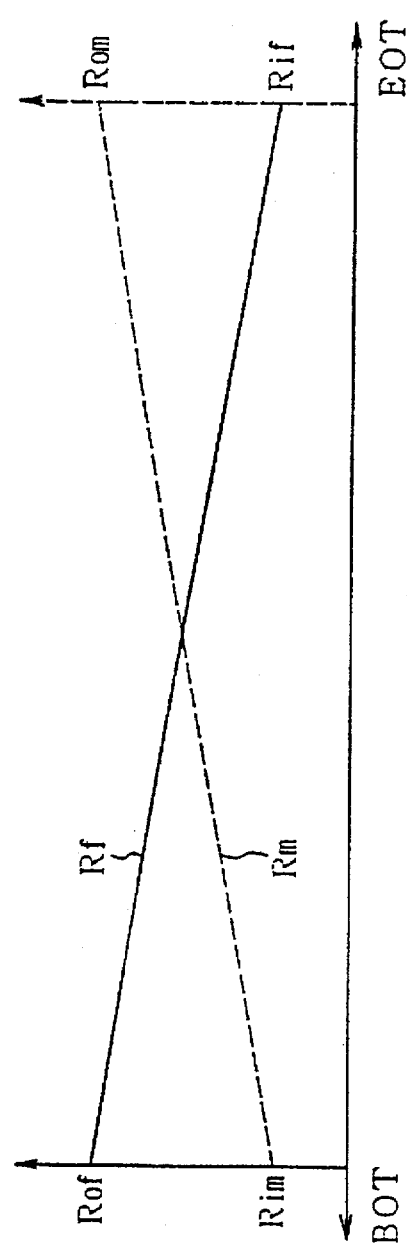

A constant speed control of the tape run of the file reel motor 28 and machine reel motor 32 by the DSP 80 in FIG. 26 will now be described. FIG. 32A shows the relation between a speed Vf of the file reel motor in the tape run and a speed Vm of the machine reel motor. FIG. 32B shows the relation between a radius Rf of the file reel and a radius Rm of the machine reel. It is now assumed that the tape is run from the begin of tape (BOT) side to the end of tape (EOT) side in a state in which a cartridge is inserted as a file reel. First, as for the reel radius, since the whole magnetic tape exists on the file reel side, the file reel radius Rf is equal to a maximum radius $R_{of}$. On the other hand, since the machine reel is empty, the machine reel radius Rm is equal to a minimum radius $R_{im}$. Therefore, for the constant tape run control by the capstan motor, the machine reel speed Vm is large and the file reel speed Vf is small at the beginning. When the tape runs in the FWD direction, the file reel radius Rf on the supply side linearly decreases and, at the same time, the machine reel radius Rm on the take-up side linearly increases. For such a change in reel radius, on the contrary, the machine reel speed Vm on the supply side must be linearly decreased and the file reel speed Vf on the take-up side must be linearly increased. As will be obviously understood from the above relation, as for the speed control of the file reel motor, the reel speed on the supply side must be decelerated and the reel speed on the take-up side must be accelerated in accordance with changes in reel radii on the supply side and take-up side. In each of the above speed controls, the reel radius at that time must be detected in a real-time manner.

In the DSP 80 in FIG. 26, a drive current If of the file reel motor 28 and a drive current Im of the machine reel motor 32 are defined by the following equations.

$$\begin{aligned} If &= \text{(inertia table value } Cf) \cdot \text{(servo error } \Delta N) + \\ &\quad \text{(tension table value } Ctf) \pm \text{(friction term } Cdf) \\ &= Cf \cdot (N - Nr) + \frac{Ft \cdot Rf}{Kt} \pm \frac{Fvf + Fcf}{Kt} \end{aligned} \quad (1)$$

Cf: inertia table value
N: count value between index pulses (one rotation)
Nr: reference count value of one rotation
Ft: tape tension [kg]
Rf: tape radius of file reel
Kt: torque constant [kg.cm/A]
Fvf: viscous friction torque load that is applied to the motor [kg.cm]
Fcf: coulomb (inertia) friction torque load that is applied to the motor [kg.cm]

$$\begin{aligned} Im &= \text{(inertia table value } Cm) \cdot \text{(servo error } \Delta N) + \\ &\quad \text{(tension table value } Ctm) \pm \text{(friction term } Cdm) \\ &= Cm \cdot (T - Tr) + \frac{Ft \cdot Rm}{Kt} \pm \frac{Fvm + Fcm}{Kt} \end{aligned} \quad (2)$$

Cm: inertia table value
N: count value between index pulses (one rotation)
Nr: reference count value of one rotation
Ft: tape tension [kg]
Rm: tape radius of machine reel
Kt: torque constant [kg.cm/A]
Fvm: viscous friction torque load that is applied to the motor [kg.cm]
Fcm: coulomb (inertia) friction torque load that is applied to the motor [kg.cm]

With respect to the tension value and friction term of the second term of the right side in the equations (1) and (2), the addition and subtraction are defined as shown in FIG. 33. The DSP 80 in FIG. 26 will now be described with respect to the drive current If of the file reel motor 28 of the equation (1) as an example. First, the inertia table value Cf of the first term of the right side of the equation (1) is obtained from an inertia table 230. A retrieval of the inertia table 230 is obtained by using the file reel radius at that by a tape radius operating section 288 as an address. A deviation as a servo error of the second term of the right side of the equation (1) is obtained from a counter 208. Rotation pulse signals E52 (for instance, 500 pulses are generated per one rotation) from the pulse generator 30 provided for the file reel motor 28 are given to the counter 208. The count value Nr which gives a reference period is also given from a register 206 to the counter 208. A value of a counter 204 of one period before is held in the register 206. The counter 204 counts the rotation pulse signals E52 from the pulse generator 30 provided for the file reel motor 28 each time an index pulse signal E51 (one pulse is generated per one rotation) from the tacho generator 34 provided for the machine reel motor 32 is obtained. That is, a count value indicating how many times the file reel motor 28 rotates during one rotation of the machine reel motor 32 is obtained. Such a count value of the counter 204 is set into the counter 208 as a reference count value at the next period by the register 206.

Every rotational period of the machine reel motor 32, the counter 208 obtains a deviation (N–Nr) by subtracting the count value of the rotation pulses E52 indicative of the present rotation of the file reel motor 28 from the reference count value Nr. The deviation (N–Nr) is given to a multiplying section 222 through a multiplexer 214 and is multiplied with the inertia table value Cf from the inertia table 230 that is obtained from a register 236, so that the resultant multiplication value is outputted to an adding section 244 as a value $I_{ef}$ of the first term of the right side of the equation (1). A tension table 232 is provided adjacent to the inertia table 230. A tension table value $C_{tf}$ of the second term of the right side of the equation (1) has previously been stored in the tension table 232 by using the file reel radius Rf as an address. Therefore, the tension table value $C_{tf}$ is read out from the tension table 232 by the address based on the file reel radius Rf obtained by the tape radius operating section 228 at the present time point and is stored into a register 240. The value $C_{tf}$ of the register 240 is supplied to a code setting section 224. Since the rotating direction is set to the FWD direction in this instance as shown in FIG. 33, a minus code is set in order to perform the subtraction and is outputted to the adding section 244. Further, a friction setting section 220 is provided. A value $C_{df}$ of the friction term is fixedly set in the friction setting section 220. The value $C_{df}$ is also set to the same value with respect to the machine reel motor 32 side. As shown in FIG. 33, on the basis of a direction judgement signal from a direction judging section 212, the friction setting section 220 sets a sign so as to become plus in case of the FWD direction and become minus in case of the REV direction and outputs to the adding section 244. The adding section 244 adds each term of the right side of the equation (1) and outputs digital data of the current value If for the file reel motor 28, namely, current instruction data E55 as an addition result to the D/A converter 102. Now, assuming that a current value per one step of the D/A converter is set to 25 [mA/step], as for the current instruction data E55 to the D/A converter 102, the current value If calculated by the adding section 244 is divided by 0.025 and the decimal number of input steps is obtained and is converted to binary data. The binary data is outputted. That is, the conversions for the D/A converters 102 and 96 of the calculated current values If and Im by the adding sections 244 and 242 are executed as shown by the following equations.

$$FADC = If/0.025 \text{ [STEP]} \quad (3)$$
$$MADC = Im/0.025 \text{ [STEP]}$$

The same construction as mentioned above is also applied with regard to the current value Im of the machine reel motor 32 shown in the equation (2). Namely, the inertia table value Cm of the first term of the right side of the equation (2) is read out from the inertia table 230 and held in a register 234 by the present machine reel radius Rm obtained by the tape radius operating section 228 and is multiplied with the deviation (N−Nr) obtained from the counter 208 through the multiplexer 214 at that time by a multiplying section 216. A resultant multiplication value Iam is outputted to an adding section 242. A tension table value $C_{tm}$ of the second term of the right side of the equation (2) is read out from the tension table 232 and held in a register 238 on the basis of the machine reel radius Rm at that time. An addition sign or subtraction sign is set by a sign setting section 218 in accordance with FIG. 33 and is outputted to the adding section 242. Further, a friction term Cdm by the addition or subtraction based on the direction at that time judged by the direction judging section 212 is set into the adding section 242 from the friction setting section 220. The adding section 242 adds each term of the right side of the equation (2) and obtains the current value Im. After that, the current value Im is converted to decimal data according to a resolution of the D/A converter 96 in accordance with the equation (3) and is further converted to binary data. The binary data is outputted to the D/A converter 96.

The inertia table values Cf and Cm of the first term of the right side of the equations (1) and (2) stored in the inertia table 230 will now be described. The inertia table values Cf and Cm are given by the following equations.

$$Cf = \frac{4 \cdot Af}{Nr \cdot Kt} \cdot \left[ \frac{C1(Rf^4 - C2)}{Rf} + \frac{Jef}{Rf} + \frac{Jrf}{Rf} \right] \quad (4)$$

Acf: highest acceleration of file motor
C1: constant that is given by $(\pi.\rho.w)/2$ $\rho$ is a density of tape, w is a tape width
C2: constant that is given by the biquadrate of minimum radius Ri of tape
Rf: tape radius of file reel
Jef: inertia when reel is empty
Jrf: inertia of rotor of motor $$Cm = \frac{4 \cdot Acm}{Nr \cdot Kt} \cdot \left[ \frac{C1(Rm^4 - C2)}{Rm} + \frac{Jem}{Rm} + \frac{Jrm}{Rm} \right] \quad (5)$$

Acm: highest acceleration of machine motor
C1: constant that is given by $(\pi.\rho.w)/2$ $\rho$ is a density of tape w is a tape width
C2: constant that is given by biquadrate of minimum radius Ri of tape
Rm: tape radius of machine reel
Jem: inertia when reel is empty
Jrm: inertia of rotor of motor As will be obvious from the equations (4) and (5), in order to obtain the inertia values Cf and Cm, it is necessary to obtain the tape radius Rf of the file reel and the tape radius Rm of the machine reel at that time. The tape radii Rf and Rm are obtained by a radius constant operating section 226 and the tape radius operating section 228. In the invention, the tape radii Rf and Rm are calculated by using the index pulse signal E51 from the tacho generator 34 (one pulse is obtained per one rotation of the machine reel motor 32) and the rotation pulses E52 (500 pulses are generated, for example, per one rotation) from the pulse generator 30 provided for the file reel motor 28.

Now, assuming that the number of rotation pulses of the file reel which are obtained per one rotation of the machine reel is set to Nf and the number of pulses per one rotation of the machine reel is set to Nm, the reel radii Rf and Rm are obtained by the following equations.

$$Rf = C/\sqrt{\{1+(Nf+N)^2\}} \quad (6)$$
$$Rm = C/\sqrt{\{1+(Nf+N)^2\}} \quad (7)$$

C: radius constant
Nf: the number of rotation pulses of file reel which are obtained per one rotation of machine reel
N: the number of pulses per one rotation of file reel Now, assuming that a maximum radius of the tape when the tape is fully taken up by the file reel and machine reel is set to R0 and a minimum radius of the tape, namely, a reel radius when the tape is fully taken out is set to Ri, a radius constant (C) in the equations (6) and (7) is calculated by the following equation.

$$C = \sqrt{(R0^2 + Ri^2)} \quad (8)$$
$$= Ri\sqrt{\{1+(N/Nf)^2\}}$$

R0: maximum radius of tape
Ri: minimum radius of tape (reel radius)

Therefore, the radius constant operating section 226 obtains the radius constant (C) according to the equation (8) by using the number Nf of rotation pulses of the file reel per one rotation of the machine reel which is obtained by the counter 204 as a parameter and outputs to the tape radius operating section 228. The tape radius operating section 228 obtains the file reel radius Rf by the equation (6) and also obtains the machine reel radius Rm by the equation (7). An address in the inertia table 232 is designated by the reel radii Rf and Rm and the inertia table values Cf and Cm and the tension table values Ctf and Ctm can be read out.

On the other hand, with respect to the acceleration control and deceleration control at the time of the start of the tape run, predetermined acceleration current and deceleration current are supplied to the file reel motor 28 and machine reel motor 32. At the time of the acceleration or deceleration, namely, at the time of the start/stop, the multiplexer 214 fetches and monitors only the count value of the rotation pulse signals E52 from the pulse generator 30 provided for the file reel motor 28 at every predetermined period by a counter 210. In this case, the multiplying section 216 and adding section 242 are switched to a function for outputting a constant current value of a mere acceleration or deceleration current value. As for a value of the counter 210, a reel speed can be judged by checking a period. Therefore, at the time of the acceleration, the reel speed is obtained from the count value of the counter 210 and compared with a specific target speed. When the reel speed reaches 75% of the target speed, the control is switched to the speed control shown in the equations (1) and (2).

FIG. 34A shows a change in current instruction value when the control is shifted from the acceleration control to the constant speed control. FIG. 34B shows a speed change at that time. In the acceleration control, a predetermined current instruction value is set and the reel speed almost linearly increases. When the reel speed reaches 75% of a reference speed Vr, namely, 0.75 Vr, the control is switched to the constant speed control shown in the equations (1) and (2). The constant speed control by the reference speed Vr can be smoothly executed without causing an overshoot. The current instruction value in the constant speed control is set to a relatively low current value. Therefore, a resolution is insufficient when the tape tension of about 50 g is controlled by a back tension control of the reel motor on the supply side, namely, by the control of the current instruction value. Thus, by allowing the motor on the supply reel side to execute the braking mode when the outflow side and inflow side in FIGS. 26D to 26I are simultaneously turned on/off by the pulse width control signal, a proper back tension control that is independent from the constant speed control can be executed.

[Tape Loading]

In the magnetic tape apparatus of the invention, since the magnetic tape cartridge of the single reel is used, when the cartridge is loaded into the apparatus, the threader mechanism operates and a reader block fixed at the tape edge of the cartridge is held and carried to the machine reel and is fixed to the center of the reel. The tape wrap mechanism also operates and executes a tape wrapping operation to wrap the tape pulled out to the machine reel to the surface around the rotary head in a helical shape. In the conventional magnetic tape apparatus, the tape wrap is started after completion of the tape thread. Therefore, the operations of two steps of the tape thread and tape wrap are necessary until the end of the tape loading and there is a problem such that it takes a time until the apparatus enters a standby mode for recording or reproduction after the cartridge was inserted. On the other hand, according to the invention, since the tape threading operation and the tape wrapping operation are executed in parallel, the time until the standby mode for recording or reproduction after the insertion of the cartridge is reduced.

FIG. 35 is a diagram showing the details of the tape loading control section 140 provided for the DSP 80 in FIG. 6. A tape thread control section 310 and a tape wrap control section 312 are provided for the tape loading control section 140. The tape thread control section 310 is activated by the end of the loading of the cartridge and outputs current instruction data to drive the tape thread motor 36 to the D/A converter 108. After the current instruction data to the D/A converter 108 was converted to an analog voltage, it is supplied to the driver 110. The tape thread motor 36 is rotated in the tape thread direction by the instructed current value. The tape thread mechanism 316 operates by the rotation of the tape thread motor 36.

Figure 36:
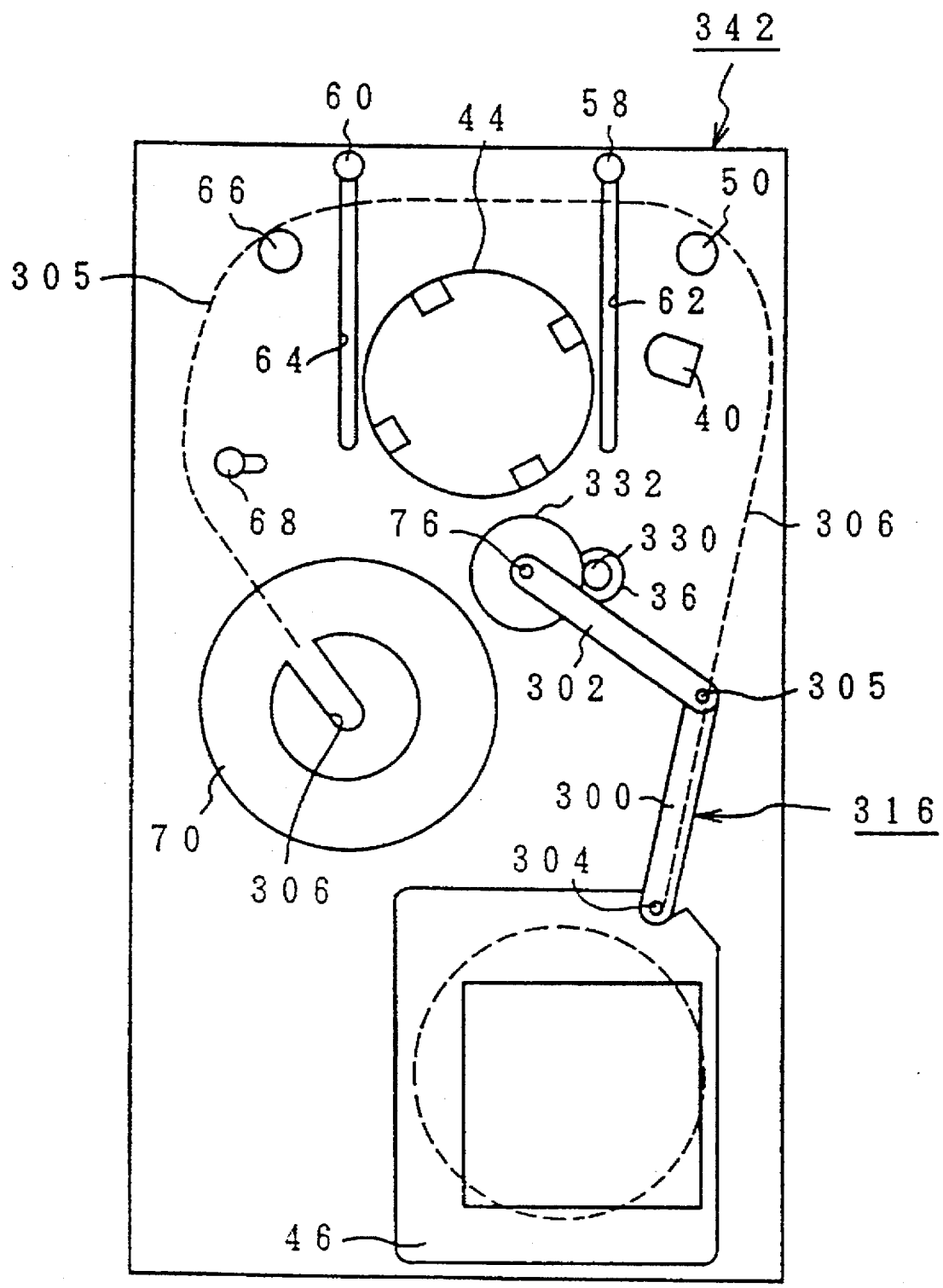
FIG. 36 is an explanatory diagram of a tape thread mechanism and a tape wrap mechanism.
Figure 37:
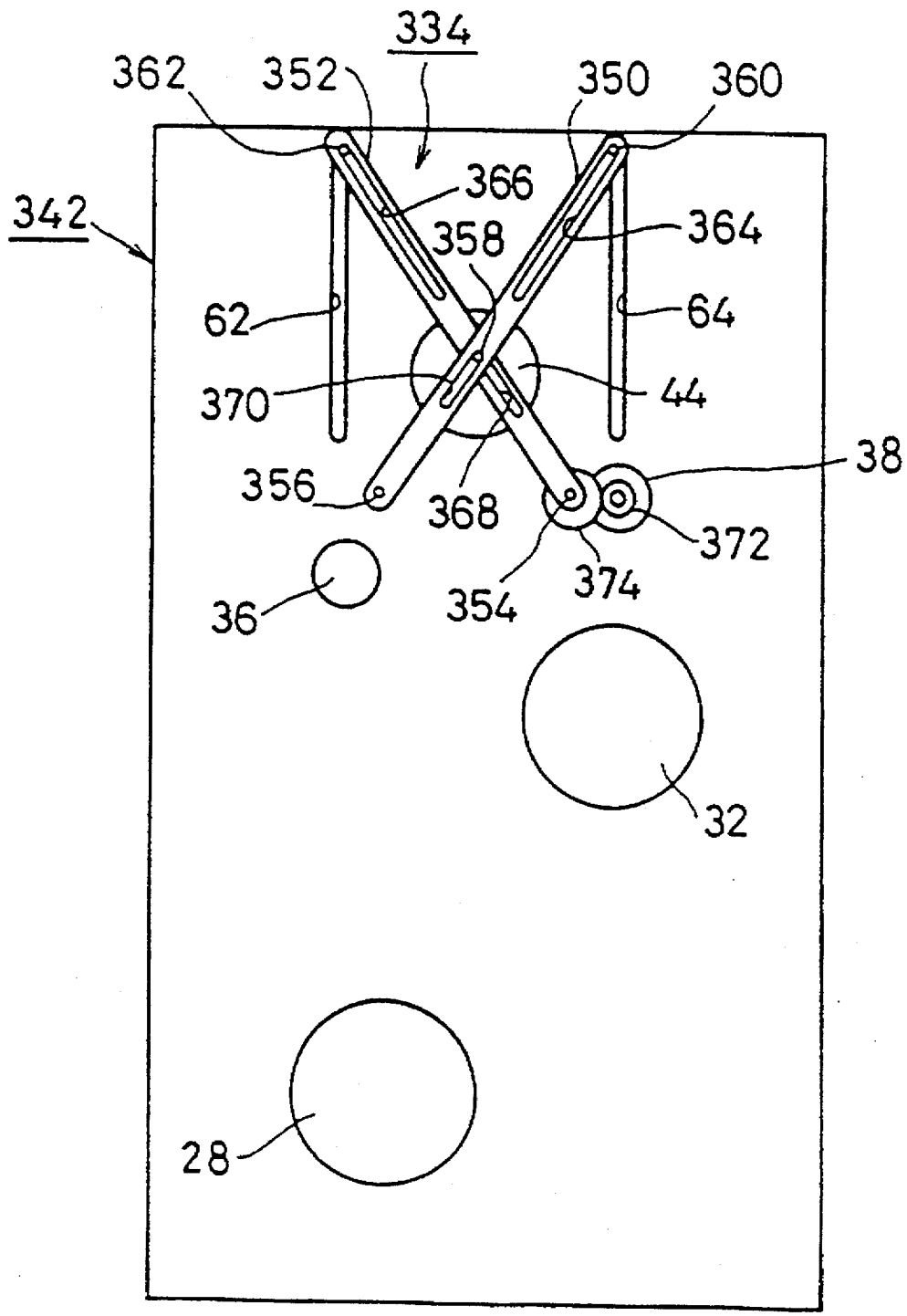
FIG. 37 is an explanatory diagram of a link mechanism for tape wrapping.

FIG. 36 shows an embodiment of a tape thread mechanism 316. The tape thread mechanism 316 has the rotary arm 302 fixed to the rotary axis 76 of the gear 332 that is in engagement with the gear 330 of the tape thread motor 36 and the guide arm 300 which is rotatably attached to the edge of the rotary arm 302 by an axis 305. The pin 304 is provided at the edge of the guide arm 300. At a position shown in the diagram, the pin 304 is fitted into the reader block provided at the edge of the magnetic tape of the cartridge 46. The rotary arm 302 rotates by the counterclockwise (CCW direction) rotation of the rotary axis 76 by the tape thread motor 36. In association with the rotation of the rotary arm 302, the pin 304 holding the reader block of the tape at the edge of the guide arm 300 moves along a tape thread locus 305 shown by a broken line, thereby fitting and fixing the reader block into the notched groove 306. In FIG. 37 and subsequent diagrams, the capstan roller 52, guide roller 54, tape thread motor 36, and gears 330 and 332 in FIG. 2 are omitted.

Referring again to FIG. 35, the tape wrap control section 312 is provided for the tape loading control section 140. The tape wrap control section 312 outputs predetermined current instruction data to drive the tape wrap motor 38 to the D/A converter 112. The driver 114 drives the tape wrap motor 38 on the basis of the current instruction voltage from the D/A converter 112. When the tape wrap motor 38 rotates, a tape wrap mechanism 318 operates. The tape wrap mechanism 318 drives the movable guides 58 and 60 of the guide grooves 62 and 64 provided on both sides of the rotary head 44 in FIG. 36. The movable guides 58 and 60 are located at positions shown in the diagram in an initial state. When the tape wrapping operation is executed, the movable guides 58 and 60 move to the rotary head 44 side, thereby helically wrapping the magnetic tape around the rotary head 44.

FIG. 37 shows the details of the link mechanism 334 for tape wrap in FIG. 3. The link mechanism 334 has a pair of links 350 and 352. A guide groove 364 is provided on the upper side of the link 350 and a guide groove 370 is provided from the center to the lower side. Similarly, a guide groove 366 is provided on the upper side of the link 352 and a guide groove 368 is provided from the center to the lower side. Lower edges of the links 350 and 352 are rotatably attached to the supporting plate 342 by axes 356 and 354. The links 350 and 352 cross at the center. A pin 358 is fitted in a crossing portion of the guide grooves 368 and 370. Shafts 360 and 362 to support the movable guides 58 and 60 in FIG. 36 are fitted into the upper guide grooves 364 and 366 of the links 350 and 352. The shafts 360 and 362 move along the guide grooves 62 and 64. A gear 374 is fixed to the axis 354 fixed to the lower edge of the link 352. A gear 372 provided for the rotary axis of the tape wrap motor 38 is in engagement with the gear 374.

Figure 38:
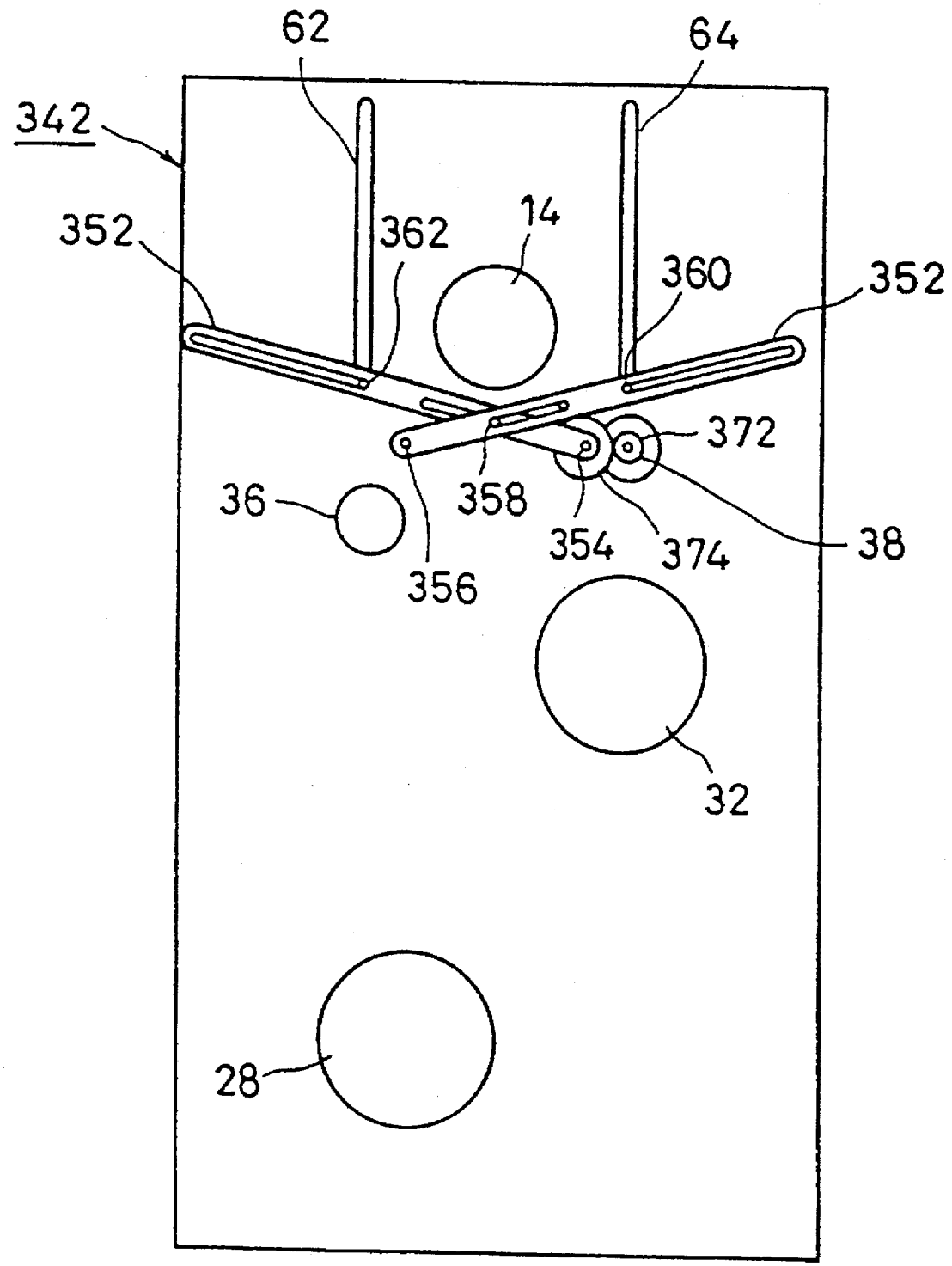
FIG. 38 is an explanatory diagram of a wrapping operation completion state of the link mechanism for tape wrapping.

FIG. 37 shows the link mechanism 334 before the tape wrapping operation is executed. In this instance, as shown in FIG. 36, the movable guides 58 and 60 have been moved to the outside positions of the guide grooves 62 and 64. In case of performing the tape wrapping operation, the tape wrap motor 38 is driven and the link 352 is counterclockwise rotated around the axis 354 through the gears 372 and 374. When the link 352 rotates counterclockwise, as shown in FIG. 38, the links 350 and 352 are opened, thereby moving the shafts 360 and 362 of the movable guides 58 and 60 to the inside along the guide grooves 62 and 64. Therefore, as shown in FIG. 2, the movable guides 58 and 60 are moved to the positions at which the magnetic tape 48 is wrapped around the rotary head 44. Referring again to FIG. 35, the tape wrap control section 312 is activated by a timer 314. The timer 314 is activated when the tape thread control section 310 receives a loading completion signal of the cartridge. The timer 314 times up after the elapse of a predetermined time, for example, a few seconds and generates a timer output to the tape wrap control section 312, thereby starting the operation by the tape wrap control section 312. Therefore, the tape wrap mechanism 318 operates in parallel during the operation of the tape thread mechanism 316.

Figure 39:
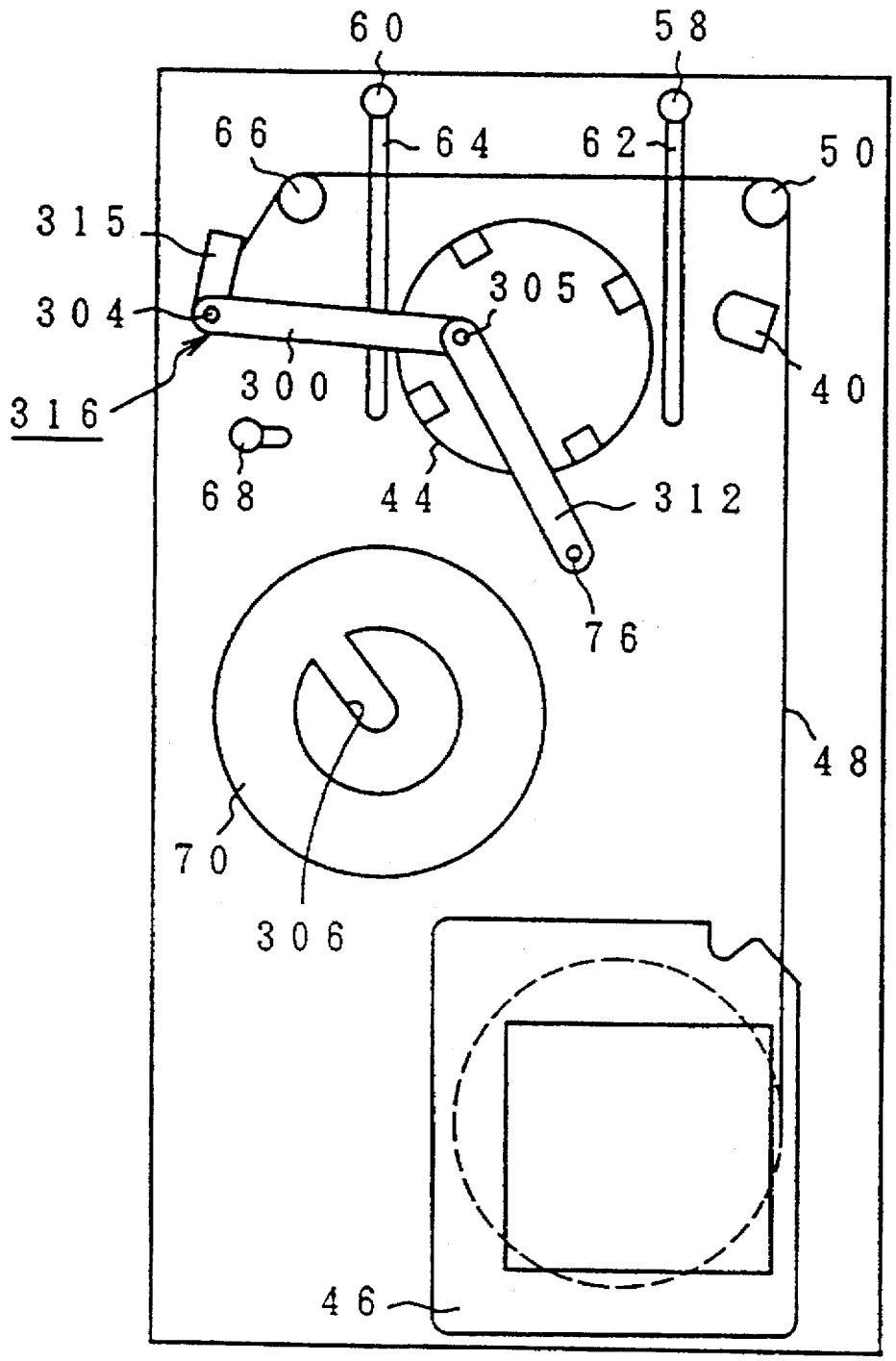
FIG. 39 is an explanatory diagram of a tape thread before the start of the tape wrapping.
Figure 40:
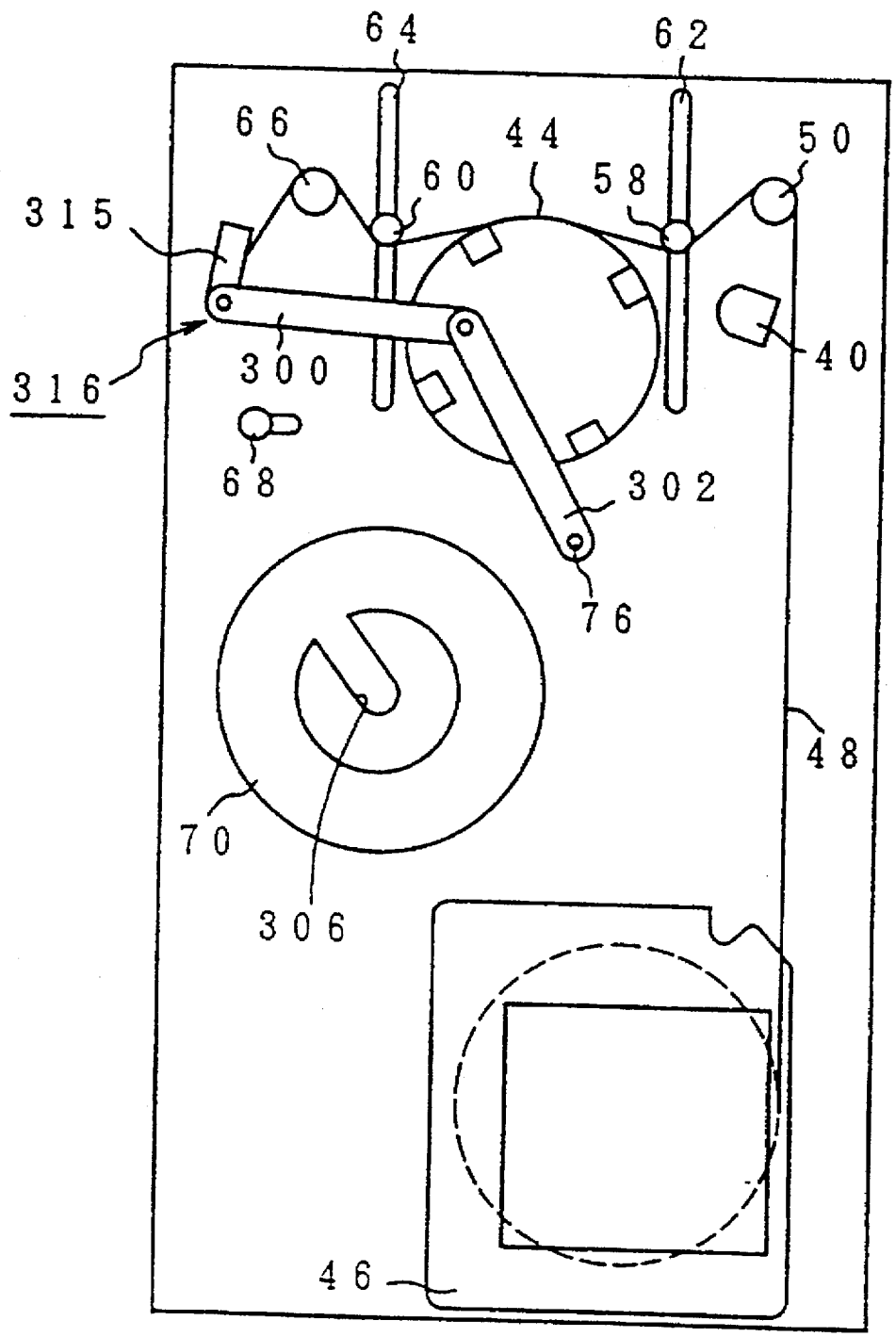
FIG. 40 is an explanatory diagram of a tape wrapping which is executed in parallel with a tape thread.
Figure 41:
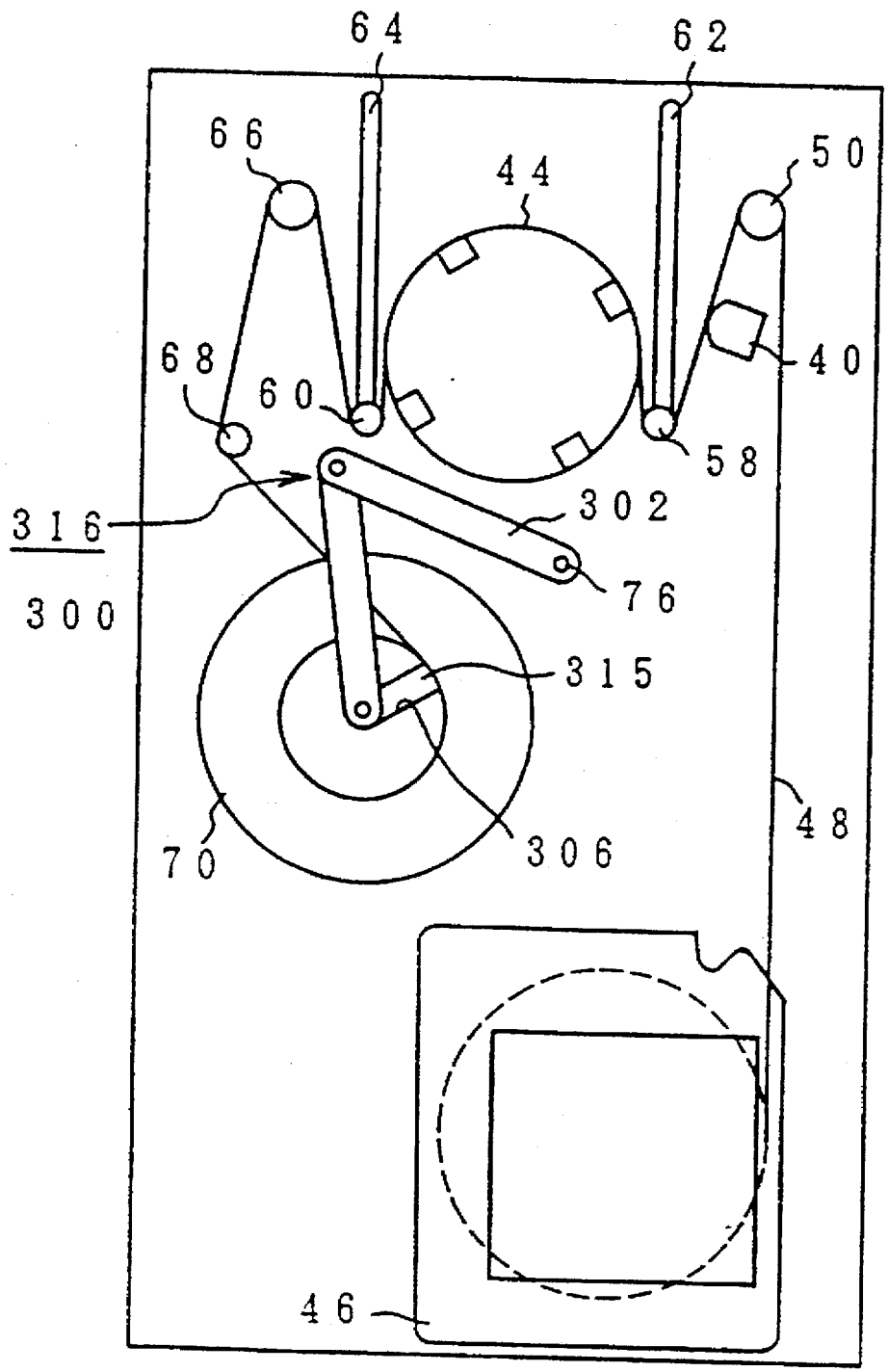
FIG. 41 is an explanatory diagram of a tape wrapping and tape threading completion state.

FIG. 39 shows a state in which the tape thread mechanism 316 operates by the activation of the tape thread motor 36 by the insertion of the cartridge by the tape thread control section 310 of the tape loading control section 140 in FIG. 35. In this state, the rotary arm 302 of the tape thread mechanism 316 has rotated to the portion of the rotary head 44. The reader block 315 at the edge of the magnetic tape 48 held by the pin 304 at the edge of the guide arm 300 is pulled out to the position exceeding the fixed guide 66. At this time, the movable guides 58 and 60 which operate by the tape wrap mechanism 318 are located at the backward positions of the guide grooves 62 and 64. At this time point, the timer 314 times out and the tape wrap mechanism 318 operates by the rotation of the tape wrap motor 38. When the tape wrap mechanism 318 operates, as shown in FIG. 40, the movable guides 58 and 60 move to the rotary head 44 side along the guide grooves 62 and 64, thereby helically wrapping the magnetic tape 48 around the rotary head 44. The tape wrapping operation is executed simultaneously with the tape threading operation. Finally, as shown in FIG. 41, the reader block 315 at the edge of the guide arm 300 is fitted into the notched groove 306 of the machine reel 70, thereby fixing the edge of the magnetic tape 48 to the machine reel 70. In this instance, the movable guides 58 and 60 have already been in the tape wrap completion state in which the magnetic tape 48 was wrapped around the rotary head 44.

Figure 42:
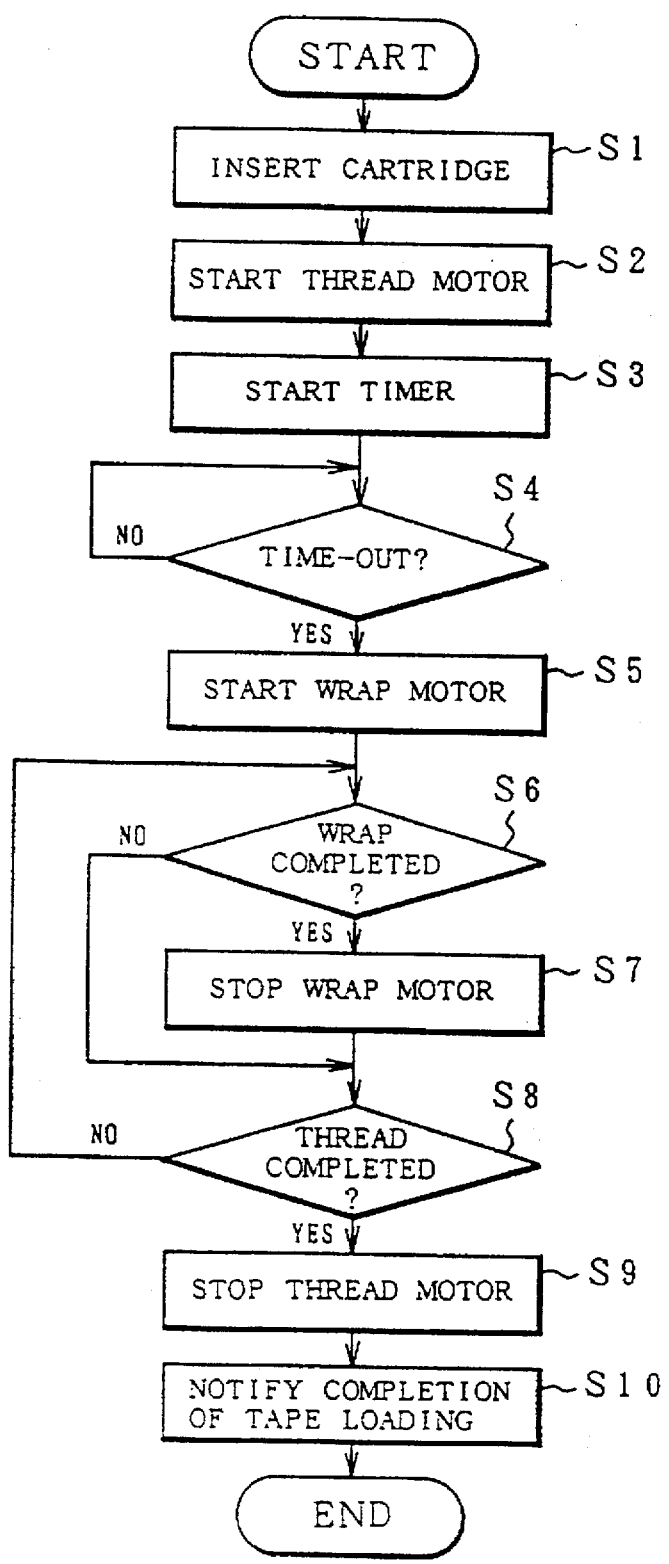
FIG. 42 is a flowchart for a loading process in FIG. 35.

A flowchart of FIG. 42 relates to a process of the tape loading control section 140 in FIG. 35. When the cartridge is inserted in step S1, the tape thread motor 36 is activated and the operation of the tape thread mechanism 316 is started in step S2. At the same time, the timer 314 is activated in step S3. In step S4, a check is made to see if the timer 314 has timed out or not. After the elapse of a predetermined time from the timer activation, for instance, a time necessary to pull out the reader block 315 of the magnetic tape 48 to a position exceeding the rotary head 44 in FIG. 39, specifically speaking, a few seconds, the timer 314 times out. In step S5, the tape wrap motor 38 is activated and the operation of the tape wrap mechanism 318 is started. Thus, as shown in FIG. 40, the tape wrap to the rotary head 44 is executed simultaneously with the tape thread. In step S6, a check is made to see if the tape wrap has been completed or not. The completion of the tape wrap is judged by, for example, detecting the movement of the movable guides 58 and 60 to the tape wrap completion position by a sensor such as photosensor, touch sensor, contactless switch, or the like. When the completion of the tape wrap is judged in step S6, the tape wrap motor 38 is stopped in step S7. The completion of the tape thread can be judged from the reel rotation when the reader block 315 at the edge of the magnetic tape 48 is pushed into the notched groove 306 of the machine reel 70 as shown in FIG. 41. The completion of the tape thread can be also judged by detecting a rotational angle of the rotary arm 302 by a sensor. When the completion of the tape thread is judged in step S8, the tape thread motor 36 is stopped in step S9. Finally, in step S10, the completion of the tape loading is notified to, for example, the whole control section 132 in FIG. 6. A status of the standby mode for recording or reproduction in association with the completion of the loading is notified to the MPU from the whole control section 132.

In the embodiment of FIG. 35, the tape wrap is started after a few seconds from the activation of the tape thread. However, a counter can be also used in place of the timer 314. The counter counts the rotation pulses which are generated from the pulse generator 30 provided for the file reel motor 28 attached with the file reel 45 of the cartridge 46 that is freely rotated by the tape thread. As shown in FIG. 39, when a count value of the counter reaches the number of rotation pulses corresponding to a rotational speed of the file reel 45 until the reader block 315 at the edge of the magnetic tape 48 is pulled out to a position exceeding the rotary head 44, for example, a position exceeding the fixed guide 66, the activation of the tape wrap motor 38 can be also instructed to the tape wrap control section 312.

Figure 43:
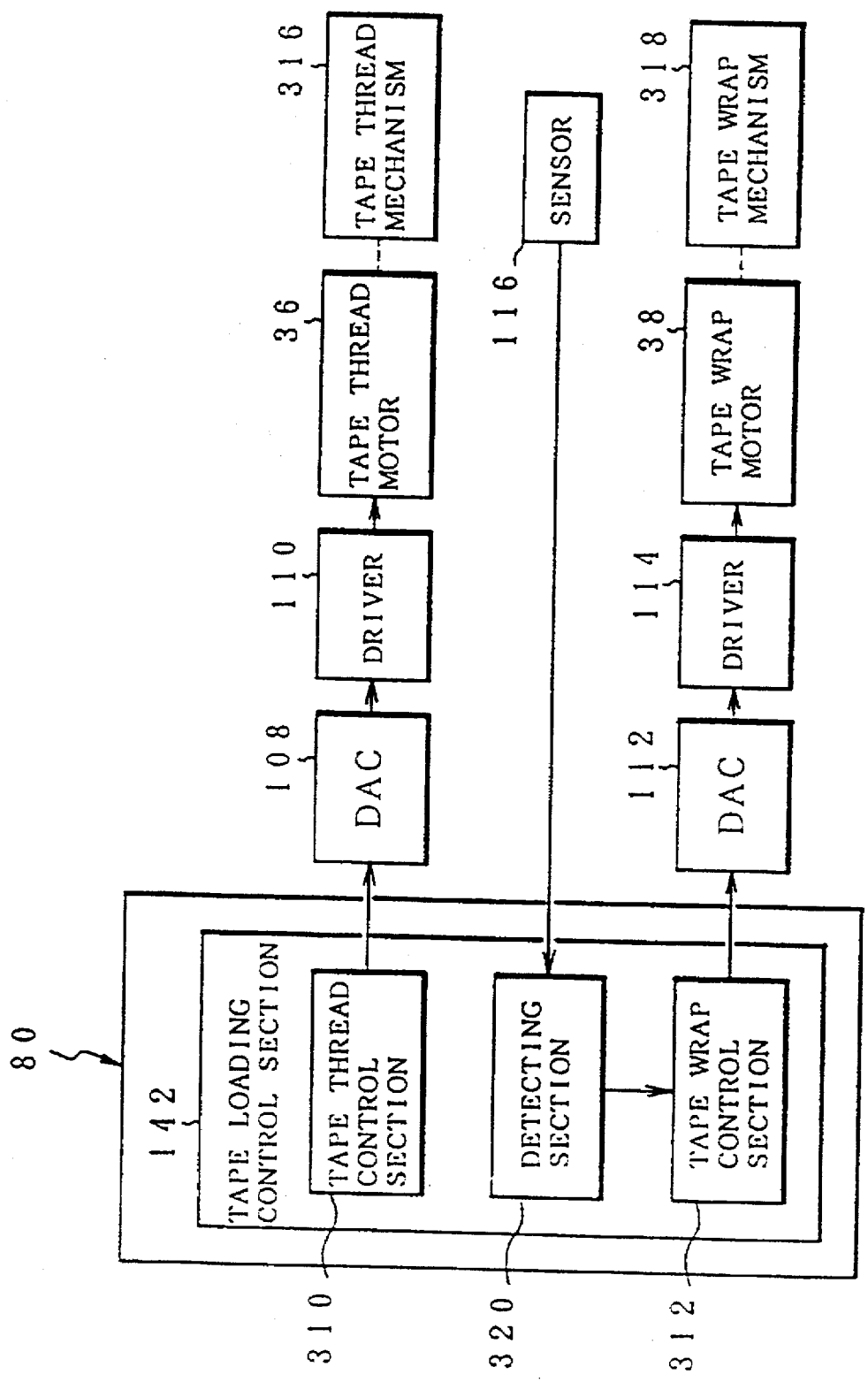
FIG. 43 is a functional block diagram of a tape loading control section in FIG. 6 using a sensor.
Figure 44:
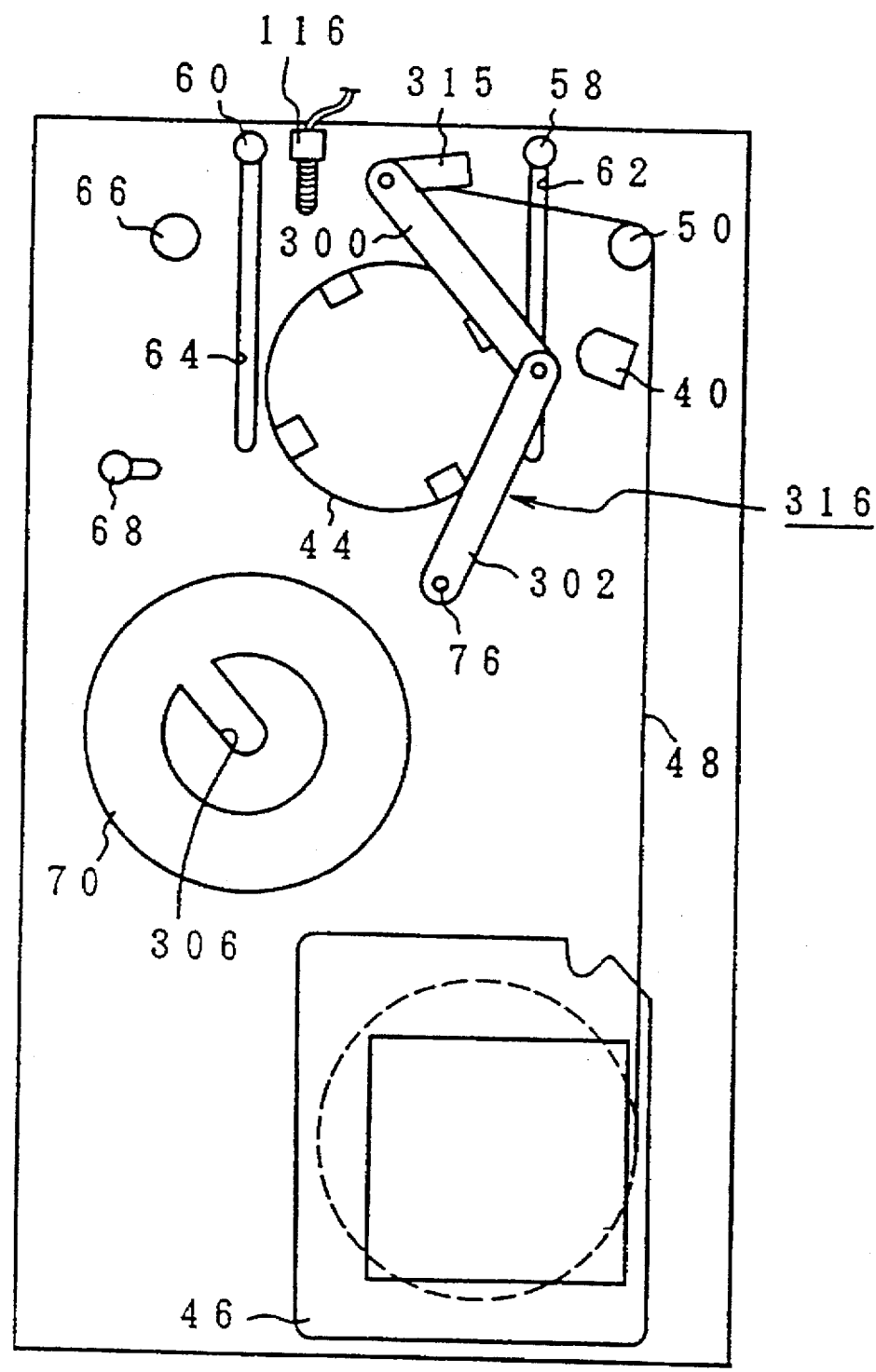
FIG. 44 is an explanatory diagram of a state in which a tape is threaded to a position in front of the sensor.

FIG. 43 shows another embodiment of the tape loading control section 140 provided for the DSP 80. As shown in FIG. 44, the embodiment is characterized in that the position sensor 116 is arranged at a position, for instance, in front of the movable guide 60 and the tape wrap is activated by a detection output of the tape edge of the sensor 116, namely, a detection output of the read block 315. A proper sensor such as photosensor, mechanical contact sensor, contactless switch, or the like can be used as a sensor 11. A detecting section 320 of a sensor signal by the passage of the reader block 315 of the magnetic tape 48 by the sensor 116 is provided for the loading control section 140. The detecting section 320 supplies an output indicative of the detection of the passage of the reader block 315 of the magnetic tape edge from an output of the sensor 116 to the tape wrap control section 312. Thus, the tape wrap control section 312 activates the tape wrap motor 38, thereby starting the operation of the tape wrap by the tape wrap mechanism 318.

Figure 45:
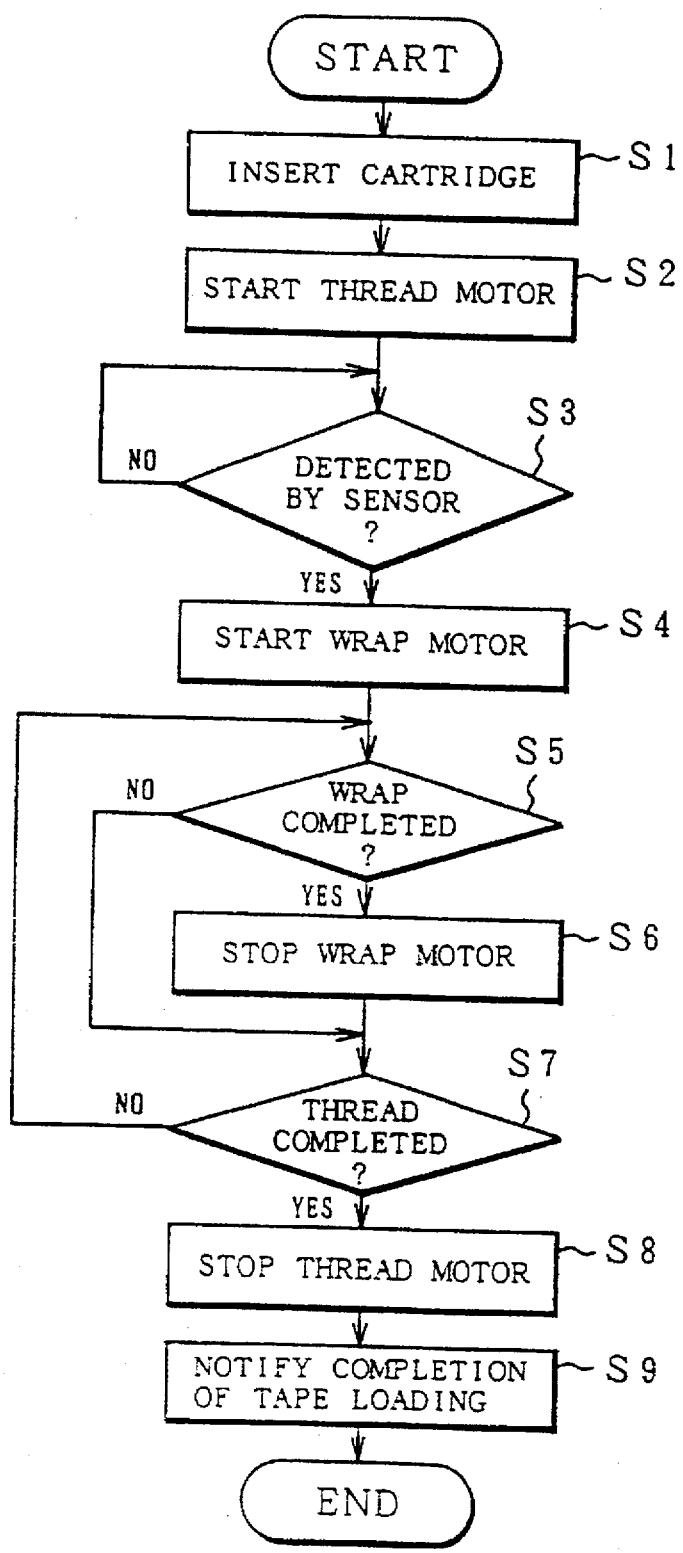
FIG. 45 is a flowchart for a tape loading process in FIG. 43.

A flowchart of FIG. 45 relates to a process in the embodiment using the sensor 116 in FIG. 43. When the cartridge is inserted in step S1, the tape thread motor 36 is activated in step S2. In step S3, the presence or absence of the detection output about the passage of the reader block 315 of the tape edge by the sensor 116 is discriminated. When there is a detection output, step S4 follows and the tape wrap motor 38 is activated. Thus, the tape wrap is executed in parallel with the tape thread. When the completion of the tape wrap is judged in step S5, the tape wrap motor 38 is stopped in step S6. When the completion of the tape thread is judged in step S7, the tape thread motor 36 is stopped in step S8. Finally, in step S9, a tape loading completion notification is transmitted, thereby setting the apparatus into the standby mode for reproduction or recording.

Figure 46:
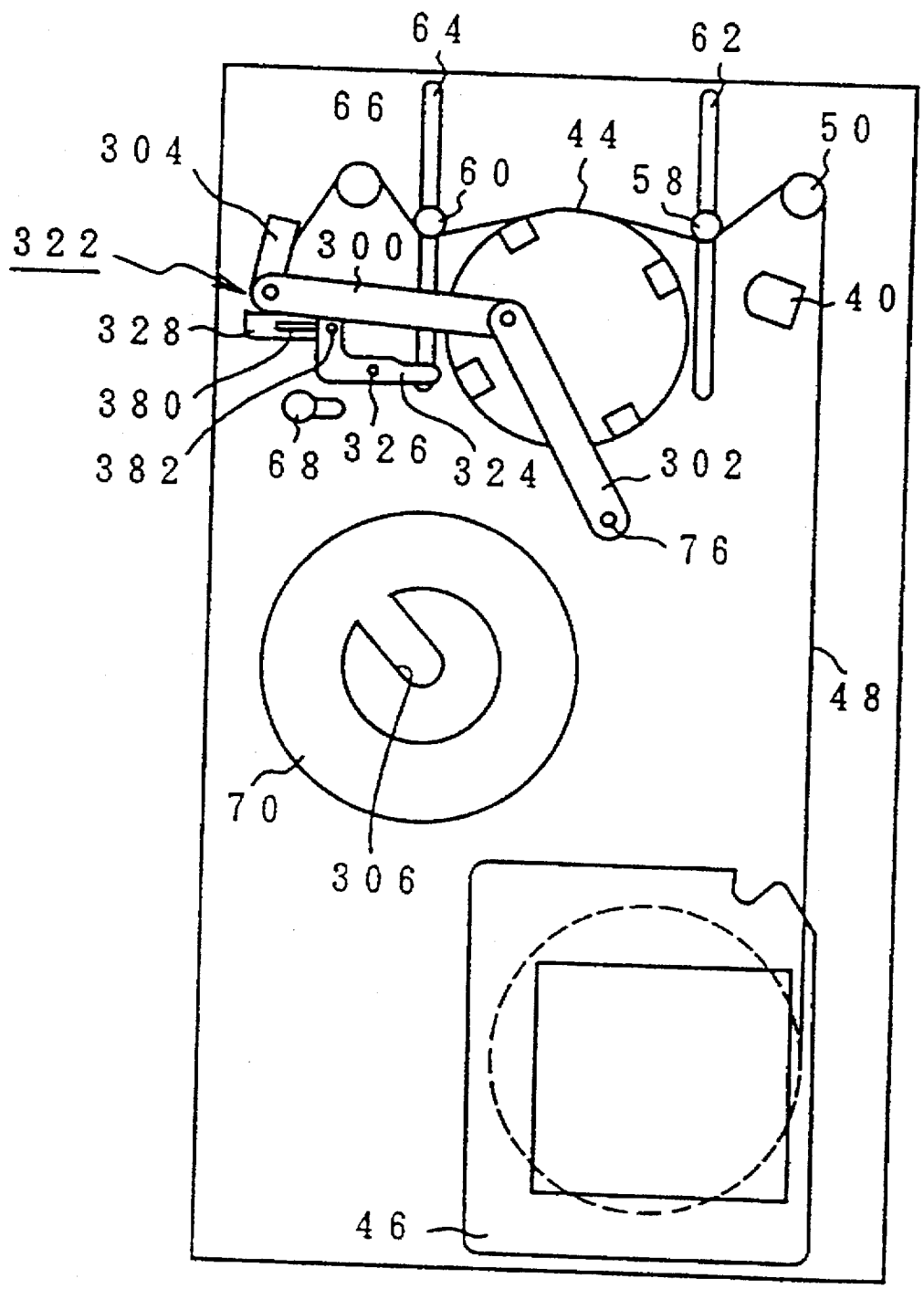
FIG. 46 is an explanatory diagram of a mechanism for stopping a tape thread in the halfway and performing a tape wrapping and subsequently restarting the thread after completion of the wrapping.
Figure 47:
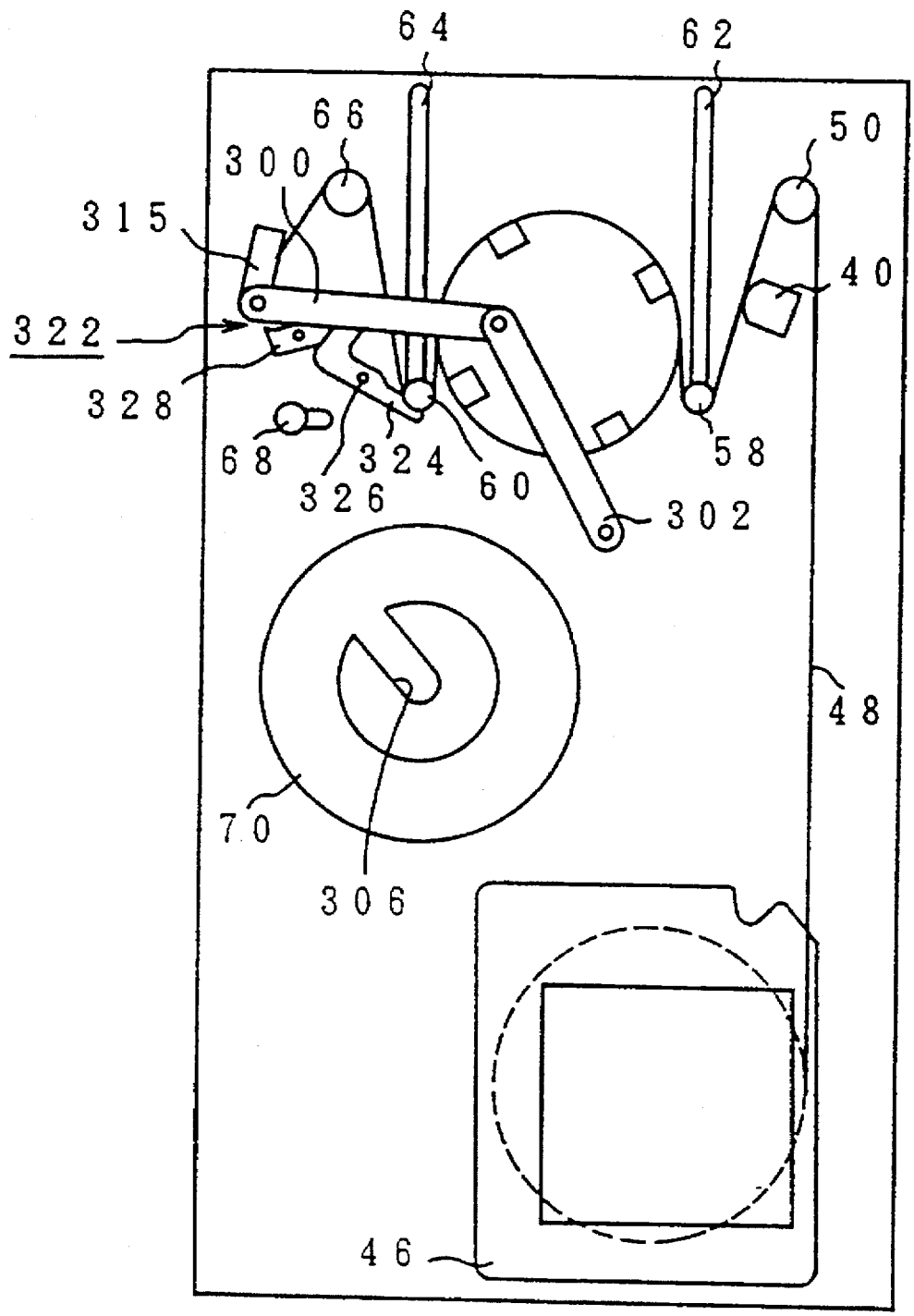
FIG. 47 is an explanatory diagram of a state in which a locking mechanism is released by completion of the wrapping and the tape thread is restarted.

An embodiment of FIG. 46 is characterized in that the tape wrap is started in a stop state of the tape thread and the tape thread is restarted by the completion of the tape wrap. To stop and restart the tape thread, a locking mechanism 322 is provided at a position exceeding the fixed guide 66. The locking mechanism 322 has a lever 324 which can freely swing around an axis 326. The right side of the lever 324 is extended to a position at which it transverse the guide groove 64. The left side of the lever 324 is bent in an L-shape. A stopper lever 328 in which a slit groove 380 is fitted to a pin 382 is attached to an edge of the L-shaped bent portion. An edge of the stopper lever 328 is located on a tape thread locus of the reader block 315. When the reader block 315 supported to the edge of the guide arm 300 is come into contact with the stopper lever 328 (not shown) by the rotation of the rotary arm 302 by the tape thread motor, the motion of the reader block is stopped. When the stop of the tape thread by the locking mechanism 322 is detected, the tape wrap motor 38 is activated and moves the movable guides 58 and 60 to the rotary head 44 side along the guide grooves 62 and 64, thereby wrapping the tape. When the movable guides 58 and 60 are moved to the tape wrap completion position, as shown in FIG. 47, the movable guide 60 pushes down the right edge of the lever 324 and rotates the lever 324 clockwise around the axis 326 as a center. Therefore, the stopper lever 328 is pulled in to the right side and releases the stop of the reader block 315, thereby restarting the tape thread by the tape thread motor 36. As mentioned above, by providing the locking mechanism 322 in the halfway of the tape thread locus, processes such that the tape thread is first started and the tape wrap is subsequently executed and, after completion of the tape wrap, the tape thread is restarted and completed can be executed. Instead of using the mechanical locking mechanism 322, it is also obviously possible to construct in a manner such that the tape thread is first executed by a sequence according to the timer 314 in FIG. 35 or a sequence based on the sensor by the detecting section 320 in FIG. 39, the tape thread is stopped at a position exceeding the fixed guide 66, the tape wrap is started, and after completion of the tape wrap, the tape thread is restarted.

According to the magnetic tape apparatus of the invention as mentioned above, the following effects are obtained with respect to the helical scan type using the cartridge of the single reel type.

First, the repositioning operation and the high speed search to the target position can be easily performed on the basis of the count value of the control pulses recorded in the control track of the magnetic tape. As compared with the processes in which the ID of the helical track is reproduced in the conventional apparatus, the construction of the apparatus can be simplified and the processing time can be reduced.

By previously measuring the rotational torque ripple of the capstan motor to control the tape feed and reducing a fluctuation amount by the feed-forward control when the tape is run, the wow and flutter of the tape run can be reduced. At the same time, with respect to the motors of the tape running system, namely, the capstan motor, reel motor, and drum motor, by preceding the switching timing of the coil current based on the Hall sensors, the torque fluctuation is suppressed and the wow and flutter can be improved.

With regard to the control of the back tension due to the control of the reel motor, by switching the control so as to form a regenerative braking circuit of the coils at the OFF timing of the PWM control, the torque of the reel motor on the supply side is reduced and a micro back tension such as tens of grams which is required to the tape run of the helical scan type can be properly controlled.

Further, by executing the tape wrapping operation in parallel with the threading operation of the tape when the cartridge is inserted, the time until the apparatus reaches the standby mode for recording or reproduction after the insertion of the cartridge can be reduced.

The present invention is not limited to the foregoing preferred embodiments but incorporates many modifications and variations within the spirit and scope of the appended claims of the invention without departing from the objects thereof. The invention is also not limited by the numerical values shown in the embodiments.

What is claimed is:

1. A magnetic tape apparatus comprising:

a tape running mechanism for loading a cartridge in which a magnetic tape is wound around a single reel to a file reel of the apparatus, for taking out and winding said magnetic tape to a machine reel, and for running the magnetic tape by rotations of said file reel and said machine reel;

a rotary head mechanism for recording and reproducing information by a helical scan of said magnetic tape;

a fixed head for recording a control signal indicative of a start position of a helical track to a control track of said magnetic tape upon recording of the information and for reproducing a control pulse from said control signal of said control track upon rerecording of the information or upon reproduction after the recording; and a reposition processing unit for controlling a repositioning operation of said magnetic tape to said rotary head mechanism upon recording or reproduction on a basis of said control pulse that is reproduced by said fixed head, said reposition processing unit including, a first counter for counting a count value (C1) indicative of a tape running position by adding or subtracting in accordance with a tape running direction of said control pulse, a second counter for counting said control pulse in parallel with said first counter, for stopping a counting operation when a reposition execution signal is received from an upper control section, and for latching a count value (C2), a position calculating section for subtracting a predetermined stop delay distance (Sd) from said count value (C2) latched by said second counter, thereby calculating a count value (C0) indicative of a reposition position, a run control section, when said reposition execution signal is received, for running said magnetic tape in a reverse direction after said magnetic tape running in a forward constant speed run is stopped, and when said count value (C1) of said first counter passes through said count value (C0) indicative of said reposition position during a reverse constant speed run in said reverse direction, for stopping said reverse constant speed run and for running the magnetic tape in an inherent direction at an inherent constant speed run, and a completion notifying section for notifying a reposition completion signal to said upper control section, thereby allowing the recording or reproduction to be executed when said count value (C1) of said first counter coincides with said count value (C0) indicative of said reposition position during said inherent constant speed run.

2. An apparatus according to claim 1, wherein said tape running mechanism has a capstan motor for feeding the magnetic tape at a constant speed, a file reel motor for driving said file reel, and a machine reel motor for driving said machine reel, and said rotary head mechanism has a drum motor for rotating a head drum at a constant speed.

3. An apparatus according to claim 2, further comprising:

a high speed search section for calculating a run distance to a target position instructed by a block ID indicative of the number of data blocks each having a predetermined length from the count value (C1) of the control pulse from said fixed head section and for executing a high speed searching operation.

4. An apparatus according to claim 2, wherein
said high speed search section has a block ID demodulating section for dividing the count value (C1) of said control pulse by a number (M) of control pulses per one block length, thereby demodulating a block ID signal,
and said number (M) of control pulses per said one block length is multiplied to a value in which a block ID at a present position is subtracted from a block ID at a target position, thereby calculating a number (C) of control pulses indicative of a distance to said target position.

5. An apparatus according to claim 2, further comprising:
a torque ripple measuring section for measuring a torque change of one rotation by rotating the capstan motor by a predetermined current when an initialization diagnosing process is executed just after a power source was turned on; and
a correcting section for correcting a drive current to said capstan motor so as to reduce said torque change of one rotation on the basis of a measurement result of said torque ripple measuring section when the tape is run.

6. An apparatus according to claim 5, wherein
said torque ripple measuring section samples a detection value of the drive current of said capstan motor synchronously with a pulse generated from a motor rotation sensor and forms a correction table in which a correction current value at each position of one rotation has been stored,
and said correcting section feed-forward controls said capstan motor on the basis of the correction value in said correction table.

7. An apparatus according to claim 2, wherein
said capstan motor is a brushless DC motor having Hall sensors of the number of coil phases and has a driver section for switching the coil phases on the basis of detection signals of said Hall sensors, and
said driver section has a switching timing control section for switching actual coil phases just before a switching timing of the coil phases based on the detection signals of said Hall sensors.

8. An apparatus according to claim 2, wherein
said drum motor is a brushless DC motor having Hall sensors of the number of coil phases and has a driver section for switching the coil phases on the basis of detection signals of said Hall sensors, and
said driver section has a switching timing control section for switching actual coil phases just before a switching timing of the coil phases based on the detection signals of said Hall sensors.

9. An apparatus according to any one of claims 5, 6, 7, and 8, wherein said switching timing control section comprises:
a counter for counting a switching interval of the coil phases by the detection signals of said Hall sensors when a motor speed reaches a constant rotational speed as a reference interval; and
a switching timing section for initial setting a count value in which a predetermined value is subtracted from said reference interval to a switching interval of said coil phases, for setting the switching timing to an early timing, and thereafter for switching the coil phases in which said reference interval was set.

10. An apparatus according to claim 2, wherein
said file reel motor is a brushless DC motor having Hall sensors of the number of coil phases and has a driver section for switching the coil phases on the basis of detection signals of said Hall sensors, and
said driver section has a switching timing control section for switching actual coil phases just before a switching timing of the coil phases based on the detection signals of said Hall sensors.

11. An apparatus according to claim 2, wherein
said machine reel motor is a brushless DC motor having Hall sensors of the number of coil phases and has a driver section for switching the coil phases on the basis of detection signals of said Hall sensors, and
said driver section has a switching timing control section for switching actual coil phases just before a switching timing of the coil phases based on the detection signals of said Hall sensors.

12. An apparatus according to claim 2, wherein
each of said file reel motor and said machine reel motor is a brushless DC motor having Hall sensors of the number of coil phases and further has:
a driver section for switching the coil phases on the basis of detection signals of said Hall sensors; and
a braking mode setting section for driving the reel motor on a tape supply side in a braking mode.

13. An apparatus according to claim 12, wherein
said driver section has a bridge circuit in which a first switching circuit for allowing a current to flow in and a second switching circuit for allowing a current to flow out are serially connected for each of coils which are star connected,
in a normal mode, either one of said first and second switching circuits is driven by an AND signal of a pulse width control signal according to a current control signal and a coil switching signal based on the detection signals of said Hall sensors and the other switching circuit is driven by only said coil switching signal, and
in the braking mode, both of said first and second switching circuits are simultaneously driven by the AND signal of said pulse width control signal and said coil switching signal.

14. An apparatus according to claim 1, wherein when said reposition execution signal is received, said run control section controls in a manner such that said magnetic tape during the constant speed run is run at a first constant speed for a first predetermined distance and is subsequently first deceleration controlled and is stopped, and after the stop of said magnetic tape, said magnetic tape is first acceleration controlled and is run at a second constant speed, and further, after said magnetic tape passes through said reposition position, said magnetic tape is run at a third constant speed for a second predetermined distance and is subsequently second deceleration controlled and is stopped, and after the stop of said magnetic tape, the magnetic tape is second acceleration controlled in said inherent direction and is run at a fourth constant speed.

15. An apparatus according to claim 1, wherein said run control section controls a capstan motor, a file reel motor, and a machine reel motor provided for said tape running mechanism.

16. An apparatus according to claim 1, further comprising:
a thread mechanism for pulling out an edge of the magnetic tape from the machine reel of said cartridge and loading to said file reel;
a tape wrap mechanism for wrapping the tape to said rotary head mechanism; and a loading control section for making said thread mechanism and said tape wrap mechanism operative in parallel.

17. An apparatus according to claim 16, wherein said loading control section has a timer which is activated by a start of an operation of said thread mechanism and times out after a predetermined time, thereby starting an operation of said tape wrap mechanism.

18. An apparatus according to claim 16, wherein said loading control section has a sensor arranged at a position of a thread locus in front of said machine reel and starts an operation of said tape wrap mechanism when a detection output of a tape edge is obtained from said sensor by an operation of said tape thread mechanism.

19. An apparatus according to claim 16, wherein said loading control section has a counter for counting rotation pulses of said file reel and starts an operation of said tape wrap mechanism when a count value of said counter reaches a predetermined value by an operation of said tape thread mechanism.

20. An apparatus according to claim 16, further comprising a locking mechanism for mechanically stopping an operation of said tape wrap mechanism at a predetermined position in front of said machine reel, and wherein when a movable roller of said tape wrap mechanism which operates in parallel is moved to a wrap completion position, a locking state of said locking mechanism is mechanically released and a threading operation is restarted.

21. An apparatus according to claim 16, wherein said tape wrap mechanism comprises:

a pair of links in each of which one end is rotatably attached to a casing side by an axis and which are crossed and arranged so as to be mutually slidable by coupling a pin to a slide groove in a central portion;

a pair of movable guides which are attached to the other ends of said links and can move along a guide groove on the casing side; and a gear mechanism for transferring a rotation of said tape wrap motor to the axis of said pair of links and opening and closing said pair of links, thereby moving said movable guides between a wrap start position and a wrap completion position.

* * * * *